(12) United States Patent
Adjakple et al.

(10) Patent No.: US 11,805,472 B2
(45) Date of Patent: Oct. 31, 2023

(54) ACCESS CONTROL IN 5G NR

(71) Applicant: InterDigital Patent Holdings, Inc., Wilmington, DE (US)

(72) Inventors: Pascal M. Adjakple, Great Neck, NY (US); Joseph M. Murray, Schwenksville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/556,058

(22) Filed: Dec. 20, 2021

(65) Prior Publication Data

US 2022/0191771 A1 Jun. 16, 2022

Related U.S. Application Data

(63) Continuation of application No. 16/637,506, filed as application No. PCT/US2018/045958 on Aug. 9, 2018, now Pat. No. 11,240,736.

(Continued)

(51) Int. Cl.
*H04W 48/08* (2009.01)
*H04W 48/18* (2009.01)

(52) U.S. Cl.
CPC ........... *H04W 48/08* (2013.01); *H04W 48/18* (2013.01)

(58) Field of Classification Search
CPC ... H04W 48/16; H04W 52/343; H04W 80/00; H04W 88/06; H04W 92/20;

(Continued)

(56) References Cited

U.S. PATENT DOCUMENTS 8,826,444 B1 9/2014 Kalle
10,383,035 B2 8/2019 Sheng
(Continued)

FOREIGN PATENT DOCUMENTS

CN 105612788 A 5/2016
CN 206096888 U 4/2017
(Continued)

OTHER PUBLICATIONS

3GPP TS 22.011 V15.1.0, "3rd Generation Partnership Project; Technical Specification Group Services and System Aspects; Service Accessibility (Release 15)", Jun. 2017, 32 pages.
(Continued)

*Primary Examiner* — Joseph Arevalo
(74) *Attorney, Agent, or Firm* — BakerHostetler

(57) ABSTRACT

Access category management objects may be configured for use in support of access category configurations of a user equipment (UE). Various methods for a UE configuration with access categories are disclosed. Signaling methods by a radio access network of access barring parameters such as a signaling method for a partial list of access barring parameters with explicit signaling of access category indexes and a signaling method for a full list of access barring parameters where access categories are signaled using a bitmap are disclosed. Access control parameters and an access control architecture in terms of access control function distribution within the UE protocol sublayers, solutions that address the impact of access control in a connected mode on a buffer status report, logical channel prioritization and flow control between the UE AS and UE NAS, and details regarding access barring checks are also disclosed.

20 Claims, 50 Drawing Sheets

Related U.S. Application Data

(60) Provisional application No. 62/542,977, filed on Aug. 9, 2017.

(58) Field of Classification Search
CPC . H04W 12/106; H04W 12/12; H04W 12/128; H04W 16/16; H04W 24/00; H04W 24/04; H04W 24/08; H04W 28/10; H04W 28/26; H04W 36/0033; H04W 36/06; H04W 36/125; H04W 4/60; H04W 40/24; H04W 48/08; H04W 52/0232; H04W 52/283; H04W 52/288; H04W 60/06; H04W 72/0453; H04W 76/27; H04W 76/38; H04W 8/04; H04W 8/082; H04W 84/00; H04W 84/22; H04W 88/10; H04W 88/18; H04W 92/045; H04W 12/0431; H04W 28/0215; H04W 28/22; H04W 36/04; H04W 36/24; H04W 4/50; H04W 52/146; H04W 52/26; H04W 68/02; H04W 68/08; H04W 72/048; H04W 76/00; H04W 76/11; H04W 76/15; H04W 8/005
USPC .... 455/458, 418, 405, 419, 509, 525, 404.1, 455/436, 403, 522
See application file for complete search history.

(56) References Cited

U.S. PATENT DOCUMENTS

| | | | |
|---|---|---|---|
| 10,524,180 | B2 | 12/2019 | Hahn et al. |
| 2003/0064741 | A1* | 4/2003 | Silva ................... H04W 52/288 455/69 |
| 2008/0232304 | A1 | 9/2008 | Mooney et al. |
| 2011/0171925 | A1* | 7/2011 | Faccin .................. H04W 36/24 455/404.1 |
| 2013/0029708 | A1* | 1/2013 | Fox ...................... H04W 40/24 455/517 |
| 2013/0040597 | A1 | 2/2013 | Jang et al. |
| 2013/0215742 | A1 | 8/2013 | Sirotkin et al. |
| 2013/0267213 | A1* | 10/2013 | Hsu ................... H04W 52/0232 455/418 |
| 2014/0171096 | A1 | 6/2014 | Hwang et al. |
| 2014/0206373 | A1 | 7/2014 | Ljung |
| 2015/0140956 | A1* | 5/2015 | Prewitt, II ............ H04M 3/362 455/405 |
| 2017/0013501 | A1 | 1/2017 | Kim et al. |
| 2017/0142560 | A1 | 5/2017 | Ryu et al. |
| 2017/0201871 | A1 | 7/2017 | Ryu et al. |
| 2019/0159108 | A1 | 5/2019 | Lee et al. |
| 2019/0174395 | A1 | 6/2019 | Choe et al. |
| 2019/0223094 | A1 | 7/2019 | Ingale et al. |
| 2019/0320354 | A1 | 10/2019 | Kim et al. |
| 2019/0327663 | A1 | 10/2019 | Wirth et al. |
| 2019/0357120 | A1 | 11/2019 | Fu et al. |
| 2020/0052963 | A1 | 2/2020 | Kim et al. |
| 2020/0275344 | A1 | 8/2020 | Byun et al. |

FOREIGN PATENT DOCUMENTS

| | | |
|---|---|---|
| WO | 2013/020778 A1 | 2/2013 |
| WO | 2015/111929 A1 | 7/2015 |
| WO | 2017/017890 A1 | 2/2017 |

OTHER PUBLICATIONS

3GPP TSG-RAN WG2 NR#2, Tdoc R2-1706505, Ericsson, "Access Control for NR", Jun. 2017, 5 pages.
3GPP TSG-RAN WG2 NR#2, Tdoc R2-1706509, Ericsson, "Signalling of Access Control Parameters", Jun. 2017, 6 pages.
Huawei, HiSilicon, "Basic Access Control in NR", 3GPP TSG-RAN WG2 NRAdhoc#2, R2-1706771, 2017, 6 Pages.
Intel Corporation, "5G access control mechanism", 3GPP TSG RANWG2 NR AdHoc#2 Meeting R2-1707046, 2017, 9 pages.
ITU-R Radiocommunication Sector of ITU, International Telecommunication Union, Recommendation ITU-R M2083-0, "IMT Vision—Framework and Overall Objectives of the Future Development of IMT for 2020 and Beyond", Sep. 2015, 21 pages.

\* cited by examiner

```
BarringPerACDC-Category-r13 ::= SEQUENCE {
    acdc-Category-r13           INTEGER (1..maxACDC-Cat-r13),
    acdc-BarringConfig-r13      SEQUENCE {
        ac-BarringFactor-r13        ENUMERATED {
            p00, p05, p10, p15, p20, p25, p30, p40,
            p50, p60, p70, p75, p80, p85, p90, p95},
        ac-BarringTime-r13          ENUMERATED {s4, s8, s16, s32, s64, s128, s256, s512}
    }                           OPTIONAL    -- Need OP
}
```

FIG. 4

1> if SystemInformationBlockType2 includes ac-BarringPerPLMN-List and the ac-BarringPerPLMN-List contains an AC-BarringPerPLMN entry with the plmn-IdentityIndex corresponding to the PLMN selected by upper layers:
  2> select the AC-BarringPerPLMN entry with the plmn-IdentityIndex corresponding to the PLMN selected by the NAS layers;
  2> in the remainder of this procedure, use the selected AC-BarringPerPLMN entry (i.e. presence or absence of access barring parameters in this entry) in SystemInformationBlockType2

1> if the UE is establishing the RRC connection for mobile terminating calls:
  2> if timer T302 is running
    3> inform upper layers about the failure to establish the RRC connection or failure to resume the RRC connection with suspend indication and that access barring for mobile terminating calls is applicable, upon which the procedure ends;

1> else if the UE is establishing the RRC connection for mobile originating call i.e. the access category received from the NAS layers for the initiation of the RRC connection is for mobile originating calls;
  2> perform access barring check as specified in section 5.5.2, using the access category received from the NAS layers as the "Triggering Access Category", T$_{mccal}$ e.g. T303 as "Tbarring", and ac-BarringInfo as "AC barring parameter".
  2> if access to the cell is barred;
    3> inform upper layers about the failure to establish the RRC connection or failure to resume the RRC connection with suspend indication and that access barring for mobile originating calls is applicable, upon which the procedure ends;

FIG. 41A

1> else if the UE is establishing the RRC connection for mobile originating signalling i.e. the access category received from the NAS layers for the initiation of the RRC connection is for mobile originating signalling:

2> perform access barring check as specified in section 5.5.2, using the access category received from the NAS layers as the "Triggering Access Category", $T_{MOSignalling}$ e.g. T305 as "Tbarring", and ac-BarringInfo as "AC barring parameter".

2> if access to the cell is barred:

3> inform upper layers about the failure to establish the RRC connection or failure to resume the RRC connection with suspend indication and that access barring for mobile originating signalling is applicable, upon which the procedure ends;

FIG. 41B

Example 1:
```
-- ASN1START

SystemInformationBlockType2 ::=   SEQUENCE {
------------------------------
AC-BarringPerPLMN-List ::=        SEQUENCE (SIZE (1..maxPLMN-r11)) OF AC-BarringPerPLMN AC-BarringPerPLMN ::=             SEQUENCE {
    plmn-IdentityIndex-r12            INTEGER (1..maxPLMN-r11),
    ac-BarringInfo                    SEQUENCE {
        ac-Barring                        ac-BarringType
    }
}
------------------------------
Ac-BarringType                    CHOICE {
    ac-BarringTypeBoolean             BOOLEAN,         -- Need OP
    ac-BarringTypeBarringFactor       AC-BarringConfig OPTIONAL,   -- Need OP
}
------------------------------
AC-BarringConfig ::=              SEQUENCE {
    ac-BarringFactor                  ENUMERATED {
                                          p00, p05, p10, p15, p20, p25, p30, p40,
                                          p50, p60, p70, p75, p80, p85, p90, p95},
    ac-BarringTime                    ENUMERATED {s4, s8, s16, s32, s64, s128, s256, s512},
    ac-BarringForSpecialAC            BIT STRING (SIZE (maxNumberOfSpecialAC))
}
```

FIG. 42

```
Example 2
-- ASN1START

SystemInformationBlockType2 ::=    SEQUENCE {
------------------------
------------------------
AC-BarringPerPLMN-List ::=    SEQUENCE (SIZE (1..maxPLMN-r11)) OF AC-BarringPerPLMN AC-BarringPerPLMN ::=    SEQUENCE {
    plmn-IdentityIndex-r12    INTEGER (1..maxPLMN-r11),
    ac-BarringInfo            SEQUENCE {
        ac-IdentityIndex          INTEGER (1..maxAC)    OPTIONAL,    -- Need OP
        ac-Barring                ac-barringType
    }
}

Ac-BarringType    CHOICE {
    ac-BarringTypeBoolean          BOOLEAN,                OPTIONAL,    -- Need OP
    ac-BarringTypeBarringFactor    AC-BarringConfig        OPTIONAL,    -- Need OP
}

AC-BarringConfig ::=    SEQUENCE {
    ac-BarringFactor            ENUMERATED {
        p00, p05, p10, p15, p20, p25, p30, p40,
        p50, p60, p70, p75, p80, p85, p90, p95},
    ac-BarringTime              ENUMERATED {s4, s8, s16, s32, s64, s128, s256, s512},
    ac-BarringForSpecialAC      BIT STRING (SIZE(maxNumberOfSpecialAC))
}
```

FIG. 43

1> if timer T302 or "Tbarring" is running:
   2> consider access to the cell as barred;
1> else if SystemInformationBlockType2 includes "AC barring parameter":
   2> if the UE has one or more Special Access Categories, that the UE is configured with or as stored on the USIM, with a value in the specified range, which is valid for the UE to use;
   2> for at least one of these valid Access Classes, there is same or a matching access category contained in the "AC barring parameter", and the corresponding bit for the special access categories contained in "AC barring parameter" is set to zero:
      3> consider access to the cell as not barred;
   2> else if for the "Triggering Access Category", there is same or matching access category contained in the "AC barring parameter" and configured with ac-BarringFactor:
      3> draw a random number 'rand' uniformly distributed in the range: $0 \leq rand < 1$;
      3> if 'rand' is lower than the value indicated by ac-BarringFactor included in "AC barring parameter":
         4> consider access to the cell as not barred;

FIG. 44A

3> else:

4> consider access to the cell as barred;

4> draw a random number 'rand' that is uniformly distributed in the range $0 \le rand < 1$;

4> start timer "Tbarring" with the timer value calculated as follows, using the ac-BarringTime included in "AC barring parameter": "Tbarring" = (0.7 + 0.6 · rand) · ac-BarringTime;

2> else if for the "triggering Access Category", there is same or matching access category contained in the "AC barring parameter" and configured with ac-Boolean:

3> If ac-Boolean is set to one;

4> consider access to the cell as barred;

Note: ac-Boolean access barring parameter may be configured for access category defined for emergency application such as emergency calls, or mission critical or time critical applications such as URLLC applications.

1> else:

2> consider access to the cell as not barred;

FIG. 44B

1> if timer T302 expires or is stopped:
2> inform upper layers about barring alleviation for mobile terminating access;
2> if timer $T_{MO-mMTC}$ is not running:
3> inform upper layers about barring alleviation for mobile originating mMTC calls;
2> if timer $T_{MO-eMBB}$ is not running:
3> inform upper layers about barring alleviation for mobile originating eMBB calls;
2> if timer $T_{MO-URLLC}$ is not running:
3> inform upper layers about barring alleviation for mobile originating URLLC calls;
2> if timer $T_{MO-Signalling}$ is not running ($T_{MO-Signalling}$ is generic here and could be any of the specified $T_{MO-Signalling}$ timer type):
3> inform upper layers about barring alleviation for mobile originating signalling for the appropriate type mobile originating signalling type;

FIG. 45A

1> if timer $T_{MOCall}$ expires or is stopped ($T_{MOCall}$ is generic here and could be $T_{MOeMBB}$, $T_{MOmMTC}$, or $T_{MOURLLC}$);

2> if timer T302 is not running:

3> inform upper layers about barring alleviation for mobile originating calls for the appropriate call type i.e. eMBB, mMTC, URLLC or any other call that might be defined;

1> if timer $T_{MOSignalling}$ expires or is stopped ($T_{MOSignalling}$ is generic here and could be any of the specified $T_{MOSignalling}$ timer type);

2> if timer T302 is not running:

3> inform upper layers about barring alleviation for mobile originating signalling for the appropriate type mobile originating signalling type;

FIG. 45B

ACCESS CONTROL IN 5G NR

CROSS REFERENCE TO RELATED APPLICATIONS

This Application is a continuation of U.S. patent application Ser. No. 16/637,506 filed Feb. 7, 2020 which is the National Stage Application of International Patent Application No. PCT/US2018/045958, filed Aug. 9, 2018, which claims the benefit of U.S. Provisional Patent Application No. 62/542,977, filed Aug. 9, 2017, the disclosures of which are incorporated herein by reference in their entireties.

BACKGROUND

International Mobile Telecommunications (IMT) for 2020 and beyond (ITU-R M.2083) ("IMT 2020") is envisaged to expand and support diverse families of usage scenarios and applications that will continue beyond the current IMT. Furthermore, a broad variety of capabilities may be tightly coupled with these intended different usage scenarios and applications for IMT for 2020 and beyond. The families of usage scenarios for IMT for 2020 and beyond include: eMBB (enhanced Mobile Broadband), URLLC (Ultra-Reliable and Low Latency Communications) and mMTC (massive Machine Type Communication. These major use cases have diverse and conflicting service requirements in terms of latency, data rates, mobility, device density, reliability, UE battery life, network energy consumption, etc.

SUMMARY

In light of the multitude and variety of services and verticals that the 5G system is expected to support, efficient access control in the 5G network is key for a stable 5G network operation while ensuring that the available network capacity is allocated in a way that is consistent with the operator objective to get the most profit out of the provided services while delivering a superior customer experience and complying with regulatory requirements for prioritization of critical communications and emergency calls.

Disclosed herein are access category management objects configured for use in support of access category configurations of a user equipment (UE) by the core network (e.g., using a push approach) and in support of a UE query of access category configuration toward the core network (e.g., using a pull approach). Various methods for UE configuration with access categories are disclosed (e.g., through full enumeration of access category attributes or through use of access category components). Signaling methods by a radio access network of access barring parameters such as a signaling method for a partial list of access barring parameters and a signaling method for a full list of access barring parameters are disclosed. Access control parameters and an access control architecture in terms of access control function distribution within the UE protocol sublayers, solutions that address the impact of access control in a connected mode on a buffer status report, logical channel prioritization and flow control between the UE AS and UE NAS, and details regarding access barring checks are also disclosed.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 4 shows an example procedure for barring time and barring factors;

FIGS. 41A and 41B show an example procedure for access barring initiation;

FIG. 42 shows an example of access barring information in a system information block;

FIG. 43 shows another example of access barring information in a system information block;

FIGS. 44A and 44B show an example procedure for an access barring check;

FIGS. 45A and 45B show an example procedure for access barring control timers.

DETAILED DESCRIPTION OF ILLUSTRATIVE EMBODIMENTS

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 1A:
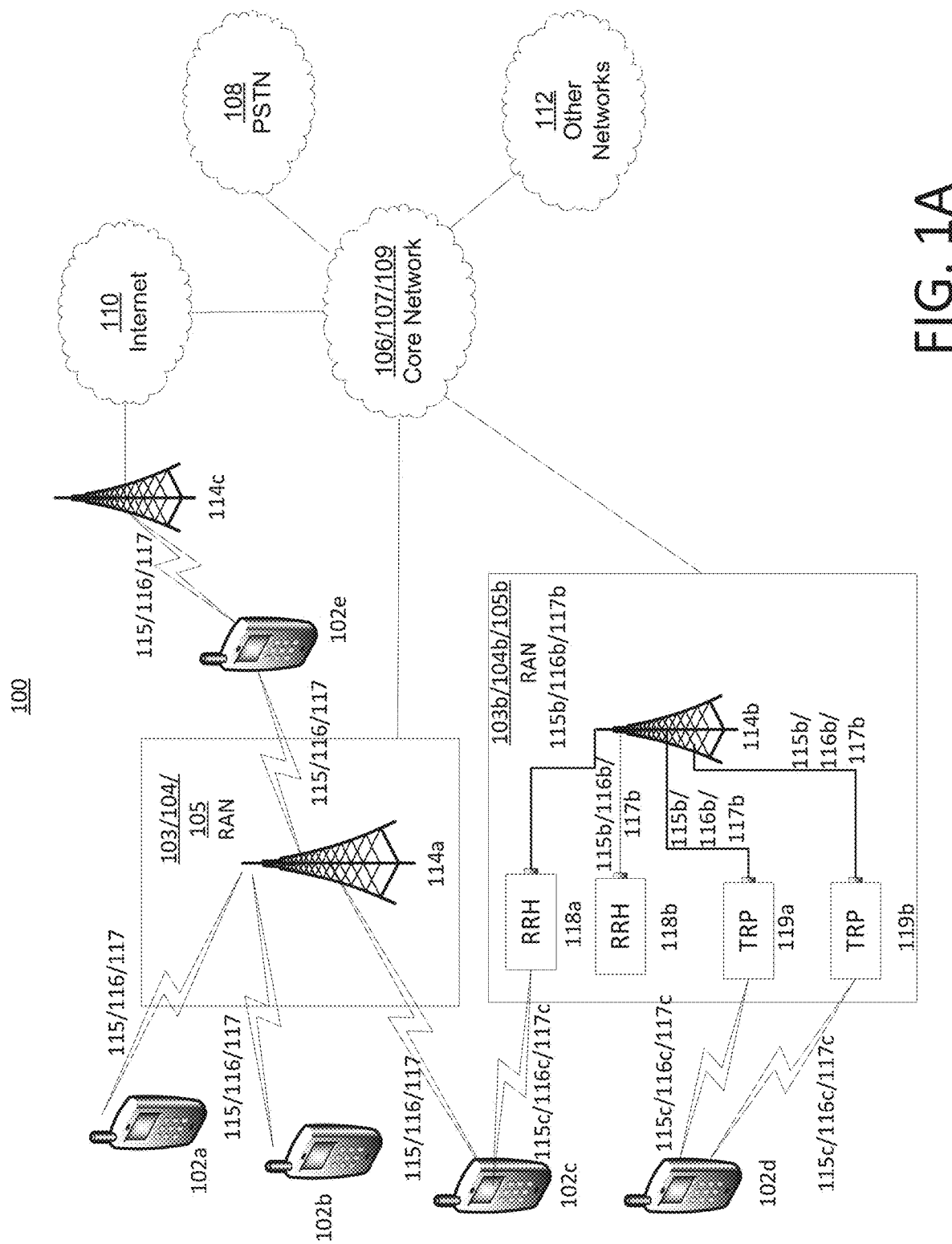
FIG. 1A illustrates one embodiment of an example communications system in which the methods and apparatuses described and claimed herein may be embodied.

FIG. 1A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1A-1E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, and 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1A may be configured to communicate with the base station 114a, which may employ a cellular-based radio technology, and with the base station 114c, which may employ an IEEE 802 radio technology.

Figure 1B:
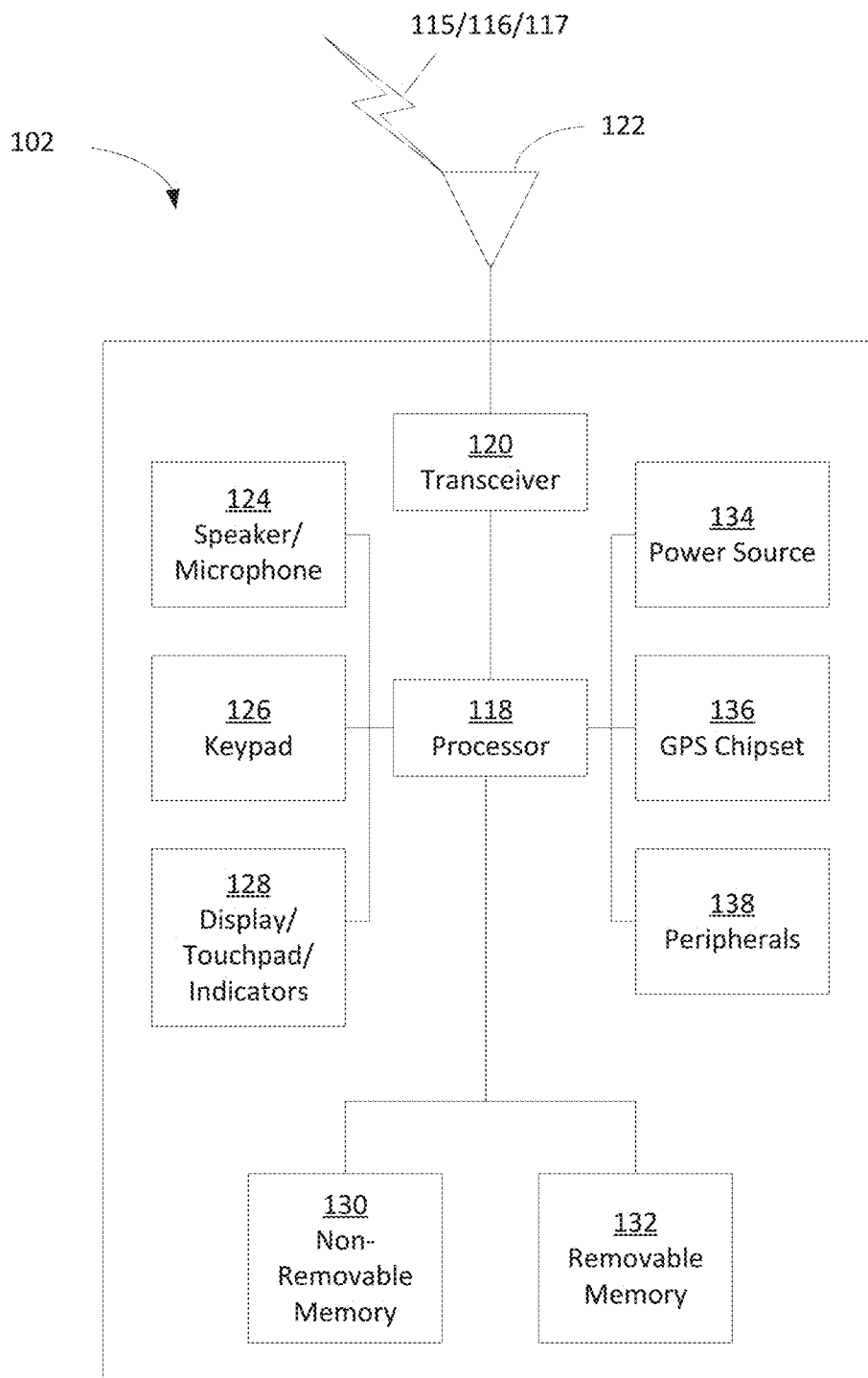
FIG. 1B is a block diagram of an example apparatus or device configured for wireless communications in accordance with the embodiments illustrated herein.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

FIG. 1B is a block diagram of an example apparatus or device configured for wireless communications in accordance with the embodiments illustrated herein, such as for example, a WTRU 102. As shown in FIG. 1B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 1C:
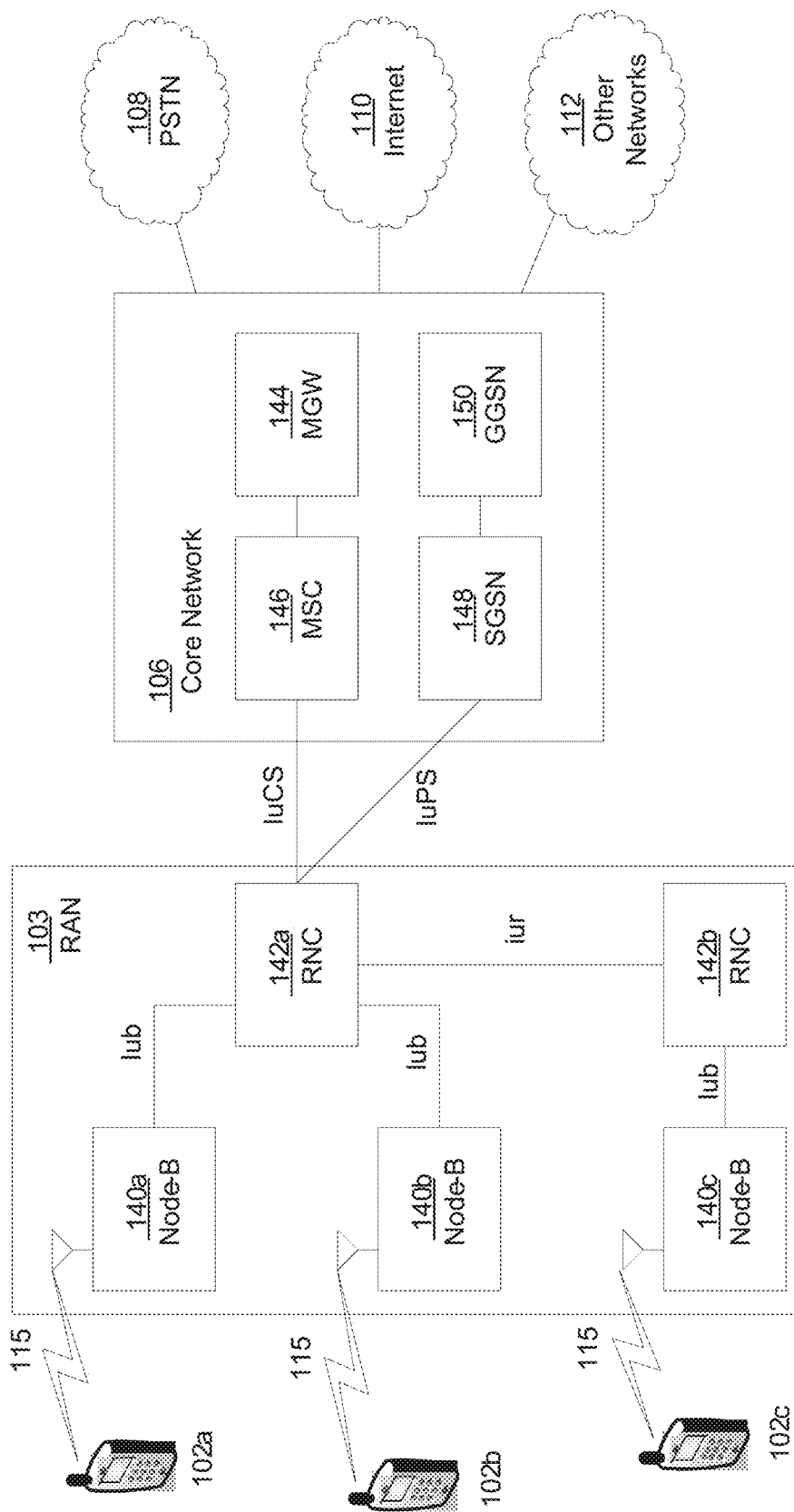
FIG. 1C is a system diagram of an example radio access network (RAN) and core network in accordance with an embodiment.

FIG. 1C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
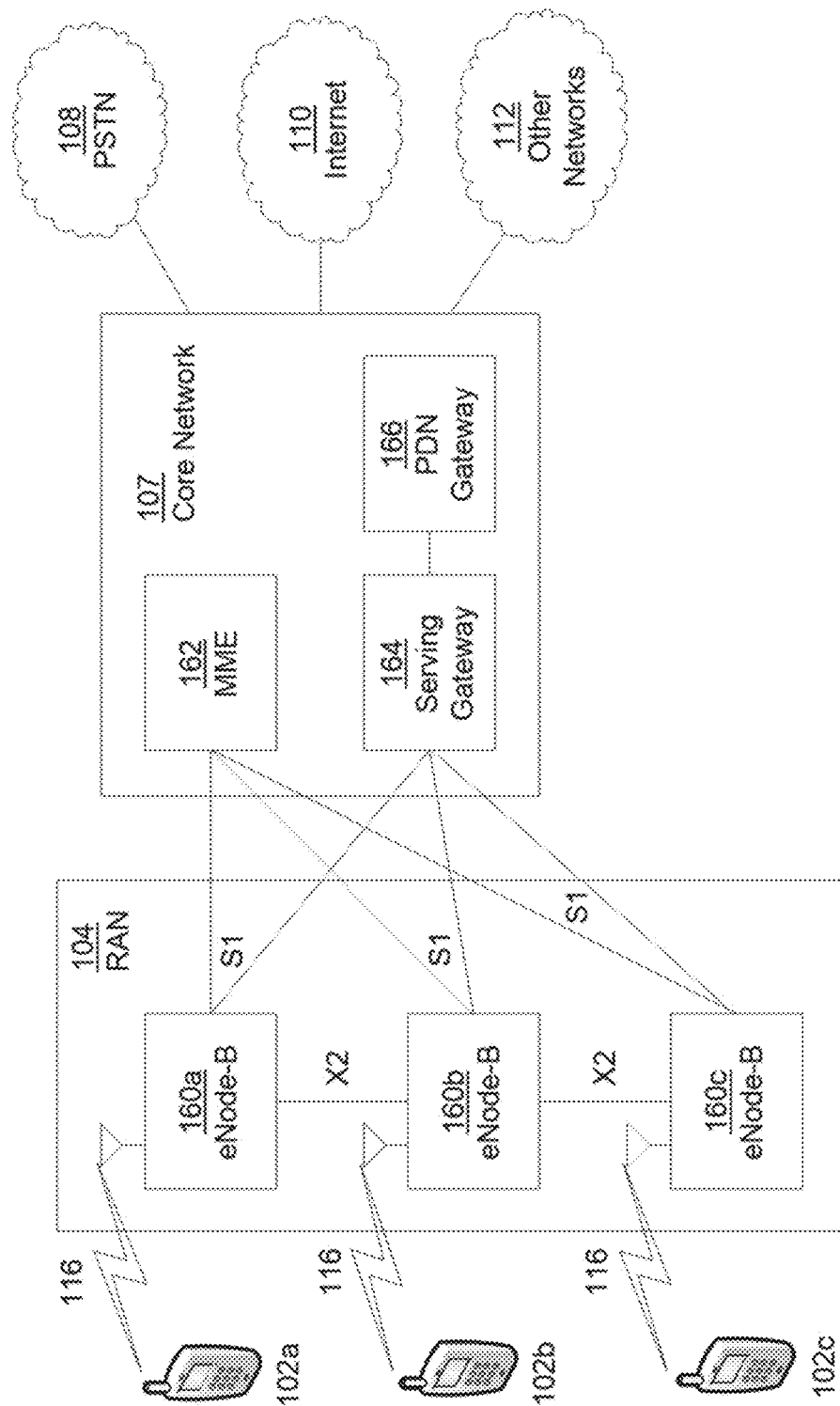
FIG. 1D is another system diagram of a RAN and core network according to another embodiment.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
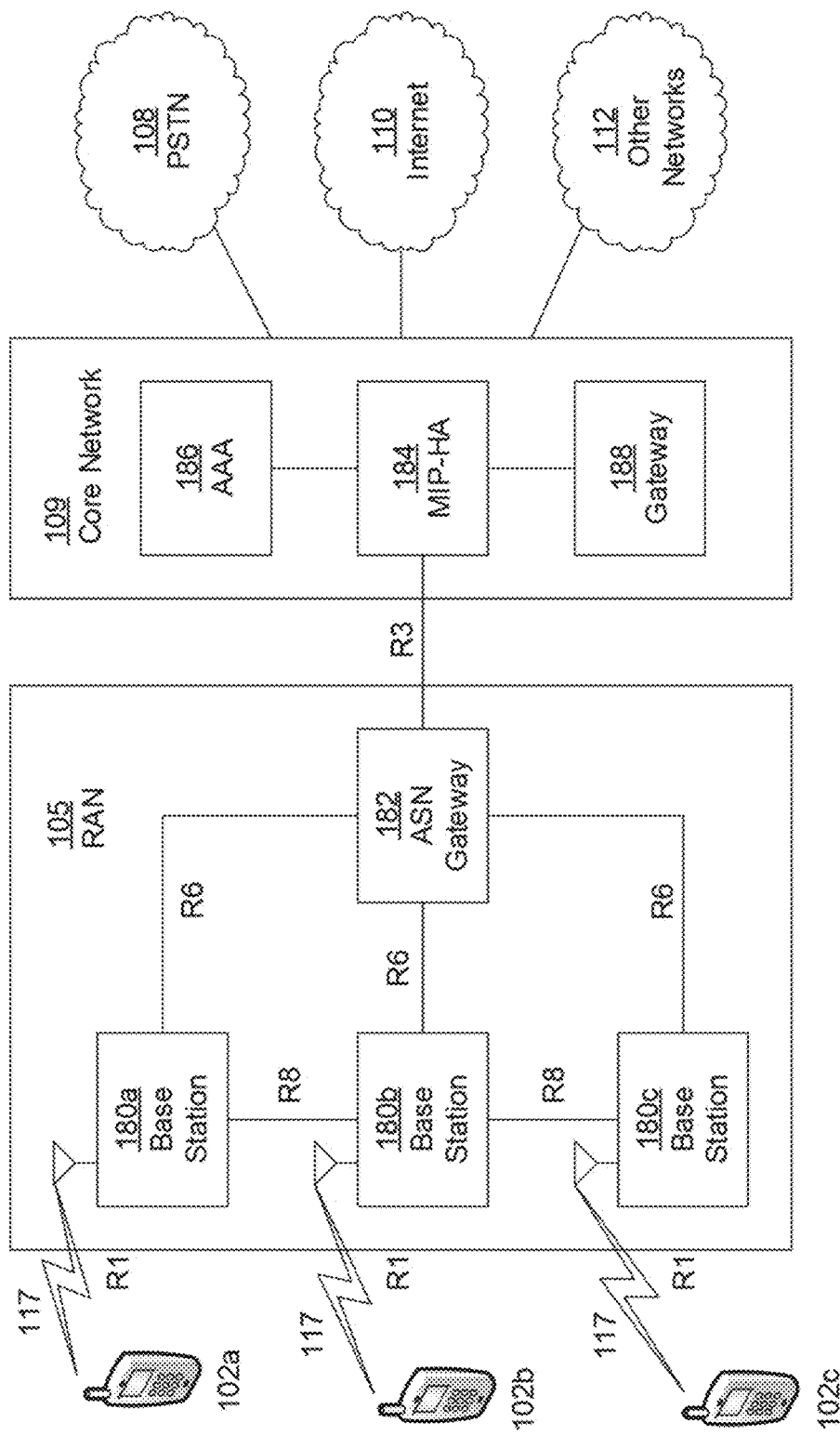
FIG. 1E is another system diagram of a RAN and core network according to another embodiment.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1A, 1C, 1D, and 1E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1A, 1B, 1C, 1D, and 1E are provided by way of example only, and it is understood that the subject matter disclosed and claimed herein may be embodied or implemented in any similar communication system, whether presently defined or defined in the future.

Figure 1F:
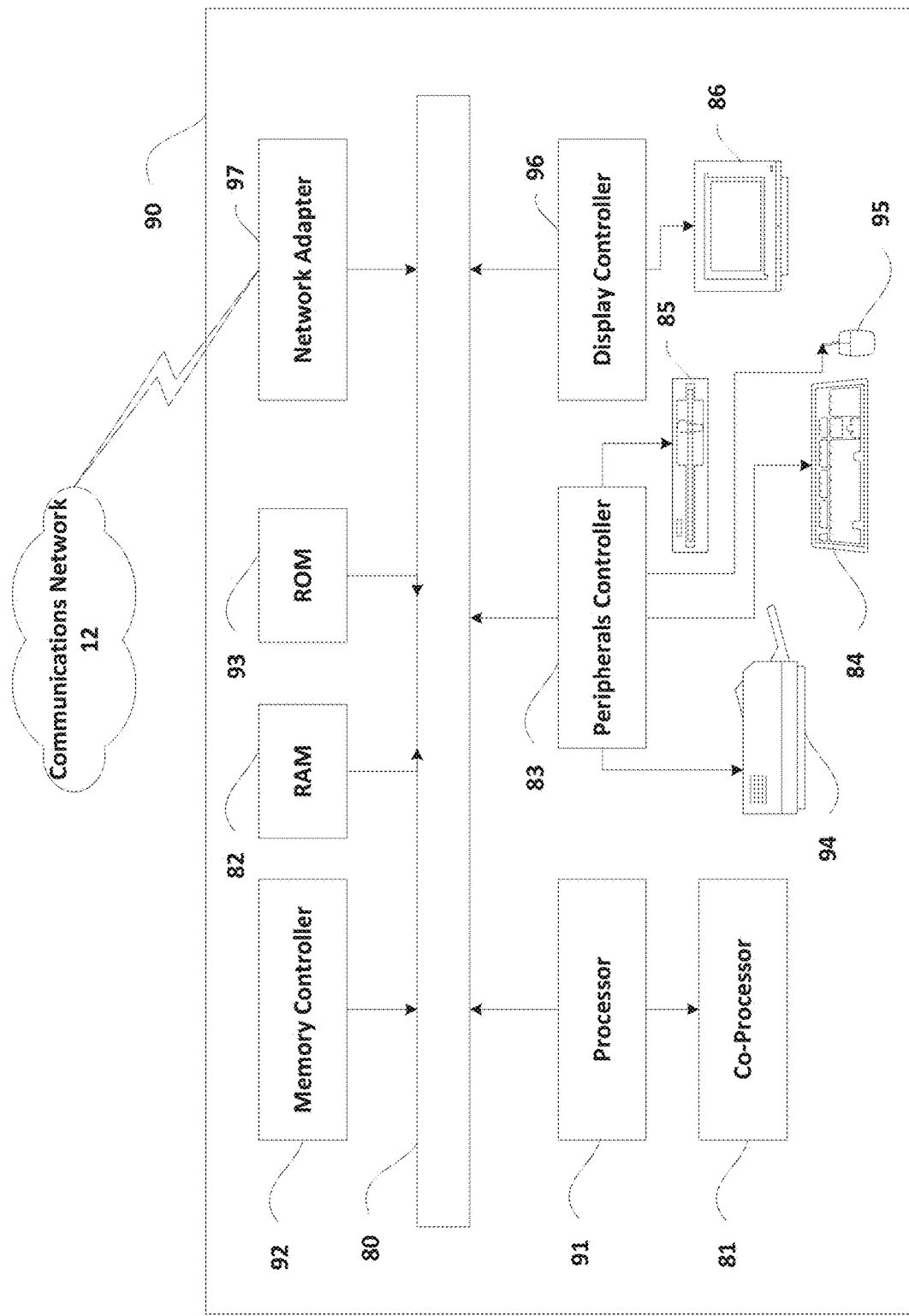
FIG. 1F is a block diagram of an exemplary computing system 90 in which one or more apparatuses of the communications networks illustrated in FIGS. 1A, 1C, 1D and 1E may be embodied.

FIG. 1F is a block diagram of an exemplary computing system 90 in which one or more apparatuses of the communications networks illustrated in FIGS. 1A, 1C, 1D and 1E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1A, 1B, 1C, 1D, and 1E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

In light of the diverse and conflicting service requirements that the next generation international mobile telecommunication system may support, 3GPP has identified a set of system architecture requirements. The following are examples of requirements that the architecture of the next generation system may support:

The RAN architecture may support tight interworking between the new RAT and LTE. High performing inter-RAT mobility and aggregation of data flows via at least dual connectivity between LTE and new RAT may be considered. This may be supported for both collocated and non-collocated site deployments;

The CN architecture and the RAN architecture may allow for C-plane/U-plane separation;

The RAN architecture may support connectivity through multiple transmission points, either collocated or non-collocated. The RAN architecture may enable a separation of control plane signaling and user plane data from different sites. The RAN architecture may support interfaces supporting effective inter-site scheduling coordination;

Different options and flexibility for splitting the RAN architecture may be allowed. The RAN architecture may allow deployments using Network Function Virtualization;

The CN architecture and the RAN architecture may allow for the operation of Network Slicing;

Support services that have different latency requirements between the UE and the Data Network;

Support of multiple simultaneous connections of an UE via multiple access technologies;

Support of transmission of IP packets, non-IP PDUs and Ethernet frames;

Support of network sharing; and

Allowance of independent evolutions of core network and RAN, and minimizing access dependencies.

One objective of access control in a communication system is to manage the load generated by the various traffics on the communication system. Access control solutions can be grouped in two main categories: proactive solutions which are typically applied in order to prevent overload in the system and reactive solutions typically applied when the system is overloaded. Radio access barring control can be categorized into the following two methods:

Access Class control method (control in mobile terminal): before a mobile terminal sends the connection request to the base station, the mobile terminal may identify the type of call and determine whether the connection request for the call should be barred; and RRC Connection Reject method (control in the base station): The base station may identify the type of signals that triggers the connection request sent from mobile terminals and decide whether this request should be rejected (by sending RRC CONNECTION REJECT) or accepted.

Access Class Control according to TS 22.011 allows for the possibility to prevent UE's from making access attempts or responding to pages. The basis for many LTE access control functionalities is a division of UEs into allocated populations (0-9) and special categories (11-15), so-called access classes. All UEs may be members of one out of ten randomly allocated mobile populations (e.g., access Classes 0 to 9). The population number may be stored in the SIM/USIM. In addition, UEs may be members of one or more out of 5 special categories (e.g., access Classes 11 to 15), also held in the SIM/USIM. These are allocated to specific high priority users as follows. The existing access classes are enumerated below. Note that the enumeration is not meant as a priority sequence.

Class 15: PLMN Staff; (Home PLMN only if the EHPLMN list is not present or any EHPLMN);

Class 14: Emergency Services; (Home PLMN and visited PLMNs of home country only. For this purpose, the home country is defined as the country of the MCC part of the IMSI);

Class 13: Public Utilities (e.g. water/gas suppliers); Home PLMN and visited PLMNs of home country only. For this purpose, the home country is defined as the country of the MCC part of the IMSI;

Class 12: Security Services; Home PLMN and visited PLMNs of home country only. For this purpose, the home country is defined as the country of the MCC part of the IMSI;

Class 11: For PLMN Use (Home PLMN only if the EHPLMN list is not present or any EHPLMN);

Class 10: For emergency calls; and

Class 0-9: Home and Visited PLMNs.

Figure 2:
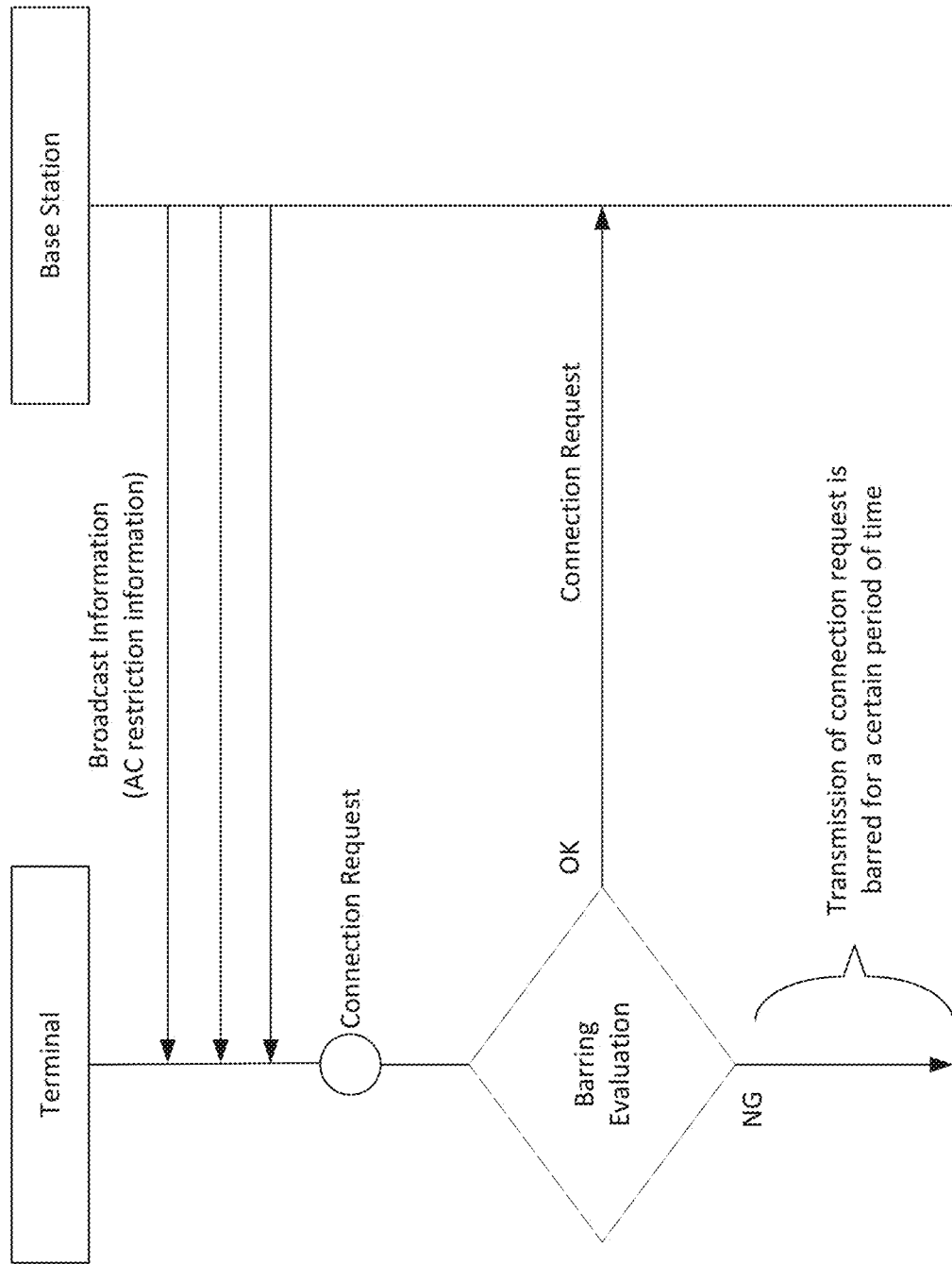
FIG. 2 shows an example flow diagram of an access class control method.

In access class control, the base station broadcasts information containing control data (e.g. barring rate, mean access barring time value in seconds) set for each Access Class (AC) so that all terminals in the coverage area can receive the information simultaneously and perform access control, as shown in FIG. 2. In general, the purpose of applying access class control to AC 0 to 9 is to protect network equipment and to optimize communications traffic, while applying access class control to AC 10 and AC 11 to 15 such that no barring is applied is used to achieve secure communication for emergency and high priority communications. Several Access class control methods based on the control flow depicted in FIG. 2 have been specified in LTE, and are discussed further herein.

Access class barring (ACB) is an access control mechanism that is only applicable in RRC idle mode. ACB is performed in the UE RRC layer. Based on the barring rate information broadcasted by the network, the terminal determines whether the connection request is allowed to be transmitted based on its AC. Furthermore, there are two types of packet data transmission controllable with ACB: transmission of the connection request for general packet calls including Voice over LTE VoLTE, and emergency calls. A barring parameter for signaling (Mobile Originated Signaling e.g. MO-Signaling) separate from the barring parameter for ordinary data signaling (Mobile Originated Data e.g. MO-Data) is defined. Based on barring rate information broadcasted by the network, the terminal determines whether the connection request is allowed to be transmitted based on its AC.

Service Specific Access Control (SSAC) is an access class control method that is applicable in both RRC idle mode and RRC connected modes. In this method, SSAC is performed in NAS IMS layer. The SSAC access control feature allows independent access control for Multi Media Telephony (MMTEL services such as VoLTE and Video over LTE (ViLTE). The SSAC feature also applies in RRC connected mode, because even if the terminal is already connected to the network, there may be a need to access control background signaling traffic (e.g., for background synchronization traffic between the IMS application client in the UE and the IMS server). Based on the SSAC specific barring rate information broadcasted by the network, for either IMS voice, IMS video or IMS SMS, the terminal determines whether the connection request is allowed to be transmitted based on its AC.

It should be noted that in order to prioritize MMTEL services, a mechanism to skip ACB feature for a connection request associated with MINITEL services call types is discussed herein. The idea is to void MMTEL services being subject to double access barring (e.g. barring at the regular ACB level then at the SSAC level).

For LTE terminals that do not support the aforementioned VoLTE functions, voice services are provided through Access Control for Circuit Switch FallBack (CSFB). ACB for CSFB is defined to restrict connection requests for CSFB call when terminal is still camping in the LTE network. This access control mechanism applies to UEs in RRC idle mode. It should be noted that in order to prioritize CSFB calls when ACB is enabled and avoid CSFB calls being barred as a result of the ACB feature as described herein, access barring control specific to CSFB has been introduced in LTE. Based on the CSFB specific barring rate information broadcasted by the network, the terminal determines whether the connection request is allowed to be transmitted based on its AC.

Application specific Congestion Control for Data Communication (ACDC) is an access control mechanism for the operator to allow/prevent new access attempts from particular, operator-identified applications in the UE in idle mode. This mechanism applies only to UE in RRC idle mode. The home network may configure a UE with at least four and a maximum of sixteen ACDC categories to each of which particular, operator-identified applications are associated. When configured, the access control barring configuration is configured on ACDC category basis, when absent, access to the cell is considered as not barred for the ACDC category. Based on ACDC category specific barring rate information broadcasted by the network, the terminal determines whether the connection request is allowed to be transmitted based on its AC.

Extended Access Class Barring (EAB) is a type of access barring control method that may be applicable only to UEs in RRC Idle mode. Extended Access Barring (EAB) is a mechanism for the operator(s) to control Mobile Originating access attempts from UEs (generally Machine Type Communication (MTC) devices) that are configured for EAB in order to prevent overload of the access network and/or the core network. In congestion situations, the operator can restrict access from UEs configured for EAB while permitting access from other UEs. UEs configured for EAB are considered more tolerant to access restrictions than other UEs. When an operator determines that it is appropriate to apply EAB, the network broadcasts necessary information to provide EAB control for UEs in a specific area. The network broadcast a bitmap that includes ACs (possibly 0 to 9) for which extended access baring applies, together with the category (category a, b or c) of the UEs for which EAB applies. A UE that is configured for low access priority and Extended Access Barring may be also configured with a permission for an override of low access and Extended Access Barring priority restrictions. This configuration is primarily for usage by applications or users that most of the time can tolerate being deferred due to low access priority when competing with other UEs for accessing network resources, but occasionally the application or user needs access to the network also when the low access priority configuration would prevent getting access. For getting network access also during low priority access or Extended Access Barring restriction conditions, the user or application (upper layers in UE) may request the UE to initiate the activation of a PDN connection without low access priority.

Figure 3:
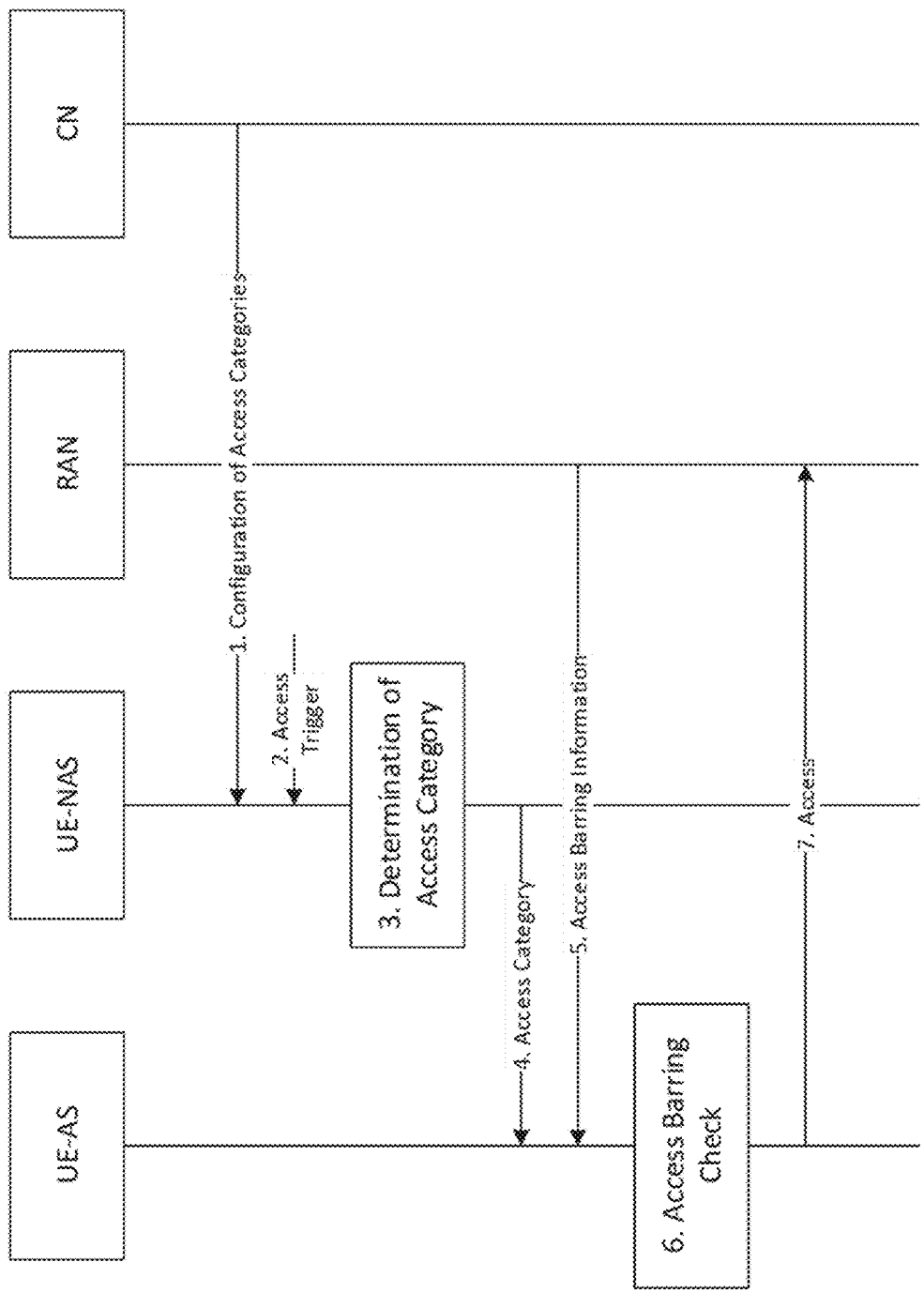
FIG. 3 shows an example flow chart illustrating the principles of access control.

The RAN2 working group of 3GPP is considering a unified access control framework (e.g., one common framework for radio access control based on access category) where each UE will use a default or pre-configured access category to evaluate whether or not it is allowed to access the network (e.g. while in RRC idle mode or RRC inactive mode) or transmit to the network (e.g. while in RRC connected mode) based on access barring configuration information signaled by the network. An exemplary access control flow in support of this unified approach is depicted in FIG. 3 (see R2-1706505, Access Control for NR, 3GPP TSG-RAN WG2 NR #2, Ericsson). This example assumes the actual access control is performed in UE AS (e.g., step 6 in FIG. 3).

The following is a short description of the signaling flow as captured in R2-1706505:

At step 1, the core network configures access categories in the UE. This configuration includes mapping rules related to combinations of event types, applications, services or other aspects to access categories. If needed, also the SIM-stored Access Class(es) (0-15) can be used in the mapping rules. These mapping rules are configured from the core network using NAS signaling. This is typically dedicated signaling in order to have a UE-specific configuration and is typically performed during attach and e.g. registration area update. The result of the configuration of categories in the UE can be illustrated as a table, including both the configuration rules and the resulting category.

TABLE 1

Example of access category configuration in UE

| Access Class | Slice | Application | Call type | ... | Access category |
|---|---|---|---|---|---|
| * | 7 | * | * | | 3 |
| * | * | 3 | * | | 5 |
| 10 | * | * | Emergency call | | 10 |
| * | * | * | originating signaling | | 2 |

This example illustrates access category dependent on Access Class, Slice, Application and Call Type but it is not necessarily the case that all aspects need to be considered. As soon as an access is related to application 3, it may, for example, always result in Access Category 5, irrespective of other input. The configured access categories are stored in the UE.

At step 2, a trigger to access the network occurs in the NAS layers in the UE.

At step 3, the NAS determines the access category for this particular access, based on the UE configuration in step 1.

At step 4, when requesting to setup a connection, NAS provides the determined access category to AS (RRC layer).

At step 5, an access control barring indication is received. The RAN indicates by system information whether an access category is barred or not (e.g., using barring probability factor and barring time similar to ACDC or bitmap similar to EAB or something else). This signaling is part of the RRC layer. How these parameters are realized and delivered is further discussed in R2-1706509, Signaling of Access Control Parameters, 3GPP TSG-RAN WG2 NR #2, Ericsson, and further illustrated in FIG. 4.

At step 6, an access barring check occurs. Before making an access attempt (random access), the AS layers in the UE uses the determined access category together with the broadcasted system information to check whether the particular access category is barred. This is typically part of the RRC layer.

At step 7, if the AS layers in the UE determines that this particular access is not barred, it performs the access attempt.

Table 2 summarizes the allocation of the different functions for access control.

TABLE 2

Allocation of access control functions

| Function | UE-AS | UE-NAS | RAN | Core network |
|---|---|---|---|---|
| Configuration of access categories | | | | X |
| Storage and maintenance of access categories | | X | | |
| Determination of access category | | X | | |
| Indication of barring for each access category | | | X | |
| Barring check | X | | | |

In light of the 5G NR requirements and the multitude and variety of services and verticals the 5G system is expected to support, an efficient access control in 5G network is needed for a stable 5G network operation while ensuring the available network capacity is allocated in a way that is consistent with the operator objective to get the most profit out of the provided services while delivering a superior customer experience, and complying to regulatory requirements for prioritization of critical communications and emergency calls.

As discussed herein, the RAN2 working group of 3GPP is considering a unified access control framework (e.g., one common framework for radio access control based on access category) where each UE will use a default or pre-configured access category, to evaluate whether or not it is allowed to access the network (e.g., while in RRC idle more or RRC inactive mode) or transmit to the network (e.g., while in RRC connected mode) based on access barring configuration information signaled by the network.

One issue that needs to be addressed is the design of an efficient signaling procedure for AC barring configuration. Considering the large set of services and verticals the 5G system is expected to support and the forward looking requirement on 5G design, numerous access category mapping rules to combinations of attributes such as event type, applications, services, slice, call type, device category, QoS Classification Index (QCI), QoS Flow, or other aspects to defining access categories, could be considered leading to the potential of a large number of access categories. The signaling of these categories together with their corresponding radio access barring configuration parameters could represent a significant overhead if not properly designed.

Furthermore, the configuration of the UE by the network with access categories on itself could represent signaling overhead challenges and therefore the design of the signaling for configuring the UE with access categories needs to be carefully considered. For example, performing the configuration of access categories in the UE may require signaling from the Core Network. The configuration may then be used when the UE makes subsequent access attempts. This typically implies that during mobility in idle and inactive, the UE should be able to use the configuration previously obtained from the Core Network. To avoid triggering of additional signaling, it seems reasonable to try to maintain rules for access category mapping and not frequently change them. However, methods for determining the validity of the stored configuration of access categories by the UE is a problem that should be addressed.

Another issue to be addressed is the problem of access barring control for UEs in an RRC CONNECTED mode. Solutions for access control in control plane and in user plane for a UE in an RRC CONNECTED state need to be devised. For example, assume that there is access control in the user plane and that there is an uplink data on a QoS flow belonging to an existing PDU session to transmit. Such uplink transmission may be subject to access control. If the uplink transmission is not possible as a result of an access control decision, then the UE behaviors may need to be specified for the following:

Buffer Status Reporting in the presence of uplink transmission restriction by access control;

Scheduling Request handling in the presence of uplink transmission restriction by access control;

Logical Channel Prioritization in the presence of uplink transmission restriction by access control; and/or Flow control between the UE NAS and UE AS if the access control is implemented by the AS.

In addition, access control in idle mode and inactive mode may also need to be addressed.

Methods and systems are disclosed for access category configuration signaling.

A UE may be configured with two types of access categories. One type of access categories may be access categories defined in the specification. These access categories may include special access categories for use by PLMN staff, Emergency services, public utilities (e.g. water/gas suppliers), security services, etc. These type of access categories that may be specified in the standards including special access categories may be referred to herein as default access categories. The other type of access category the UE may be configured with may be access categories that are not specified in the standards. The definition of such as access categories may be left to implementation and deployment specific scenarios, providing flexibility to the operators for service differentiation offerings. For example, the 5G specification may define a range of access categories and potentially access category identifiers. One part of the access category identifiers, the corresponding access category and the details of their use and attributes may be specified, while the second set of access categories that forms the other part of the specified access category range may be left to implementation or deployment specific scenarios in terms of how their meaning and how they are used. This second type of access categories may be referred to herein as "operator defined access categories."

An access category may be defined based one or more of the following attributes or components: Access Class, Slice, Application, OS, Call Type, Traffic Flow or Packet Flow, Service Data Flow, QoS Flow, QCI, Subscription Profile e.g. platinum users, gold users, silver users and bronze users.

Figure 5:
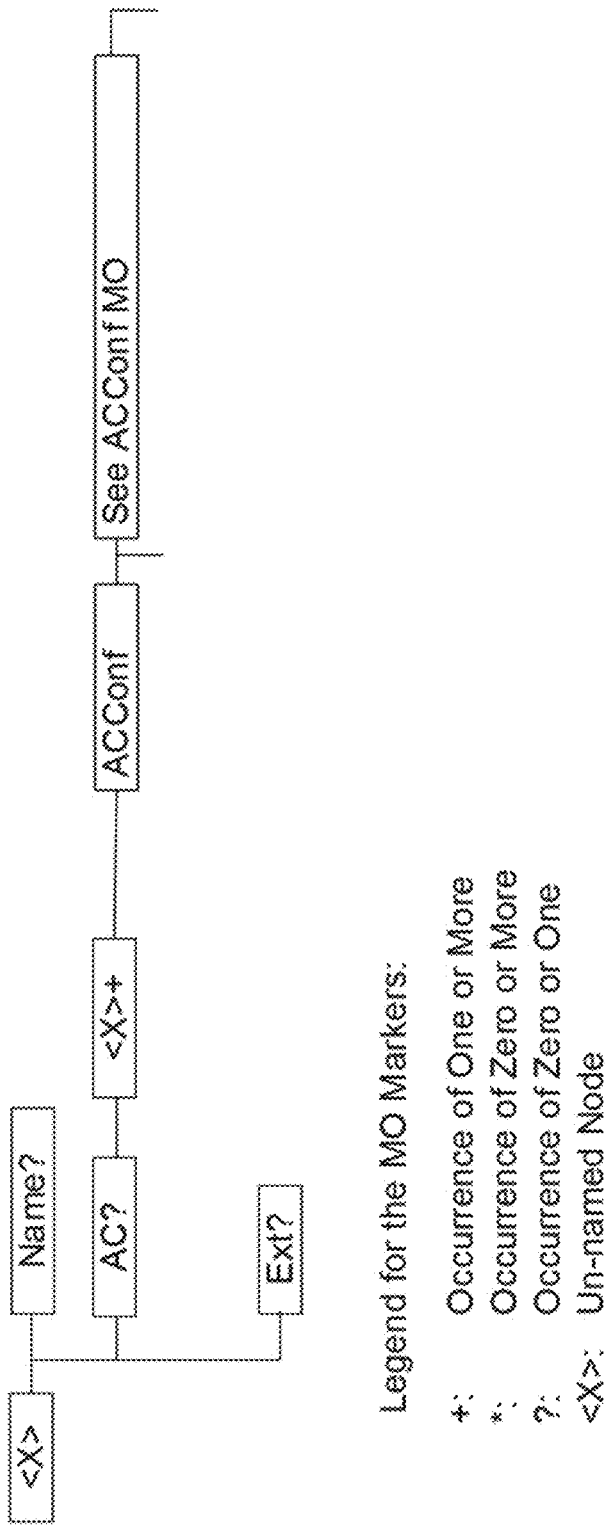
FIG. 5 shows an example access category management object.

A possible Management object of the access category configuration using the Open Mobile Alliance Device Management (OMA DM) protocol is illustrated in FIG. 5. The configuration of the nodes of the access category management objects are depicted in FIGS. 6-14.

Figure 6:
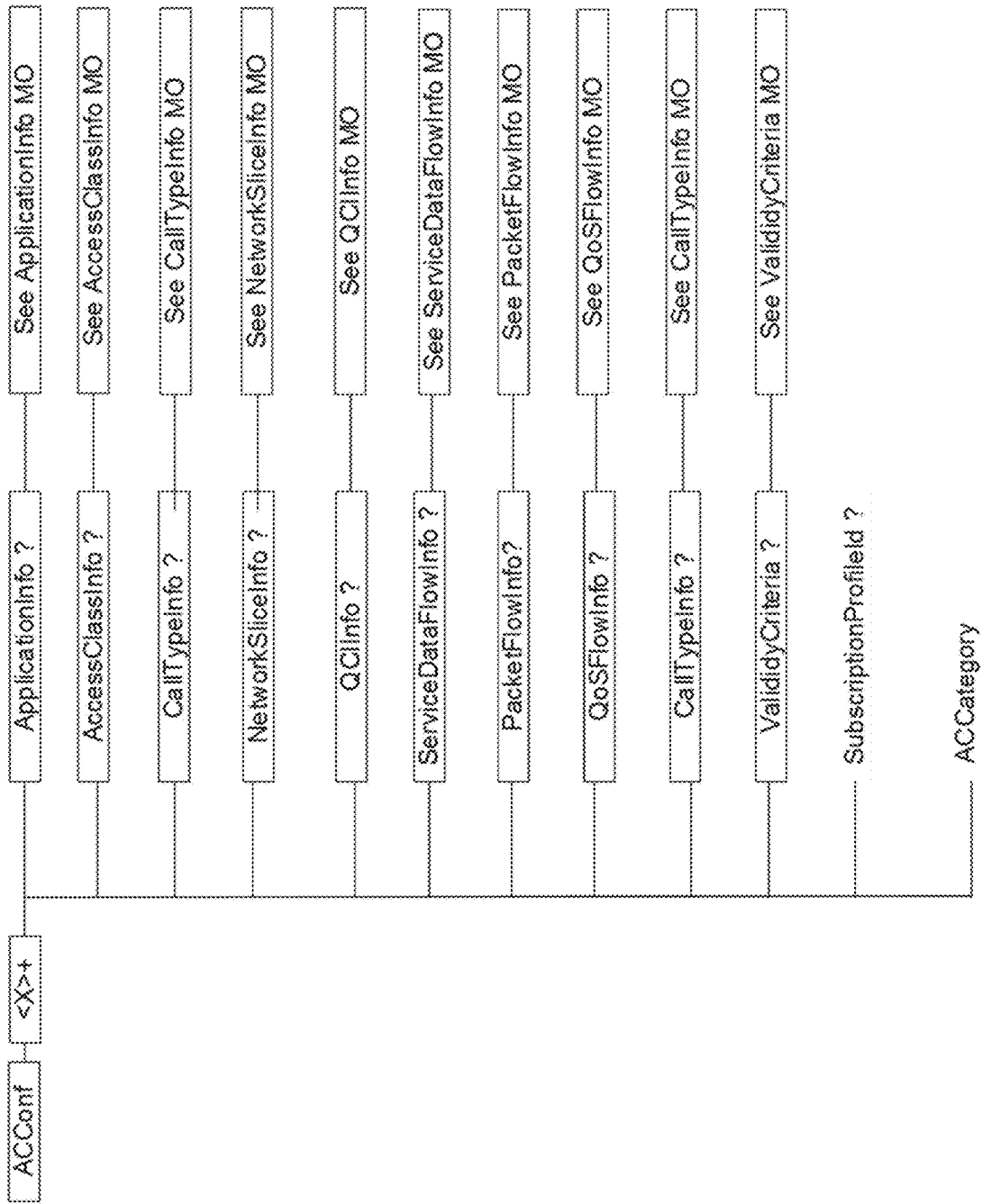
FIG. 6 shows an example access category configuration.
Figure 7:
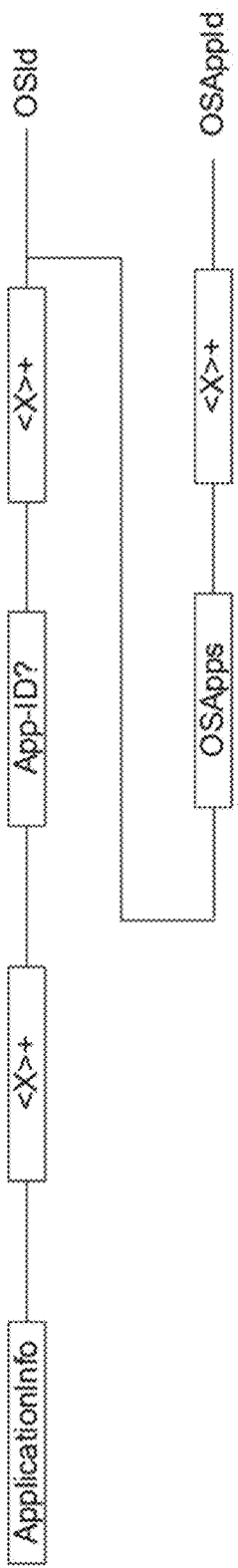
FIG. 7 shows an example application information configuration.
Figure 8:
FIG. 8 shows an example access class configuration.
Figure 9:
FIG. 9 shows an example call type configuration.
Figure 10:
FIG. 10 shows an example network slice configuration.
Figure 11:
FIG. 11 shows an example QoS flow configuration.
Figure 12:
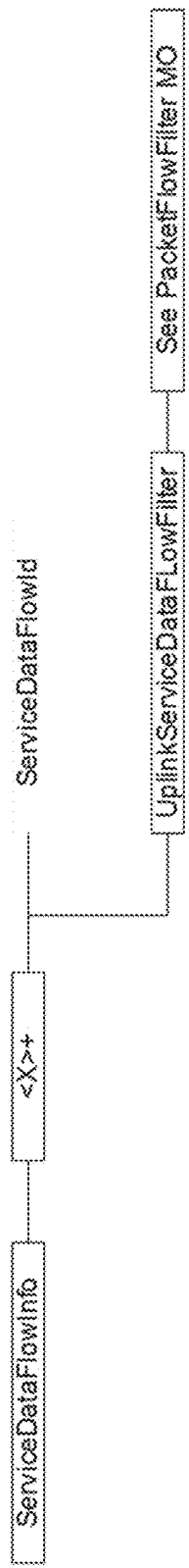
FIG. 12 shows an example service data flow configuration.
Figure 13:
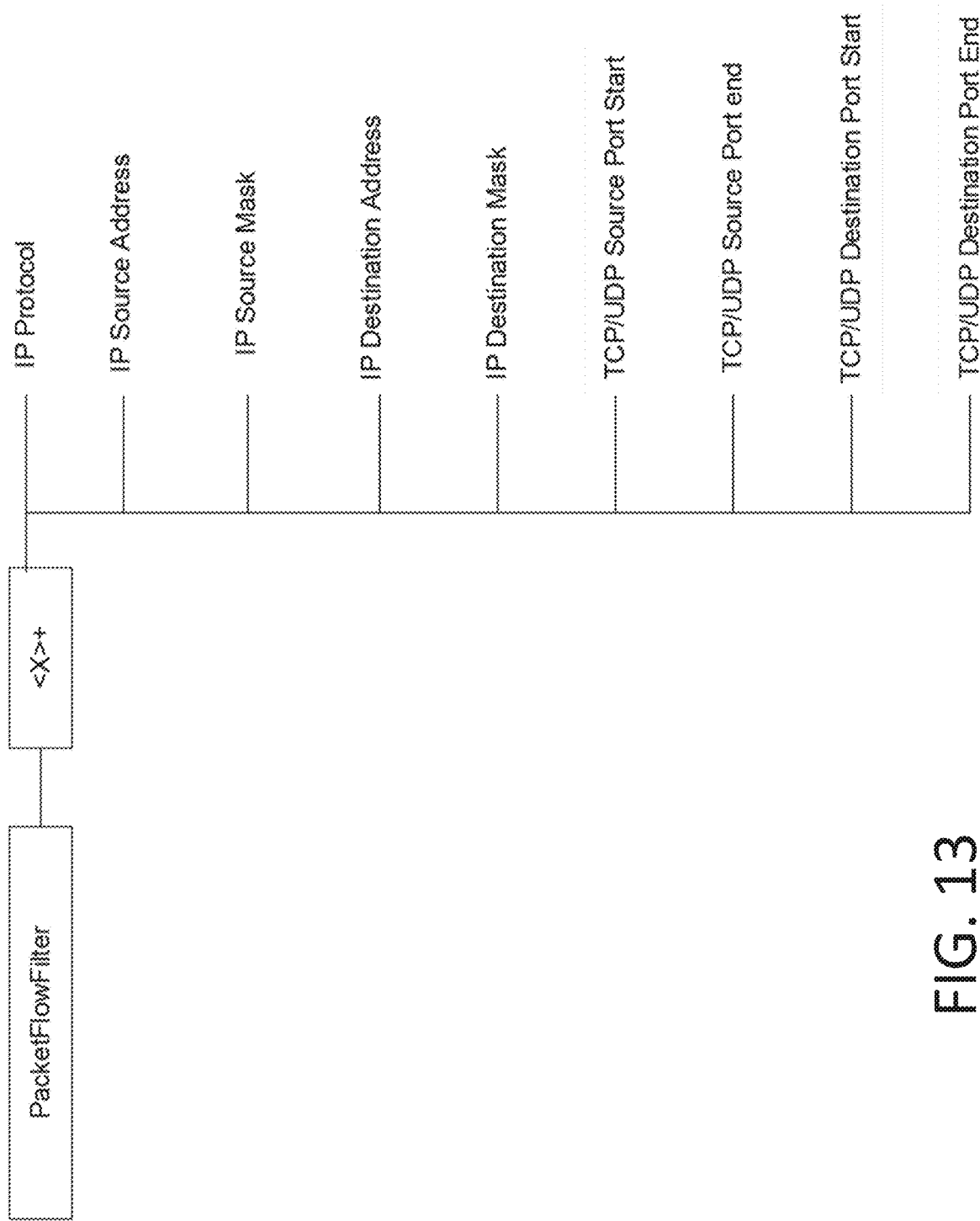
FIG. 13 shows an example packet flow filter configuration.
Figure 14:
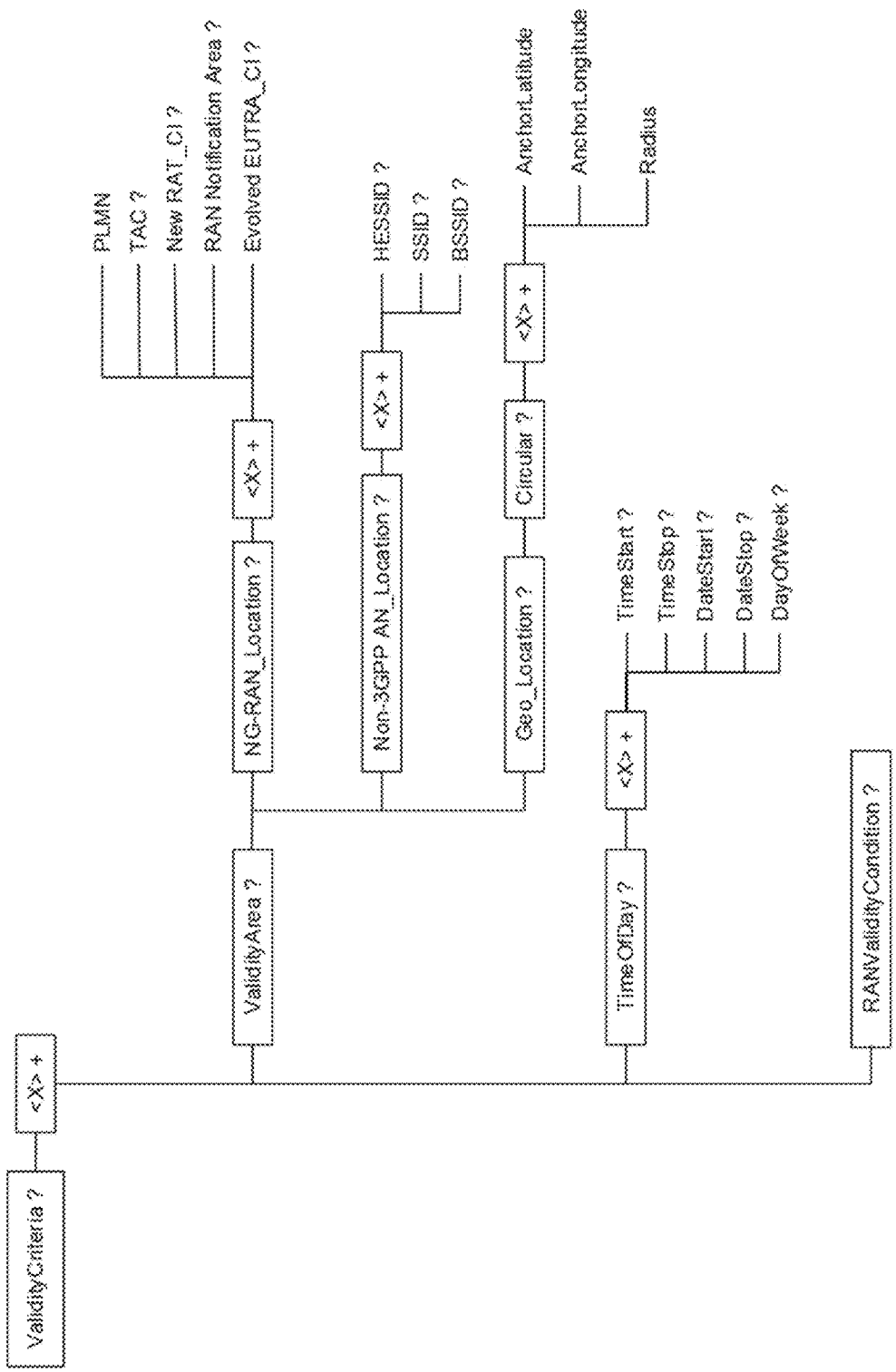
FIG. 14 shows an example access category validation configuration.

Another aspect of access category configuration as illustrated in FIG. 6 relates to the validity of the stored access category configuration in the UE. The access category configuration information may include validity criteria configuration information. One or more of the following criteria may be used to define and configure the validity rules for one or more access categories: validity area, time of the day, Radio Access Network conditions as it relates to radio signal quality radio signal strength thresholds criteria. A possible management object of the validity criteria the UE may use to evaluate the validity of stored access category configuration is depicted in FIG. 14.

Before the UE transmits access category information to the UE entity that performs access barring check, the UE may verify that the access category is still valid (e.g., the access category meets the validity criteria). For example, if access barring check is performed by the UE Access Stratum (AS) and the UE Non Access Stratum (NAS) or entity within that the layer is configured with access category information, the UE NAS may verify the access category validity before providing the access category information to the AS for access barring check as described herein. When an access category is no longer valid, the UE may not use that access category in an access barring check.

Figure 15:
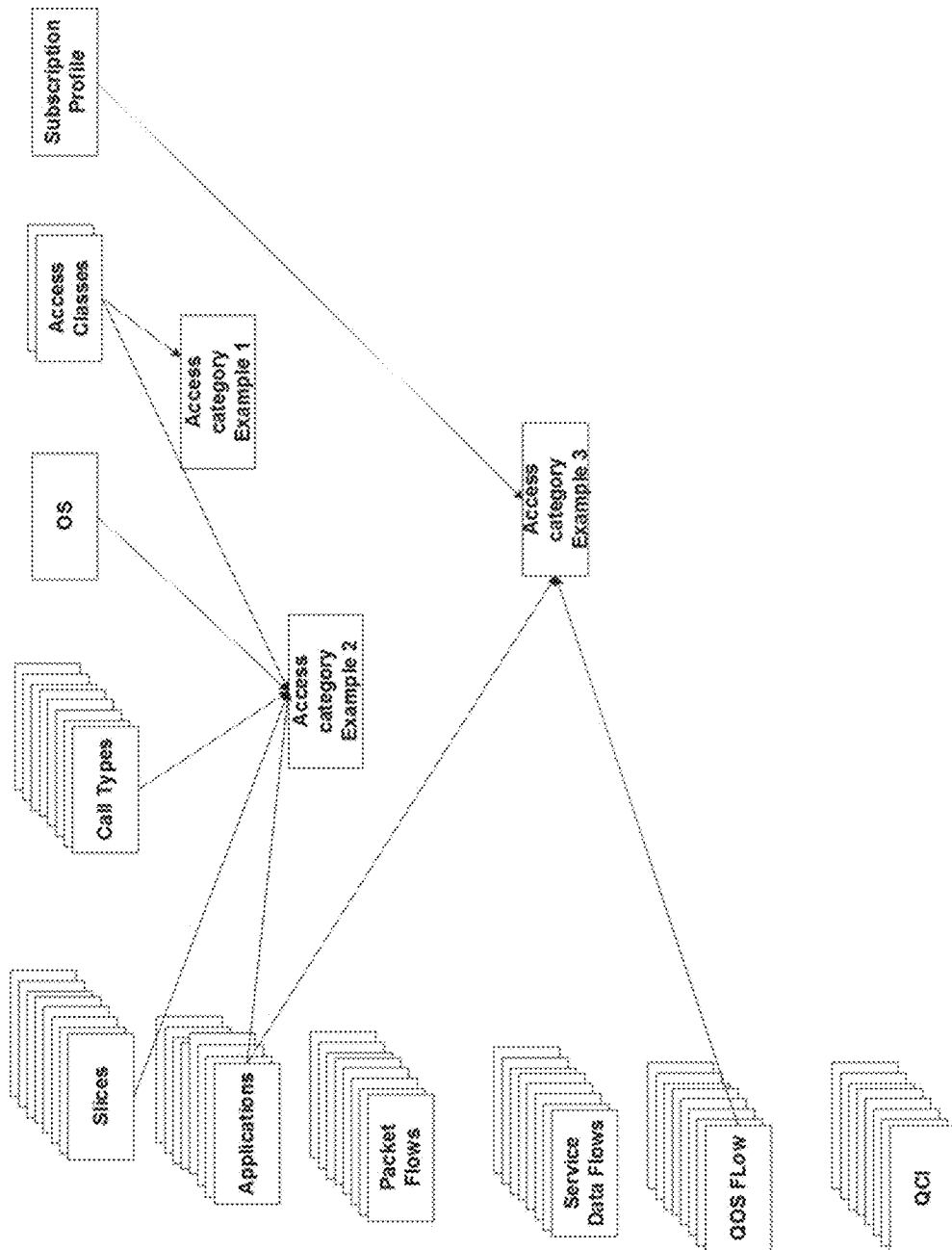
FIG. 15 shows an example block diagram of an access category based on access category components.

In one example, an Access Category Configuration based on Access Category Components is disclosed. An access category may consist of one or more access category components. As illustrated in FIG. 15, an access category component may be one or more of the following: Access Class, Slice, Application, OS, Call Type, Traffic Flow or Packet Flow, Service Data Flow, QoS Flow, QCI, Subscription Profile (e.g., platinum users, gold users, silver users and bronze users). For default access categories, the detail of the access category components may be specified in the standards, as discussed herein. The UE may be configured by the core network with one or more access categories, where each access category consists of one or more access category components. In another example, the UE may be configured by the radio access network (e.g. gNB) with one or more access categories where each access category consists of one or more access category components.

Figure 16:
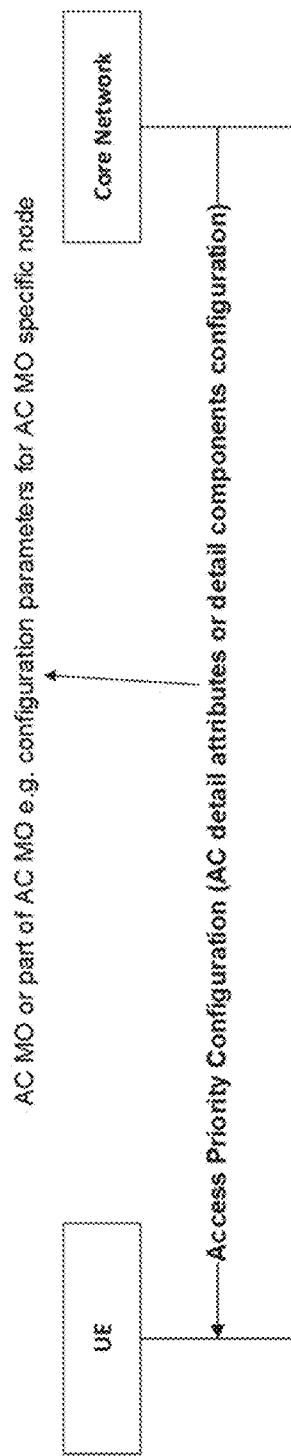
FIG. 16 shows an example UE configuration showing details of AC attributes or AC components of access categories.

In an example, each access category component may be represented by a bitmap where a given value of the bitmap corresponds to one instance of the access category component. For each access component, the UE may be configured first with a list of the possible values or instances of the access attributes or components that correspond to the potential access categories the UE may eventually be configured with by the core network, as shown in FIG. 16.

Figure 17:
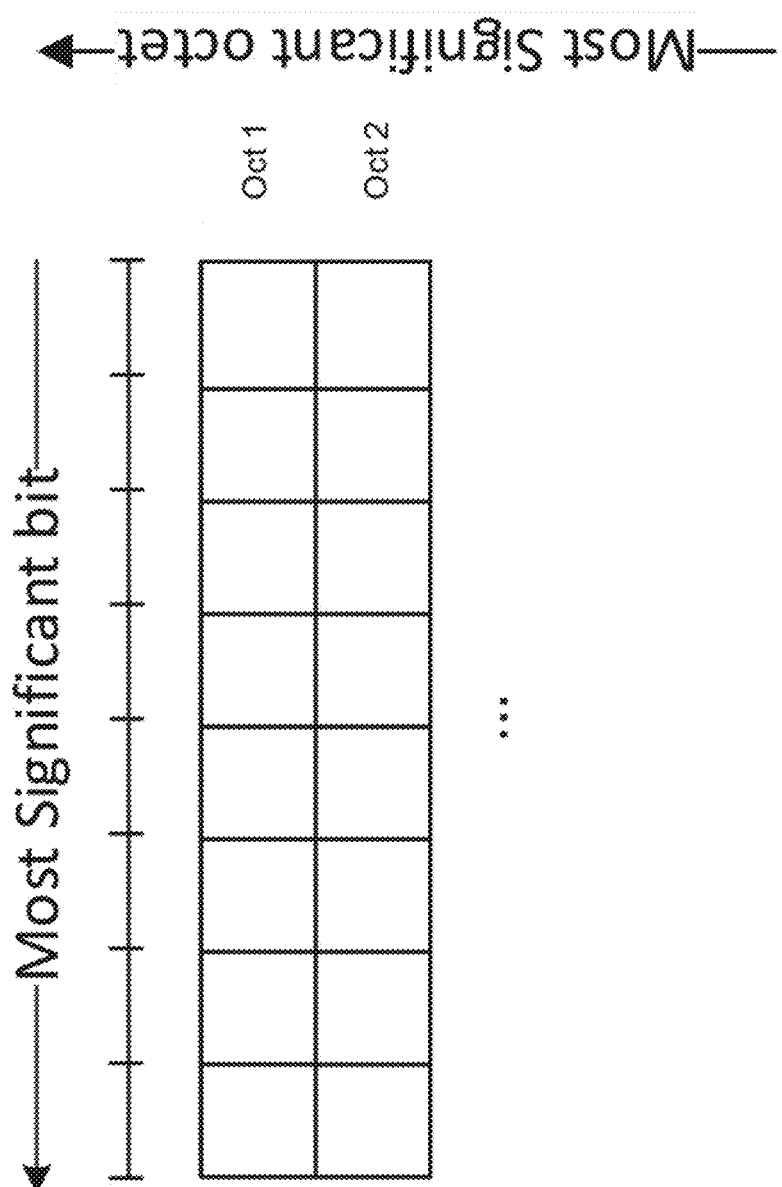
FIG. 17 shows an example of a bitmap representation of an access component.
Figure 18:
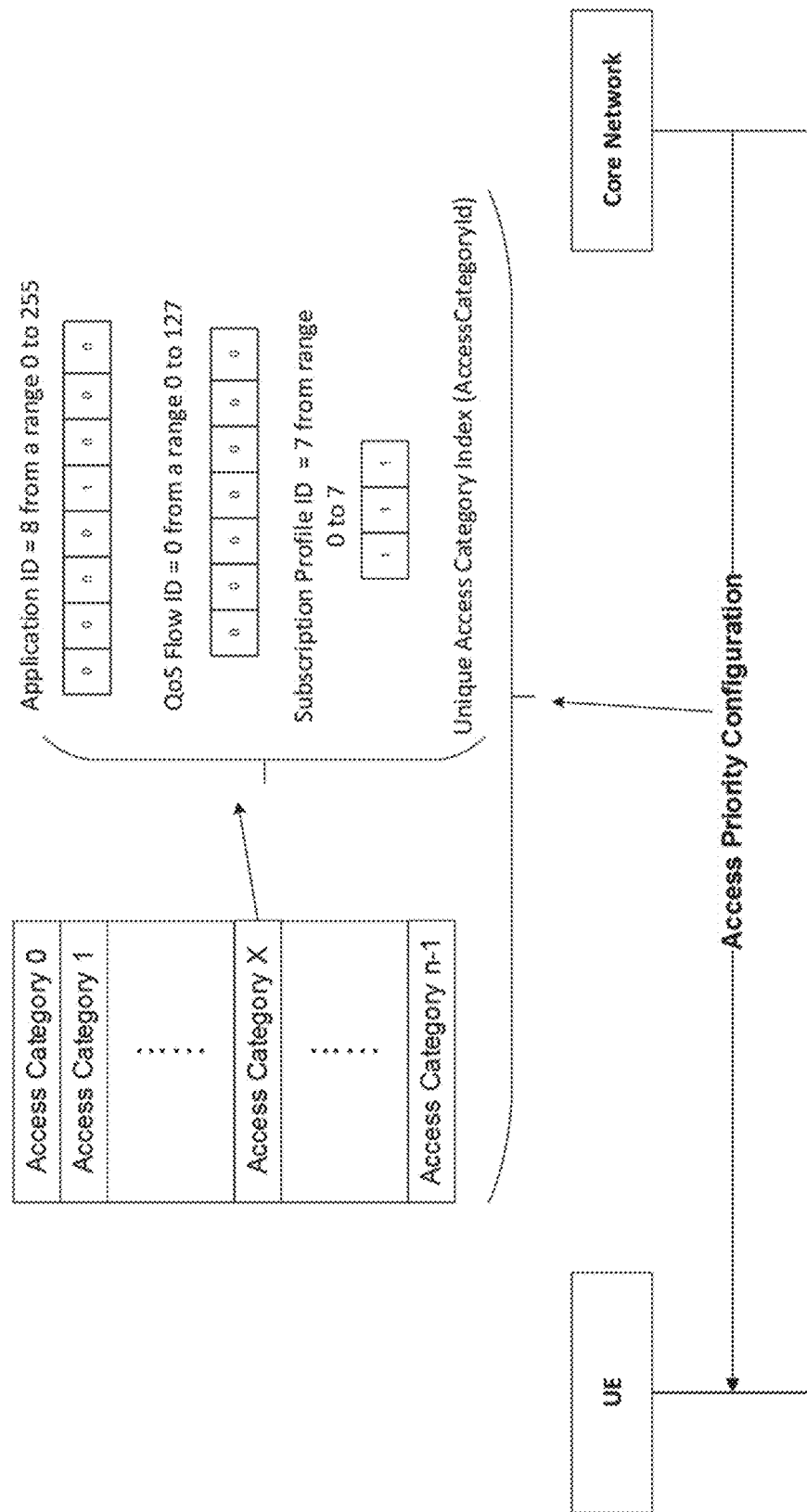
FIG. 18 shows an example UE configuration with access categories using an access category component based approach.

A bitmap may subsequently be used to represent the access component within an access category for the purpose of configuring the UE with a specific access category. For example, an access category component may correspond to Applications expected to run through the communication network. The UE may be initially configured with the list of applications that may be used as part of access category configuration in the network. In support of UE configuration with specific access categories, the UE may use a bit map in reference to the already configured applications on the UE which may then be used to configure an application ID that is a component of an access category the UE is being configured with. The bitmap of each access category component may be of different size. In an example, in order to configure a UE with an access category, the core network signals to the UE the bitmaps corresponding to the access category components the access category is made of, as shown in FIG. 17 and FIG. 18. In another example, in order to configure a UE with an access category, the radio access network (e.g. gNB) signals to the UE the bitmaps corresponding to the access category components the access category is made of.

In an example, each access category component may be represented by an enumeration structure where each value of the enumeration corresponds to a possible instance of the access category component. For example, as an illustration, taking the case of network slice as an access category component, the operator may configure the following slices: eMBB Slice_1, eMBB Slice_2, eMBB slide_3, URLLC Slice_1, URLLC Slice_2, mMTC Slice_1, mMTC Slice_2 and mMTC_Slice3. The access category component for network slice may be represented by the following enumeration: ENUMERATED {Slice_1, eMBB Slice_2, eMBB slide_3, URLLC Slice_1, URLLC Slice_2, mMTC Slice_1, mMTC Slice_2 and mMTC_Slice3}. In order to configure a UE with an access category, the core network signals to the UE the enumeration value of the access category components (e.g. URLLC Slice_2 for access category component correspond to network slice attribute) the access category is made of. In another example, in order to configure a UE with an access category, the radio access network (e.g. gNB) signals to the UE the enumeration value of the access category components (e.g. URLLC Slice_2 for access category component correspond to network slice attribute) the access category is made of.

Using the example access category depicted in FIG. 15, an example of enumeration of the access components may be enumerated as follows:

Call type: ENUMERATED {"originating signaling", "emergency calls", "originating voice", "originating video", "originating SMSoIP", "originating SMS", "terminating calls", "originating calls", "mobile originating CS fallback"}

Network Slice: ENUMERATED {eMBB Slice_1, eMBB Slice_2, eMBB slide_3, URLLC Slice_1, URLLC Slice_2, mMTC Slice_1, mMTC Slice_2 and mMTC_Slice3)

Operating System (OS): ENUMERATED {Apple iOS, Android, Blackberry, Windows, Symbian, BADA, Palm OS, Open WebOS, Maemo, MeeGo, Verdict}

Application: {Movies and video Apps e.g. Netflix, Hulu, YouTube, YouTube TV, Spotify, etc., News Apps e.g. NYTimes, Vice News, The Washington Post, CBS Sports, etc., Social Media Apps e.g. Facebook, Instagram, Twitter, etc. Messaging Apps e.g. Skype, Messenger, WhatsApp, Snapchat, etc., Gaming Apps e.g. Steam, PlayStation App, XboxOne, V2V Apps, Operator Specifics Apps, etc.}

Access Class: {AC0, AC1, AC2, AC3, AC4, AC5, AC6, AC7, AC8, AC9}

Special Access Class: {AC11, AC12, AC13, AC14, AC15)

Figure 19:
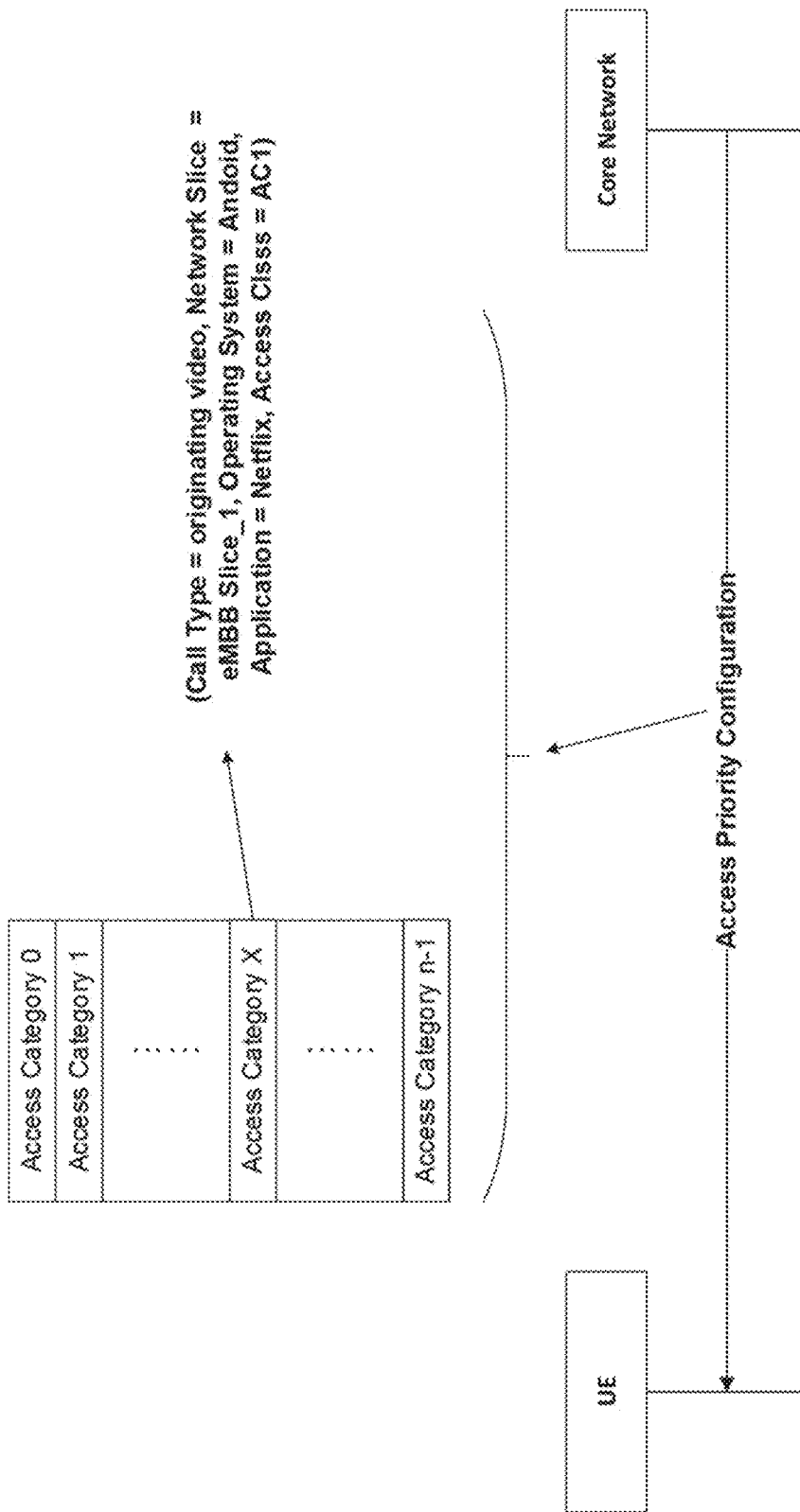
FIG. 19 shows an example UE configuration with access categories using an access category attribute enumeration based approach.

FIG. 19 is an example of access category configuration signaling where each of the access categories is represented as a tuple and where each element of the tuple is an enumeration value of the components the access category is made of.

In an example, some access category components may be represented by a bitmap while some other may be represented by an enumeration structure. In order to configure the UE with an access category, the core network signals to the UE some access category components as bitmaps while some other access categories are signaled to the UE using enumeration structures.

In an example, in order to configure the UE with an access category, the radio access network (e.g. gNB) signals to the UE some access category components as bitmaps while some other access categories are signaled to the UE using enumeration structures.

The UE may be configured by the core network with the access categories through dedicated NAS control plane signaling. In an example, the core network uses NAS control plane signaling to configure the UE with the access categories. The core network may configure the UE with access category information during mobility management procedures. Using LTE terminology, examples of mobility management procedure that can be used by the core network to configure access category at the UE may be, for example, tracking area update procedure, UE attach or combined attached procedure, detach and combined detach procedure, Service request procedure, transport of NAS message or generic transport of NAS messages. The control plane NAS signaling of access category configuration may be implemented by an Access Category Management Function (ACMF). Such function itself may be part of other core network function such as the Access and Mobility Management Function (AMF) now being specified as part of the 5G core network architecture.

Figure 20:
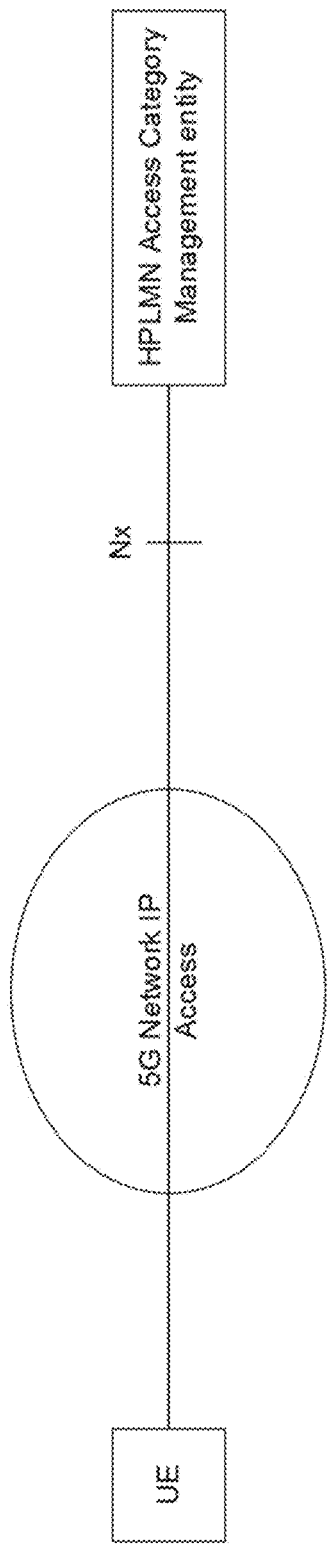
FIG. 20 shows an example non-roaming architecture for access category provisioning over a user plane.
Figure 21:
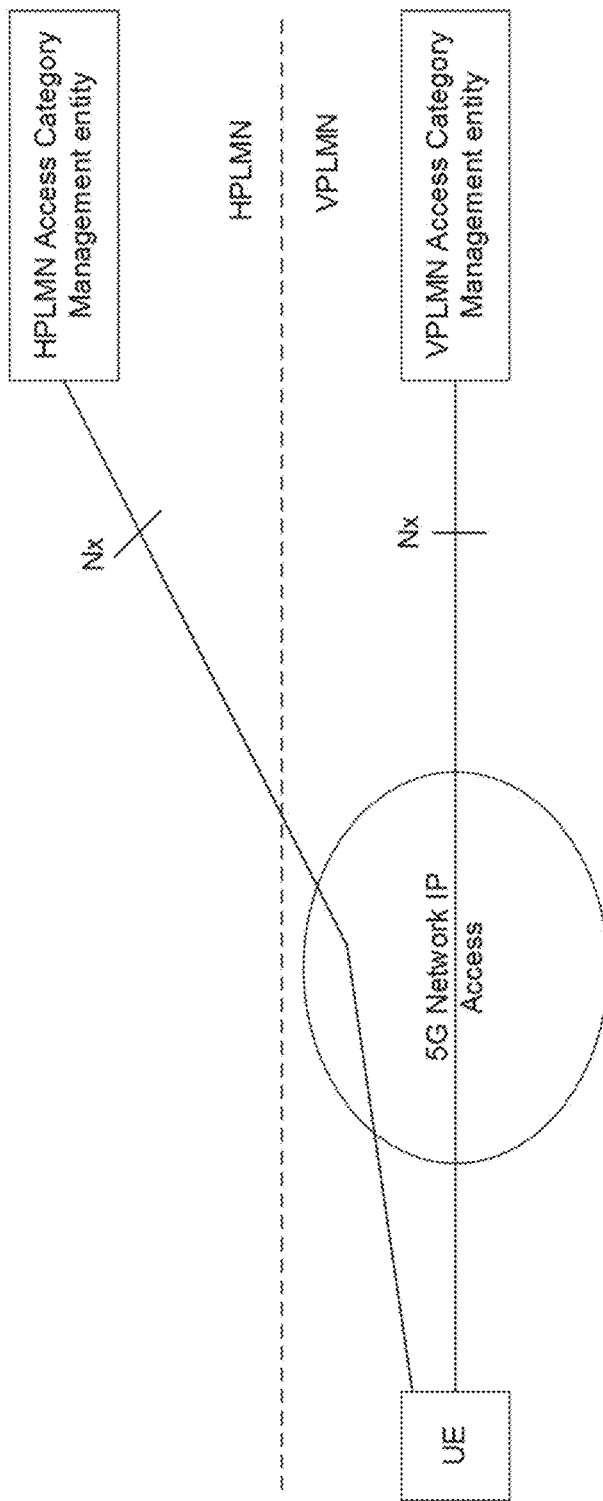
FIG. 21 shows an example roaming architecture for access category provisioning over a user plane.

In an example, the UE may be configured by the core network with the access categories through dedicated NAS user plane signaling as illustrated in FIG. 20 and FIG. 21. In this case the ACMF may be located in the user plane. As illustrated in in FIG. 20 and FIG. 21, Nx may be the reference point between the UE and the access category management entity in the user plane for direct queries via a pull mechanism (UE-initiated session) or push mechanism (ACMF initiated session). This may enable semi-static or dynamic (as opposed to static) provisioning of access category information to the UE in support of access barring control procedures related to 3GPP access and non-3GPP access. The communication over Nx may be a secure communication. The Nx interface may be realized above the IP level. In an example, the ACMF may be a new network function of the core network. In another example, the ACMF may be a part of an already defined 5G core network function such as the AMF (Access and Mobility management) function or PCF (Policy Control Function). The ACMF may also be a function that is part of the Access Network Discovery and Selection Function (ANDSF) element specified as part of the Evolved Packet Core (EPC) network architecture or an equivalent function in 5G core network.

In an example, the UE may be configured by the radio access network (e.g. gNB) with the access categories through dedicated RRC signaling. Using LTE RRC procedures as reference, the radio access network may signal access category configuration information to the UE using one or more of the following RRC messages: RRC Connection Release (RRCConnectionRelease) message, RRC Connection Reconfiguration (RRCConnectionReconfiguration) message. For example, in NR a new RRC Connection Reconfiguration message with an RRC connection release code point meant to signal the release of RRC connection to the UE can be used to configure the UE with Access category configuration information. The UE may be pre-provisioned with access categories stored in the USIM.

Figure 22:
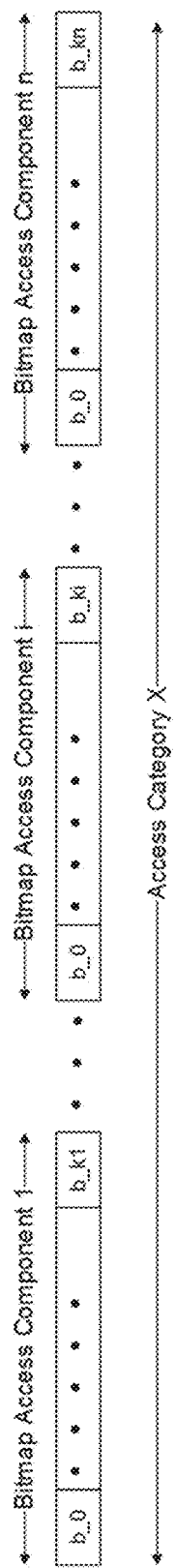
FIG. 22 shows an example access category bitmap with access category components in a predefined position.

In an example of access category component based design of access category, the number of access category components an access category may consist of is predefined or specified. It is possible that the number may be fixed. The order of the access category components within the arrangement of access category components into access category may be predefined. For example, assuming an access category component is represented by a bitmap, and the total number of access category components of an access category is specified or predefined to ten, then the access category may be a larger bitmap that consists of for example ten access category component bitmaps where the position of the bitmap of each access category component within the access category bitmap is predefined for example specified. For example, an access category may consist of Access Class, Slice, Application, OS, Call Type, Traffic Flow or Packet Flow, Service Data Flow, QoS Flow, QCI, Subscription Profile components in that order and their corresponding bitmaps within the access category may appear in that order where the most significant bits of the access category bitmap will correspond to the Access class while the least significant bit of the access category bitmap may correspond to the subscription profile. The concept is illustrated in FIG. 22 with the most significant bit of Access Category X being bit b_0 of Access Component 1 and the least significant bit of Access category X is the bit b_kn of Access Component n. In that figure, the access category component Access Component 1 has b_k1+1 bits, Access Component 1 has b_ki+1 bits and Access Component n has b_kn+1 bits.

Similarly, assuming an access category component is represented by an enumeration structure, and the total number of access category components of an access category is specified or predefined to ten, then the access category may be represented as 10 tuples of access category components represented by an enumeration structure, for example ({Access Class Enumeration}, {Slice Enumeration}, {Application enumeration}, {OS enumeration}, {Call Type enumeration}, {Traffic Flow or Packet Flow enumeration}, {Service Data Flow enumeration}, {QoS Flow enumeration}, {QCI enumeration}).

In one example, an Access Category Configuration Signaling not based on Access Category Components is disclosed. The access category signaling may not assume the use of access category components as a building block of an access category. Instead, all possible combination of the attributes (e.g. Access Class, Slice, Application, OS, Call Type, Traffic Flow or Packet Flow, Service Data Flow, QoS Flow, QCI, Subscription Profile, etc.) of an access category may be enumerated and assigned an access category value or access category identifier. The mapping between access category attribute combinations and access category values may be pre-defined or specified. As described herein, a subset of the possible combinations of access category attributes may be specified in the standards together with the associated access categories values, while the remaining set of possible combinations of access category attributes and associated access categories values are left to deployment specific configuration by the network operators. In other words, the possible combinations of access category attributes may be divided into two subgroups, where one group is specified in the standards as default combinations with the associated default access category values, while the configuration of the second group of combination of access category attributes and the associated access category values is left to deployment specific configuration by the network operators. These second group may be referred to herein as operator defined access categories. Operator defined access categories may be represented by a bitmap or by an enumeration structure. In one example, the core network may signal to the UE the access category configuration information (default access categories and/or operator defined access category) using NAS dedicated control plane signaling. In another example, the core network may signal to the UE access category configuration information (default access categories and/or operator defined access category) using NAS dedicated user plane signaling. In another example, the UE may be configured by the radio access network (e.g. gNB) with access category configuration information using RRC signaling. It should be noted that for operator defined access category, the UE may need to be configured with the detail information of the attributes of the access categories. Subsequently the network may optionally configure the UE either in the form of bitmap or in the form enumeration values or access category identifiers with the access categories the UE is allowed to use. For the default access categories, the details of the attributes or components of these access categories are assumed specified in the standards. As result, the UE may just be configured either in the form of bitmap or enumeration values or access categories identifiers, the default access categories the UE is allowed to used.

In addition or alternatively to the access categories, an access identifier for an access attempt may be identified and/or transmitted. As discussed above, an access category may be defined based one or more attributes such as Access Class, Slice, Application, OS, Call Type, Traffic Flow or Packet Flow, Service Data Flow, QoS Flow, QCI, Subscription Profile e.g. platinum users, gold users, silver users and bronze users. As illustrated in FIG. 5, the access category configuration may include, one or more of these attributes, the AC value and a subscription profile identifier which can be equivalently denoted an access identifier. For example, an access identifier for an access attempt may include an indication that the UE is configured for mission critical services, such as for use by first responders, or that the device is configured to monitor biometric information of a patient. It is understood that, in any of the examples herein where an access category is transmitted from one entity to another or from one protocol layer to another within one entity, that the access identifier may be transmitted with the access category or instead of the access category. The access identifier of an access attempt may additionally or alternatively be used to determine if this access attempt is barred.

Methods and systems for Access Barring Control Parameter Signaling are disclosed. The UE may perform access barring checks either based on access barring rate (or interchangeably access barring factor) and access barring meantime of the corresponding access category broadcasted by the Radio Access Network (RAN) (e.g. gNB), or the UE may perform the access barring check based on a boolean access parameter of the corresponding access broadcasted by the RAN, which indicates whether an access is allowed or barred for an access class. For example, in the case of access barring check based on access barring rate and access barring mean time, the UE may draw a random number rand uniformly distributed between 0 and 1 e.g. $0 \leq rand < 1$. If 'rand' is lower than the value indicated by ac-BarringFactor included in "AC barring parameter" where AC stands for Access Category (and not access class), the UE considered access to the cell as not barred; otherwise, the UE considers the cell as barred for ac-BarringTime duration. If the access attempt is not allowed, further access attempts of the same type may then be barred for a time period that is calculated based on the access barring mean duration time signaled to the UE for the access category and the random number rand drawn by the UE. The access barring factor for an access category may be in the range [0,1) and may take for example one of the following value: p00=0, p05=0.05, p10=0.10, . . . , p95=0.95.

In the case of access barring check performed based on a boolean access barring parameter, the UE may consider access to the cell as barred if the boolean access barring parameter is set to one otherwise, the UE considered access to the cell as not barred.

The signaling of access barring parameters by the RAN (e.g., gNB) may be based on one or more of the following schemes:

Signaling of a partial list of access barring parameters, including the signaling of the access category index;

Signaling of a complete list of the access barring parameters, where the access category information is signaled in the form of a bitmap; and/or Signaling of a combination of partial list and a complete list of the access barring parameters.

In any of these approaches, the radio access network (e.g. gNB) may configure the UEs with the access barring parameters through RRC common signaling (e.g. system information broadcast signaling) or RRC dedicated signaling for e.g. in support of access control in RRC connected mode. Examples of the signaling of access barring control parameters are illustrated in FIG. 23-FIG. 28. In any of the figures, the access barring control parameters (access barring rate, access barring mean time or Boolean access barring parameter) may be signaled to the UE on per PLMN basis, that is, a single access barring control parameter signaling message may carry access barring parameters for more than one PLMN, on per PLMN basis for example in the case of network sharing.

Figure 23:
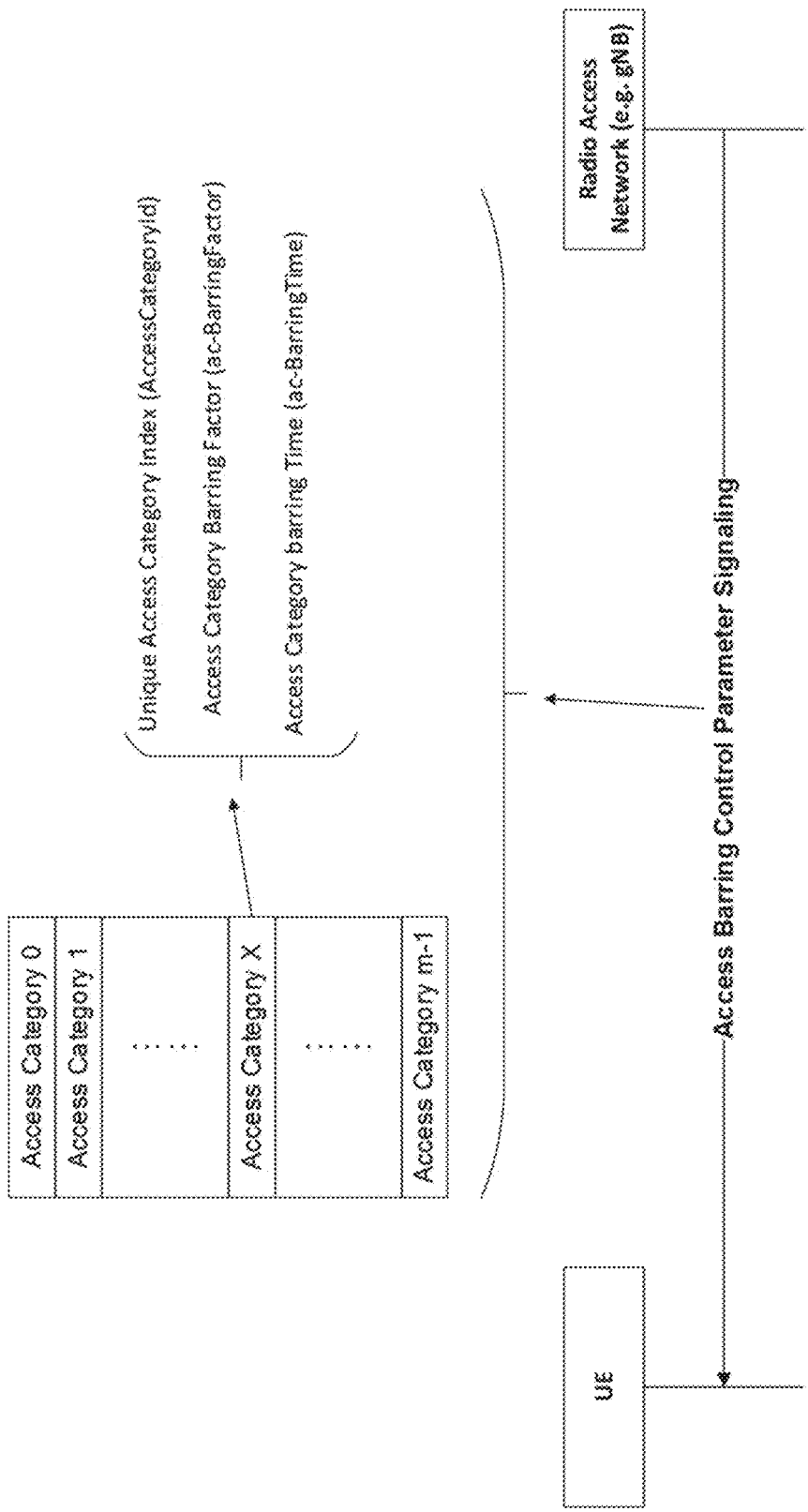
FIG. 23 shows an example signaling of a partial list of AC barring parameters.
Figure 24:
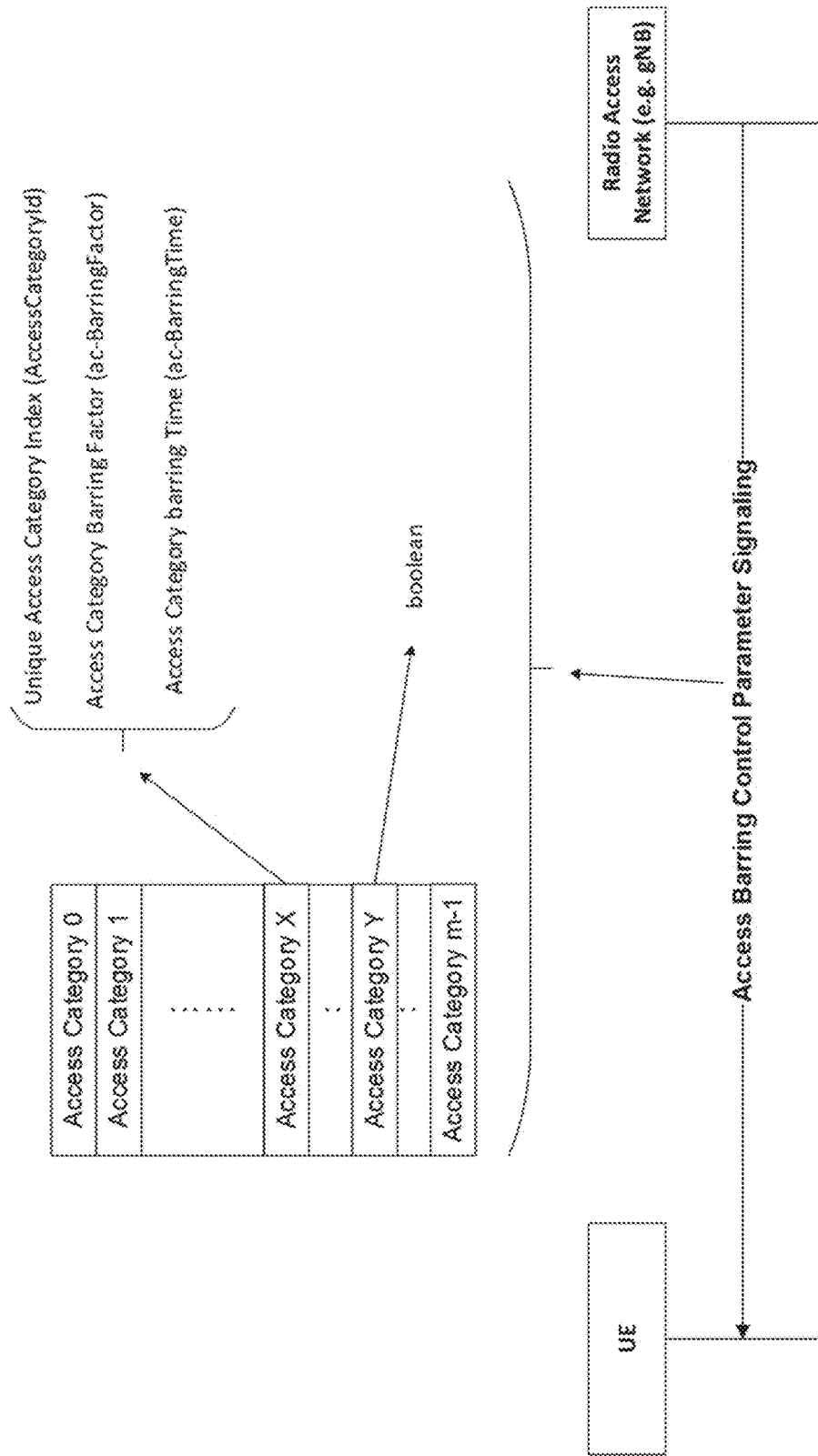
FIG. 24 shows another example signaling of a partial list of AC barring parameters.

FIG. 23 and FIG. 24 provide examples of access baring parameter signaling where the network is broadcasting barring parameters for a partial list consisting of m access categories among the available access categories N in the network, (e.g. m is less or equal to N). In this example, it may be assumed the core network has configured the overall population of UEs with a set of access categories that consists of a number of access categories equal or larger than m, but where each UE is potentially configured with a number n of access categories, where n is greater or equal to 1 but less than N (see for example FIG. 18 or FIG. 19). For each of the access categories the core network has configured the UE with, and for which the RAN for example the gNB is broadcasting access barring parameter, the UE may create an association between the access category and the corresponding access barring parameters. In order for the UE to perform such an association, the Radio Access Network (RAN) may broadcast a unique access category identifier together with the access barring parameters for each of the m access categories.

Additionally or alternatively, the UE may implicitly derive the unique access category identifier for each of the access category for which access barring parameters are being broadcasted. For example, assume the RAN (e.g. gNB) uses a data structure that consist of an array of size N, where N represents the overall number of access categories which can be used for access control in the network, including default access categories, special access categories or operator defined access categories. The UE may implicitly derive the access category unique identifier of each of the m access categories for which access barring parameters are being broadcasted by the RAN (e.g. gNB), as the index corresponding to the position of the access category in the array (e.g., bitmap) of size N. For example, in reference to FIG. 25, the UE may implicitly derive the unique identifier of access category X as X (e.g. the unique identifier of access category X is the position of access category in the array of size N, that is the $X^{th}$ position in the array (e.g., bitmap) of size N in this example). For each access category the UE has been configured with by the core network, the UE stores in its internal database the corresponding access barring parameters if the barring parameters for the access category is broadcasted by the network. The UE may use the stored and valid access barring parameters to perform an access barring check a disclosed herein.

The validity of the access barring parameters may be handled as per the validity of the corresponding System Information Block (SIB) validity rules. The example illustrated in FIG. 23 assumes the configuration of the UE with access barring rates and mean access barring time, while the example in FIG. 24 assumes access control with some of the access categories is based on access barring rate and access barring mean time while access control with some of the access category is based on a boolean access controlled (e.g. access to the cell is either allowed or not allowed). For example, for default access categories or special access categories, some of which might be specified in the standards, access control based on access control through a boolean parameter may be specified.

Figure 25:
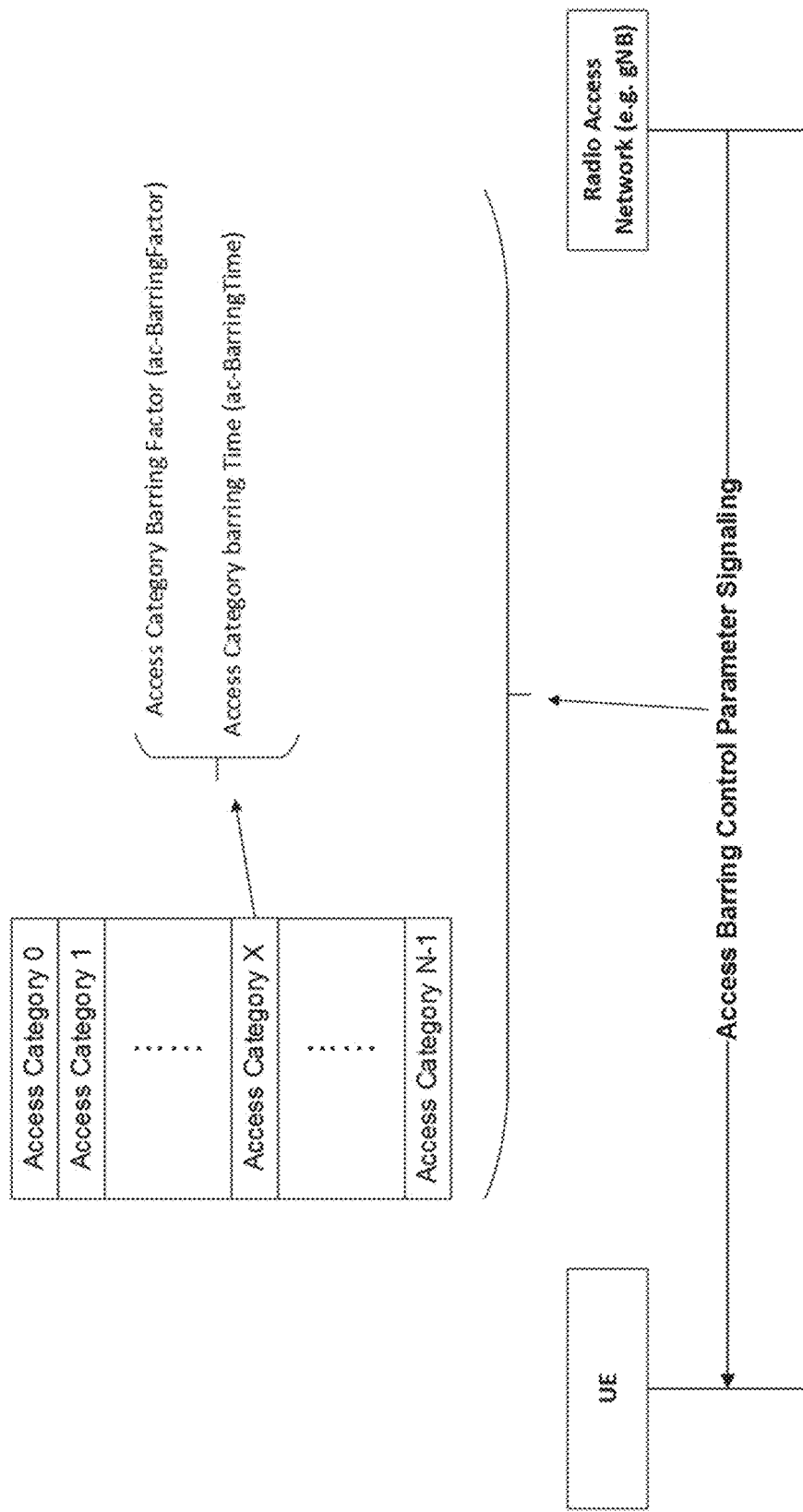
FIG. 25 shows an example signaling of a complete list of AC barring parameters.
Figure 26:
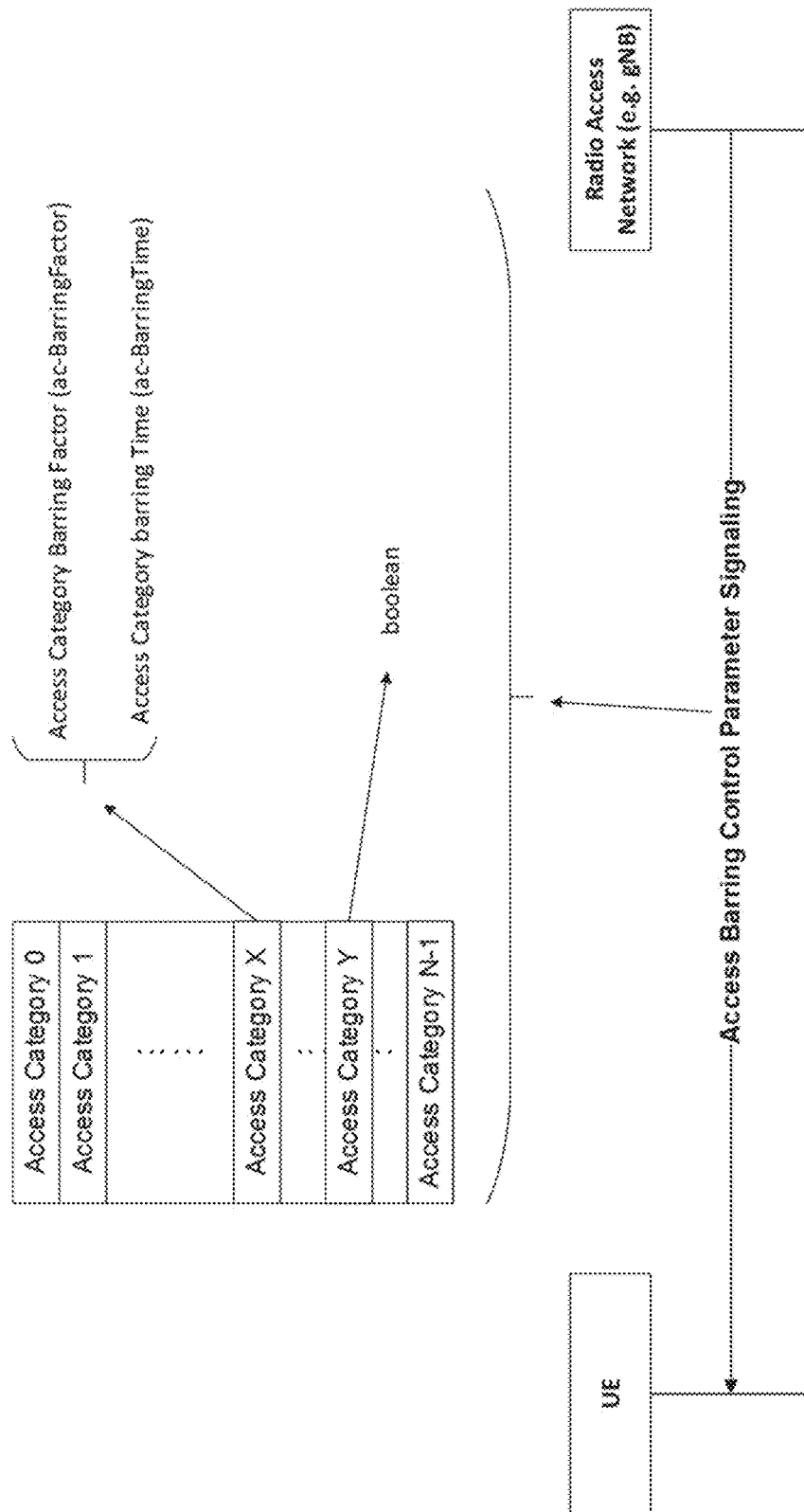
FIG. 26 shows another example signaling of a complete list of AC barring parameters.

FIG. 25 and FIG. 26 provide examples of access baring parameter signaling where the network is broadcasting access barring parameters for the complete list of the available access categories N in the network. For each of the n access categories the core network has configured the UE with (as described above) and for which the RAN (for example the gNB) is broadcasting access barring parameter, the UE may create an association between the access category and the corresponding access barring parameters. In order for the UE to perform such an association, the UE may implicitly derive a unique access category identifier for each of the access category for which access barring parameters are being broadcasted. For example, assume the RAN (e.g. gNB) uses a data structure that consists of an array of size N, where N represents the overall number of access categories which can be used for access control in the network, including default access categories, special access categories or operator defined access categories.

The UE may implicitly derive the access category unique identifier of each of the access categories for which access barring parameters are being broadcasted by the RAN (e.g., gNB) as the index corresponding to the position of the access category in the array (e.g., bitmap) of size N. For example, in reference to FIG. 25, the UE may implicitly derive the unique identifier of access category X as X (e.g., the unique identifier of access category X is the position of access category in the array or bitmap of size N, that is the $X^{th}$ position in the array or bitmap of size N in this example). The example illustrated in FIG. 25 assumes the configuration of the UE with access barring rates and mean access barring time, while the example in FIG. 26 assumes access control with some of the access categories is based on access barring rate and access barring mean time while access control with some of the access categories is based on a boolean access control (e.g. access to the cell is either allowed or not allowed). For example, for default access categories or special access categories, some of which might be specified in the standards, access control based on access control through a boolean parameter may be specified.

For each access category the UE has been configured with by the core network, the UE may store in its internal database the corresponding access barring parameters if the barring parameters for the access category is broadcasted by the network. The UE may use the stored and valid access barring parameters to perform access barring check as described herein. The validity of the access barring parameters may be handled as per the validity of the corresponding System Information Block (SIB) validity rules.

Figure 27:
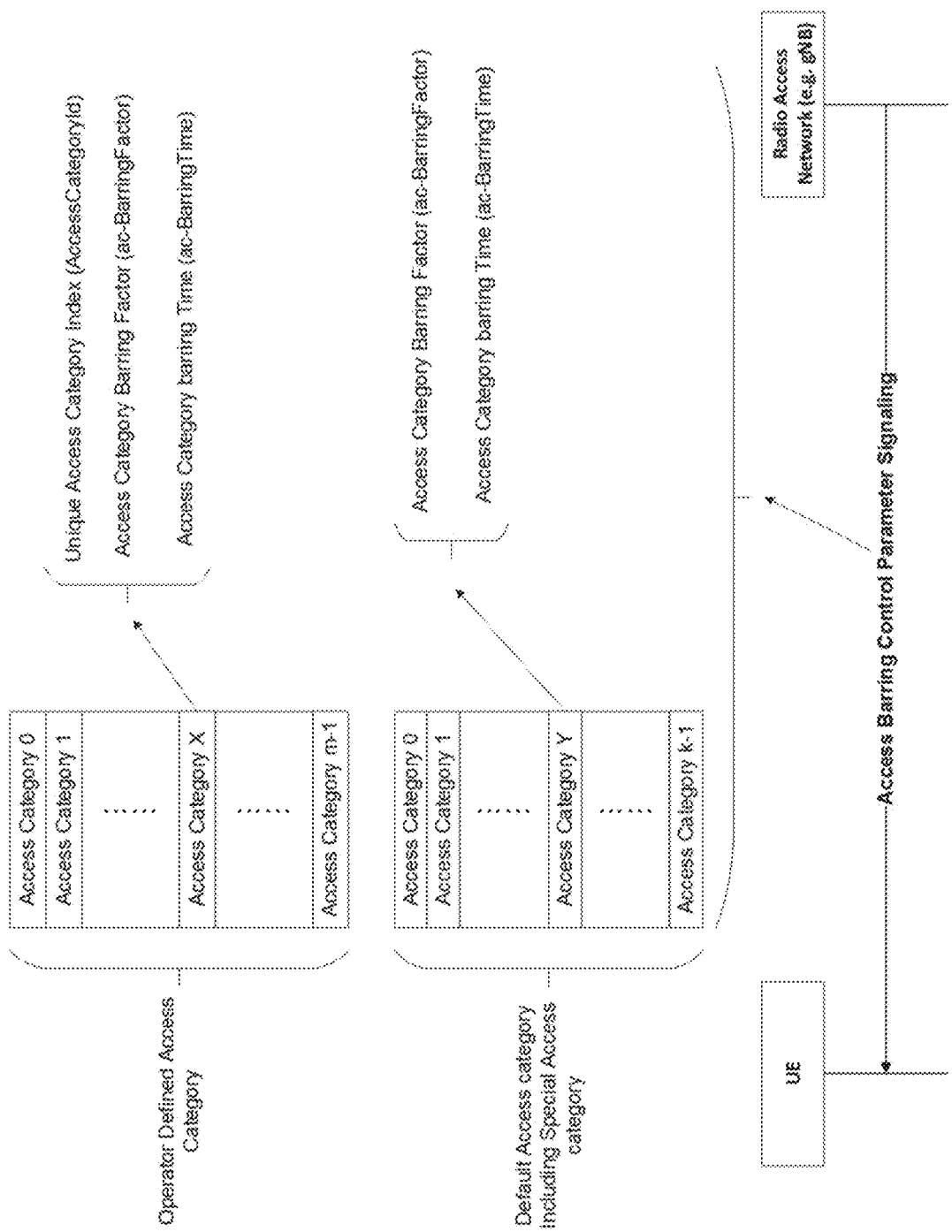
FIG. 27 shows an example combination of partial list and complete list based access barring parameter signaling.
Figure 28:
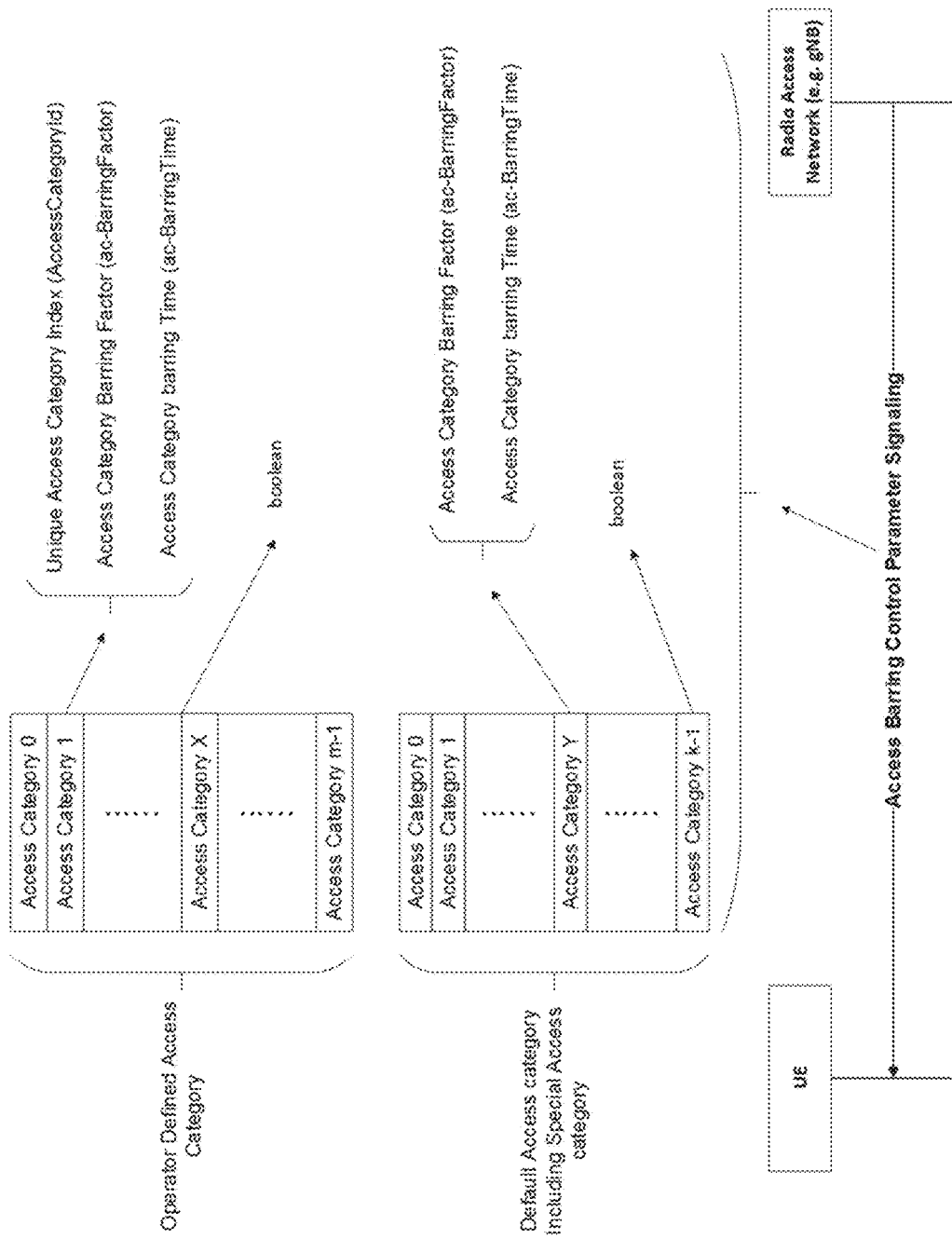
FIG. 28 shows another example combination of partial list and complete list based access barring parameter signaling.

FIG. 27 and FIG. 28 illustrate examples where some of the access barring parameters are signaled to the UE following the scheme of partial signaling list as described herein while some of the access barring parameters are signaled to the UE following the scheme of a complete signaling list as also described herein. For example, the access categories may consist of default access categories (including special access categories) and operator defined access categories. Part or all of the default access categories and their used for access control (e.g., access control based on access barring rate and access barring mean time versus Boolean access barring) may be specified in the standard while operator defined access categories and their used for access control may be left to the operators' decision. For example, the total number of default access categories including special access categories may be k. In such case, the access baring parameter signaling where the network broadcasts access barring parameters for a complete list of the available access categories may be used with the difference that in this case, the complete list of available access categories may be limited to the list specified in the standards or default access categories including specified special access categories, which in the case of examples depicted in FIG. 25 and FIG. 26 consists of k access categories.

The access barring parameters may be signaled to the UE using the partial list signaling mechanism described herein. In the example illustrated in either FIG. 27 or FIG. 28, the number m of access categories for which access barring parameters are being signaled may be less or equal to the overall number of operator defined access categories (Nc) available for access control in the network.

Methods and systems for Access Control for UEs in RRC_IDLE mode are disclosed. The procedures shown in FIG. 29 and FIG. 30 and described further below may be used to perform access control for UEs in RRC_IDLE in response to events within the upper layers of the UE above the Access Stratum (AS), requiring the UE to initiate an NAS signaling connection toward the core network, and therefore requiring the UE to perform access control before initiation of signaling connection toward the network. Events in the upper layer requiring the UE to initiate NAS signaling connection may include events in user plane (for example if data becomes available for transmission) or in control plane (for example change in tracking area) requiring the UE to perform a tracking area update. A number of NAS procedures may be performed as a result of these events. Taking the existing LTE technology as a reference, example of 5G initial NAS messages that initiates the establishment of NAS signaling connection may include but is not limited to the following: ATTACH REQUEST, DETACH REQUEST, TRACKING AREA UPDATE REQUEST, SERVICE REQUEST, EXTENDED SERVICE REQUEST and CONTROL PLANE SERVICE REQUEST.

In one example, a method used to perform access control for UEs in RRC_IDLE mode may comprise: receiving, at an Access Stratum (AS) of a user equipment and from a Radio Access Network (RAN), access barring information; receiving, at a Non-Access Stratum (NAS) of the user equipment, an access trigger, wherein the access trigger causes the user equipment to initiate an access attempt; determining, at the NAS of the user equipment, an access category associated with the access attempt by the user equipment; sending, from the NAS of the user equipment to the AS of the user equipment, an NAS message associated with the access attempt and an indication of the determined access category; determining, at the AS of the user equipment and based at least on the determined access category and the access barring information, whether an access attempt for this access category is barred; and executing, based on determining that the access attempt is not barred, a Radio Resource Control (RRC) connection establishment procedure.

Receipt of the access trigger may cause the NAS of the user equipment to generate the NAS message associated with the access attempt. The access category may be determined based on an access category configuration stored in a database of the user equipment. The method may further comprise receiving, at the NAS of the user equipment and from a core network node, an access category configuration; and reconfiguring, at the NAS of the user equipment, functionality of the user equipment that supports one or more access control mechanisms. The method may further comprise sending, by the AS of the user equipment to the NAS of the user equipment, an indication of whether the access attempt is barred. The method may further comprise sending, from the NAS of the user equipment to the AS of the user equipment, an access identifier associated with the access attempt. Determining whether the access attempt is barred may comprise determining, at the AS of the user equipment and based on the access identifier associated with the access attempt, whether the access attempt is barred.

Figure 29:
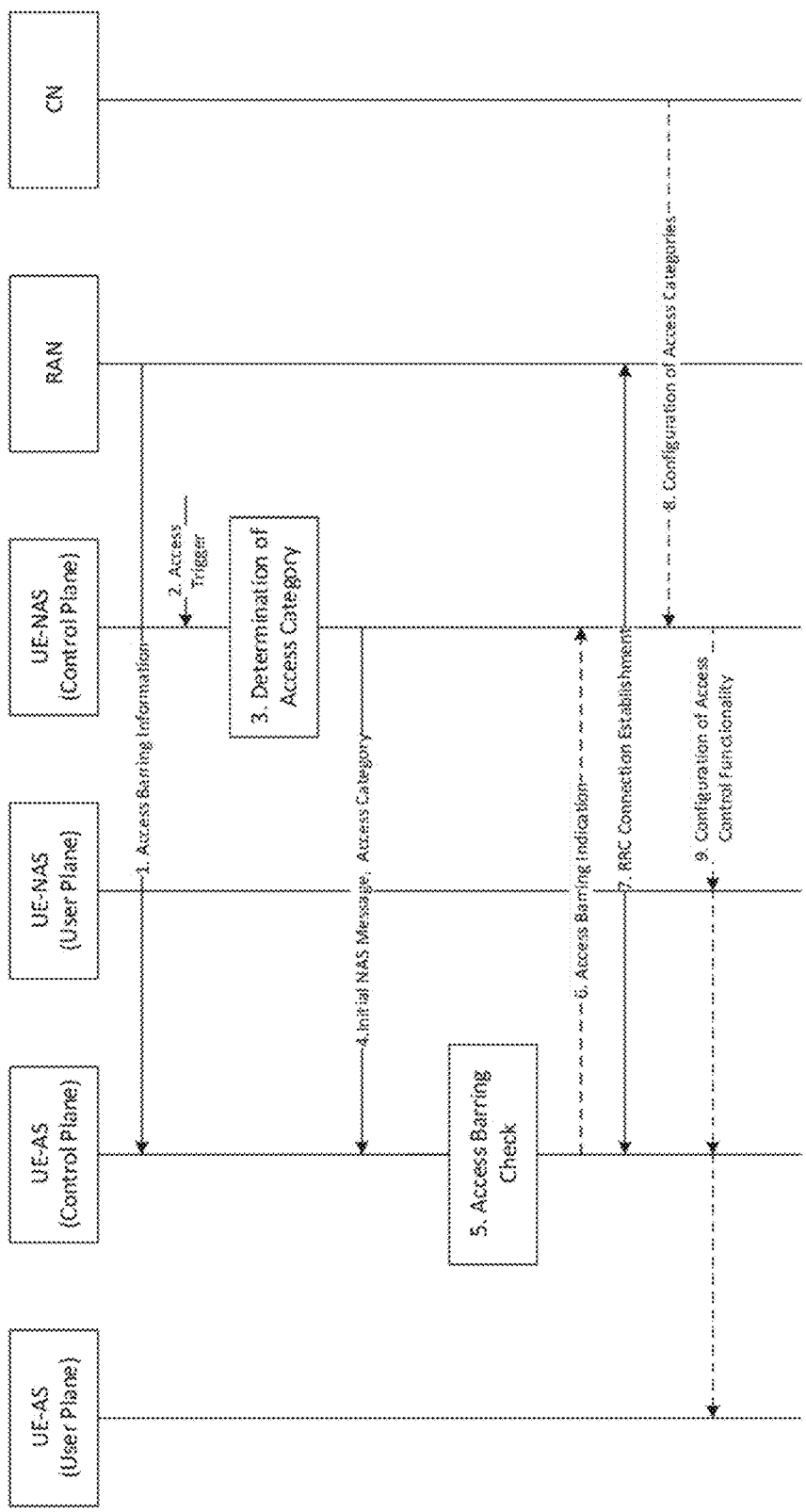
FIG. 29 shows an example AS-CP solution for NAS-CP events requiring access control in RRC_IDLE.

FIG. 29 shows an example AS-CP solution for NAS-CP events requiring access control in RRC_IDLE mode. The steps of FIG. 29 may be further described as follows:

At step 1, the UE acquires the access barring information transmitted by the RAN. The access barring information may be signaled to the UE using the mechanisms described herein.

At step 2, an access trigger event triggers the UE to execute a NAS procedure that initiates an initial NAS message for the establishment of a NAS signaling connection. As discussed above, the access trigger event may be events in the UE NAS User Plane or events in the UE NAS.

At step 3, the NAS-CP decides the access category for the NAS signaling connection and selects a valid access category from the access category configuration stored in the UE internal database, as per the access categories configuration procedures described herein.

At step 4, the NAS-CP provides the initial NAS message together with the selected valid access category to the AS-CP for example the RRC layer in the appropriate inter-layer message, between UE NAS-CP and UE AS-CP. In one example, an access identifier of the access attempt may also be provided.

At step 5, the AS-CP uses the received access category from the upper layer together with the access barring information to determine if this access attempt is barred. In one example, the access identifier of the access attempt may additionally or alternatively be used to determine if this access attempt is barred.

At step 6, the UE AS-CP informs the NAS-CP of the result of the access barring check. If the access is barred, the procedure ends.

At step 7, otherwise, the UE executes the RRC Connection Establishment procedure.

At step 8, the network may (re-)configure the UE with access categories using the mechanisms described herein.

At step 9, the NAS/AS functionality supporting access control (e.g. access control status check and determination of access category) may be reconfigured based on the access category configuration. The AS/NAS may store the access category parameters as part of the QoS flow, bearer or logical channel context. For access control solutions requiring configuration of the AS-UP, the NAS-CP may signal the configuration parameters to the AS-CP (e.g., the RRC layer, which then configures the AS-UP). Additionally or alternatively, the NAS-CP may configure the AS-UP directly.

Figure 30:
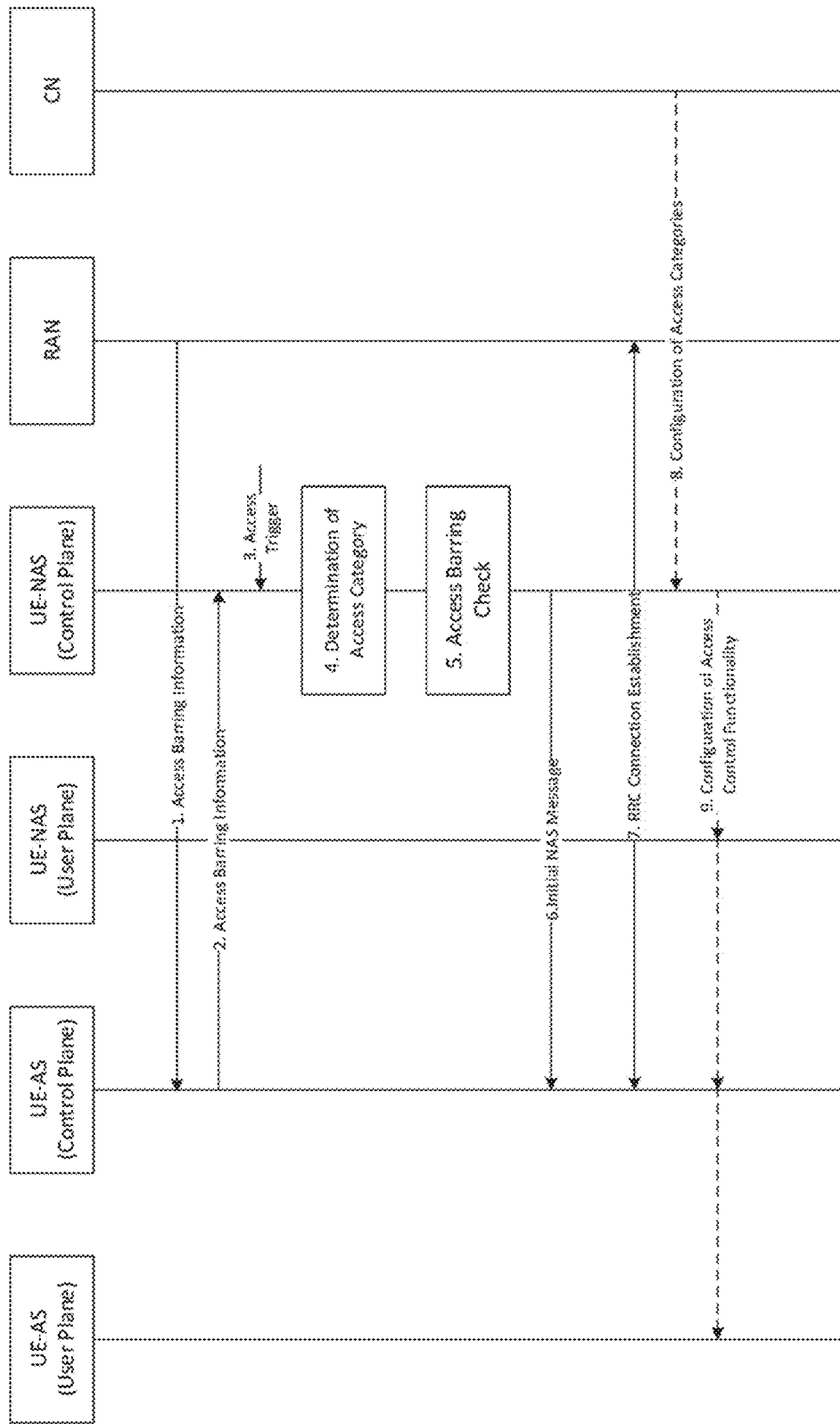
FIG. 30 shows an example NAS-CP solution for NAS-CP events requiring access control in RRC-IDLE.

FIG. 30 shows an example NAS-CP solution for NAS-CP events requiring access control in RRC_IDLE mode. The procedures of FIG. 30 may be described as follows:

At step 1, the UE acquires the access barring information transmitted by the RAN, where the access barring information may be signaled to the UE using the mechanisms described herein.

At step 2, the AS-CP provides the acquired access barring information to the NAS-CP. It should be noted that the while the UE-AS provided access barring information to the UE-NAS autonomously, the UE-NAS may also request anytime the UE-AS to forward access-barring information to the UE-NAS. Furthermore, the UE AS-CP may forward to NAS access barring information anytime there is an update of access barring information from the RAN.

At step 3, an access trigger event triggers the UE to execute a NAS procedure that initiates an initial NAS message for the establishment of a NAS signaling connection. As discussed above, the access trigger event may be events in the UE NAS User Plane or events in the UE NAS.

At step 4, the NAS-CP decides the access category for this particular NAS signaling connection and selects a valid access category from the access category configuration stored in the UE internal database, as per the access categories configuration procedures described above.

At step 5, the NAS-CP uses the selected access category together with the access barring information received from the UE AS to determine if this access attempt is barred. If the access is barred, the procedure ends. Otherwise the procedure continues with the remaining steps.

At step 6, the UE NAS-CP sends the initial NAS message to the UE AS-CP

At step 7, the UE AS CP executes the RRC Connection Establishment procedure.

At step 8, the network may (re-)configure the UE with access categories using the mechanisms described above while the UE is in RRC CONNECTED state.

At step 9, the NAS/AS functionality supporting access control (e.g. access control status check and determination of access category) may be reconfigured based on the access category configuration. The AS/NAS may store the access category parameters as part of the QoS flow, bearer or logical channel context. For access control solutions requiring configuration of the AS-UP, the NAS-CP may signal the configuration parameters to the AS-CP (e.g. the RRC layer, which then configures the AS-UP). Additionally or alternatively, the NAS-CP may configure the AS-UP directly.

Methods and systems for performing access control for UEs in the RRC_INACTIVE and RRC_CONNECTED states are disclosed. The AS-UP may perform one or more of the following functions to support access control: access control status check, determination of access category, access barring check. Which AS-UP sublayer performs these functions may be dependent on the level of granularity at which access control is performed (e.g., QoS Flow, bearer or logical channel). For example, the access control functions may be targeted to the SDAP sublayer if access control is performed at the granularity of a QoS flow. Additionally or alternatively, the access control functions may be targeted to the MAC sublayer if access control is performed at the granularity of a bearer or logical channel. The access control in AS-UP may be performed at the PDCP sublayer if the access control is performed at a bearer level granularity. The access control may be performed at RLC sublayer if the access control is performed at a logical channel level granularity.

Figure 31:
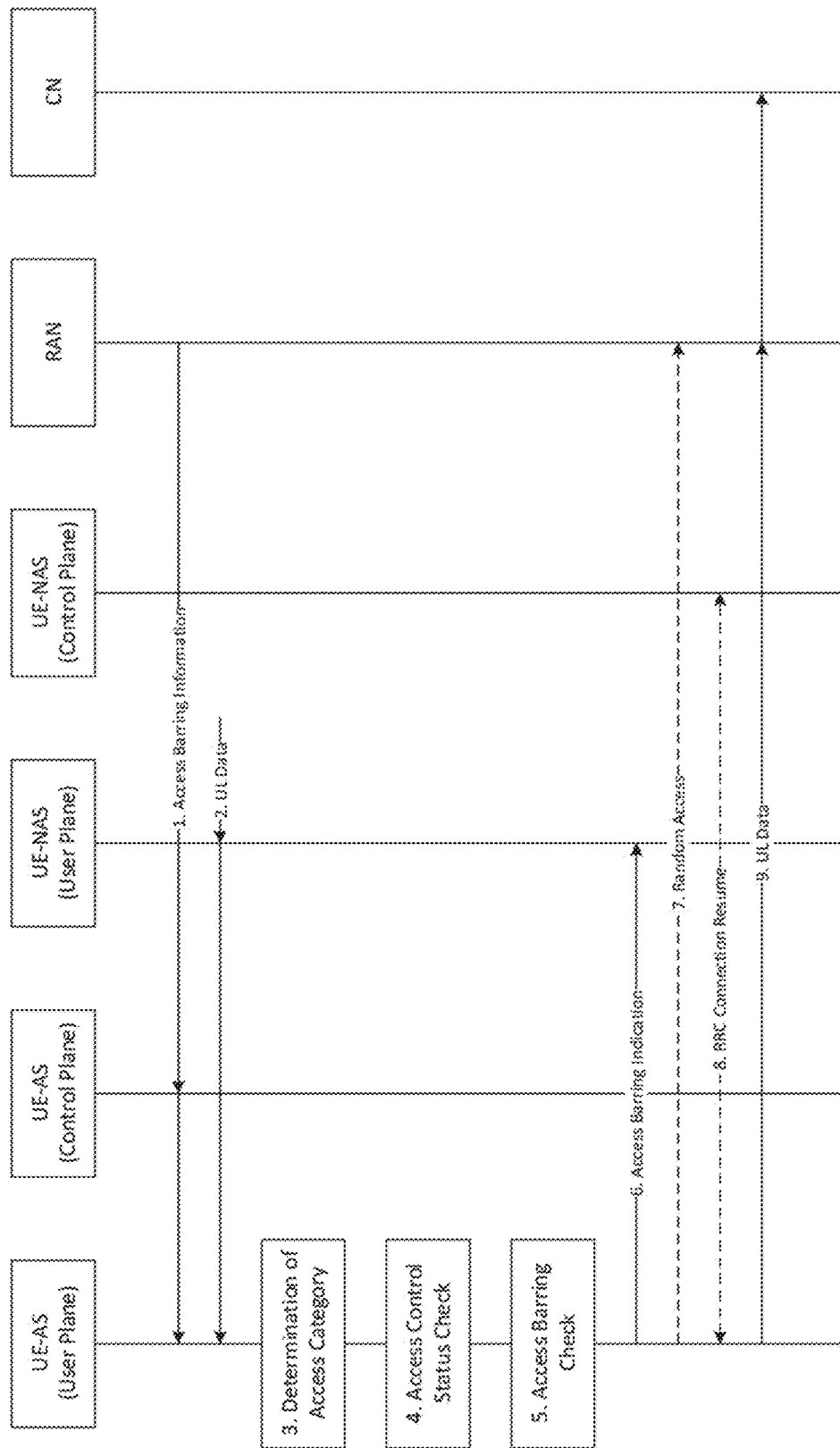
FIG. 31 shows an example AS-UP solution for AS-UP events requiring access control in RRC_INACTIVE & RRC_CONNECTED.

FIG. 31 shows an example method for AS-UP events requiring access control in RRC_INACTIVE & RRC CONNECTED state.

At step 1, the UE may acquire the access barring information transmitted by the RAN, where the access barring information may be signaled to the UE using the mechanisms described herein. Note that the access barring information may actually be acquired via the AS-CP (e.g., the RRC layer) and provided to the AS-UP.

At step 2, UL data may be sent from the UE NAS UP to the AS via the UP. The UE NAS UP may also provide to the UE AS, the access category the UE AS should use for the transmission of the data. The UE NAS-UP may determine the access category for the new data packet. For example, the UE NAS-UP may determine the access category from the access categories the UE is configured with using one or more of the attributes described herein, for example the QoS Flow ID, the QCI, the Application ID, SDF, the packet flow, etc., associated with the data packet.

At step 3, additionally or alternatively, the UE AS-UP may decide the access category of the new data packet. The access category determination may be based on the QoS flow, or the bearer or the logical channel the new data packet is mapped to. For example, the UE AS-UP may determine the access category from the access categories the UE is configured with using the QoS Flow ID or the QCI associated with the new data packet.

At step 4, the AS-UP may check the access barring status for the received packets in its internal database to determine if access barring status (e.g., access is barred or access is not barred) is already stored in its internal database for the received packet. Depending on the level of granularity at which access control is performed, the check may be based on QoS Flow ID (QFI), bearer ID or QCI or logical channel ID. For example, to perform access control at the granularity of a QoS flow, the UE AS-UP may check if there is an access barring status (e.g., access is allowed or not allowed) already stored in the UE internal database for the received packet from the upper layer based on the QFI in the packet header and the access category selected by the UE in step 3. Similarly, to perform access control at the granularity of a bearer or logical channel, the UE AS-UP may check if there is an access barring status (e.g. access is allowed or not allowed) already stored in the UE internal database using the access category selected in step 3 and the DRB ID or the logical channel ID of the data packet. If no access barring status exists in the UE internal data base for the data packet or the stored access barring status is no longer valid, the UE may proceed with step 5 to perform access barring determination; otherwise, step 5 and step 6 may be skipped.

At step 5, the AS-UP may use the selected access category together with the access barring information to determine if access is barred or access is allowed. The UE may update its internal database with the results of the access control (e.g. access is barred or access is not barred) for the corresponding access category selected in step 3 and the corresponding QoS Flow ID or DRB ID or logical channel ID depending on the level of granularity of the access barring. The UE may be notified of changes in the access barring information through dedicated signaling. If the UE is in RRC inactive state, the UE may be notified via a paging message that includes an access barring modification IE. Additionally or alternatively, the UE may monitor the SI for a flag (e.g. a systemInfoValueTag) that indicates if a change has occurred in the SI messages and then reacquire the SI when a change has occurred. The UE may update access barring status in its internal database as a result of subsequent change of access barring information received from the RAN.

At step 6, the AS-UP may inform the NAS-CP of the result of the access barring check. If the access is barred, the procedure ends. Otherwise the UE performs the remaining steps of the procedures.

At step 7, if the UE is in the RRC INACTIVE state or if the UE is in the RRC_CONNECTED state and the UL is not time aligned or if the UE needs to send an SR and PUCCH resources are not available, the UE may perform the random access procedure.

At step 8, if the UE is in the RRC_INACTIVE state, the UE may perform the RRC Connection Resume procedure.

At step 9, UL data for the QoS flow/bearer/logical channel may be transmitted to the network.

Figure 32:
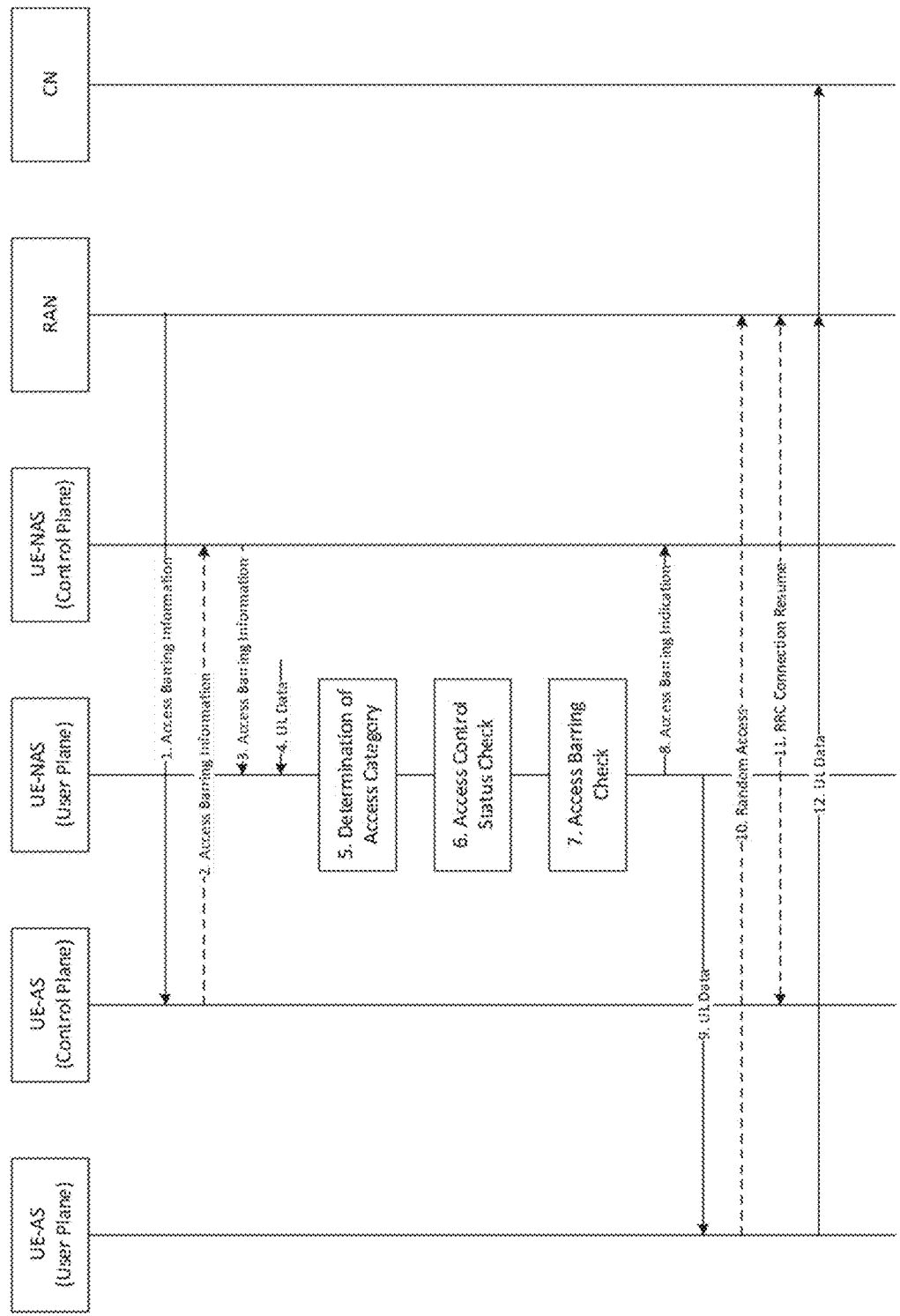
FIG. 32 shows an example NAS-UP solution for NAS-UP events requiring access control in RRC_INACTIVE & RRC_CONNECTED.

FIG. 32 shows an example method for NAS-UP events requiring access control in RRC_INACTIVE & RRC CONNECTED state.

At step 1, the UE may acquire the access barring information transmitted by the RAN, where the access barring information may be signaled to the UE using the mechanisms described above.

At step 2, the AS-CP may provide the acquired access barring information to the NAS-CP.

At step 3, the NAS-CP may provide the acquired access barring information to the NAS-UP.

At step 4, the UE NAS UP may receive data for UL transmission.

At step 5, the UE NAS-UP may decide the access category for the new data packet. For example, the UE NAS-UP may determine the access category from the access categories the UE is configured with using one or more of the attributes described herein, for example the QoS Flow ID, the QCI, the Application ID, SDF, the packet flow, etc., associated with the data packet.

At step 6, the NAS-UP may check access barring status for the received packets in its internal database to determine if access barring status (e.g. access is barred or access is not barred) is already stored in its internal database for the received packet. Depending on the level of granularity at which access control is performed, the access status barring check may be based on QoS Flow ID, SDF, packet flow, QCI, Application ID, etc. For example, to perform access control at the granularity of a QoS flow, the UE NAS-UP may check if there is an access barring status (e.g., access is allowed or not allowed) already stored in the UE internal database for the received packet from the upper layer, based on the QFI in the packet header and the access category selected by the UE in step 5. Similarly, to perform access control at the granularity of SDF, packet flow, QCI or Application ID, the UE NAS-UP may check if there is an access barring status (e.g. access is allowed or not allowed) already stored in the UE internal database using the access category selected in step 5 and the corresponding access category attribute of the data packet. If no access barring status exists in the UE internal database for the data packet or the stored access barring status is no longer valid, the UE may proceed with steps 7 and 8 to perform access barring determination as described herein; otherwise, step 7 and step 8 may be skipped.

At step 7, the NAS-UP may use the selected access category together with the received access barring information to determine if access is barred or access is allowed. The UE may update its internal database with the results of the access control (e.g. access is barred or access is not barred) for the corresponding access category selected in step 5 and the corresponding QoS Flow ID, SDF, packet flow, QCI, Application ID, etc., depending on the level of granularity of the access barring. The UE may be notified of changes in the access barring information through dedicated signaling. If the UE is in RRC inactive state, the UE may be notified via a paging message that includes an access barring modification IE. Additionally or alternatively, the UE may monitor the SI for a flag (e.g. a systemInfoValueTag) that indicates if a change has occurred in the SI messages and then reacquire the SI when a change has occurred. The UE may update access barring status in its internal database as a result of subsequent change of access barring information received from the RAN.

At step 8, the UE NAS-UP may inform the NAS-CP of the result of the access barring check. If the access is barred, the procedure may end. Otherwise the UE may perform the remaining steps of the procedures.

At step 9, UL data may be sent from the NAS to the AS via the UP.

At step 10, if the UE is in the RRC_INACTIVE state or if the UE is in the RRC_CONNECTED state and the UL is not time aligned or if the UE needs to send an SR and PUCCH resources are not available, the UE may perform the random access procedure.

At step 11, if the UE is in the RRC_INACTIVE state, the UE may perform the RRC Connection Resume procedure.

At step 12, UL data for this particular access may be transmitted to the network.

In one example, a method for performing access control in the AS-CP for NAS-CP events requiring access control in the RRC_INACTIVE and RRC_CONNECTED state is disclosed. The method may comprise receiving, at an Access Stratum (AS) of the user equipment and from a Radio Access Network (RAN), access barring information; receiving, at a Non-Access Stratum (NAS) of the user equipment, a trigger associated with an event that requires access control; determining, at the NAS of the user equipment, an access category associated with the event that requires access control; sending, from the NAS of the user equipment to the AS of the user equipment, an indication of the determined access category; determining, at the AS of the user equipment, whether an access barring status associated with the event that requires access control is stored in an internal database of the user equipment; determining, at the AS of the user equipment and based at least on the indication of the determined access category and the access barring information, whether an access attempt for the access category associated with the event that requires access control is barred; and sending, to the NAS of the user equipment, an indication of whether an access attempt for the access category associated with the event that requires access control is barred.

The trigger associated with the event that requires access control may comprise an indication that data is available for transmission by the user equipment. The access category may be determined based on an access category configuration stored in a database of the user equipment. The method may further comprise determining that an access barring status associated with the event that requires access control is not stored in an internal database of the user equipment. The method may further comprise updating the internal database of the user equipment to indicate an access barring status associated with the event that requires access control. The method may further comprise sending, from the NAS of the user equipment to the AS of the user equipment, an access identifier associated with the access attempt. Determining whether an access attempt for the access category associated with the event that requires access control is barred may comprise determining, at the AS of the user equipment and based on the access identifier, whether an access attempt for the access category associated with the event that requires access control is barred.

Figure 33:
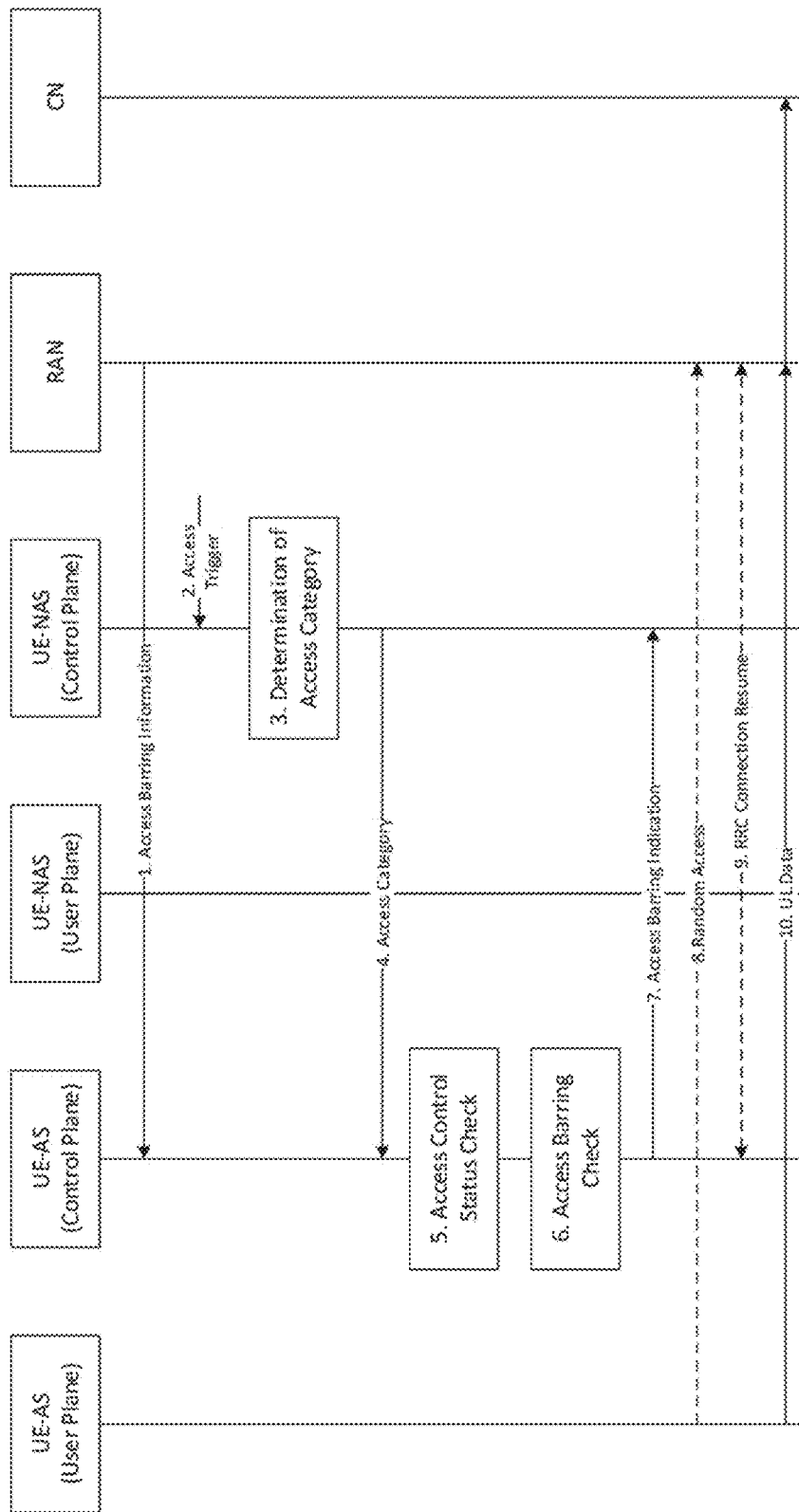
FIG. 33 shows an example AS-CP solution for NAS_CP events requiring access control in RRC_INACTIVE & RRC_CONNECTED.

The procedure shown in FIG. 33 may be used to perform access control in the AS-CP for NAS-CP events requiring access control in the RRC_INACTIVE and RRC_CONNECTED state.

At step 1, the UE may acquire the access barring information transmitted by the RAN. The access barring information may be signaled to the UE using the mechanisms described above.

At step 2, the NAS-CP may receive a trigger for an event that requires access control. Such event may be an event from the NAS-UP for example upon data becoming available for transmission, for example on a different network slice that the current network slice the UE is connected to.

At step 3, the NAS-CP may decide the access category for this particular access. For example, the UE NAS-CP may select a valid access category from the access categories the UE is configured with using one or more of the attributes described above, for example the QoS Flow ID, the QCI, the Application ID, SDF, the packet flow, etc.

At step 4, the NAS-CP may provide the selected valid access category to the AS-CP (e.g. the RRC layer in the appropriate inter-layer message) between UE NAS-CP and UE AS-CP. In one example, an access identifier may also be provided.

At step 5, the UE AS-CP may check access barring status in its internal database to determine if access barring status (e.g. access is barred or access is not barred) is already stored in its internal database for the selected access category. For example, depending on the level of granularity at which access control is performed, the check may be based on QoS Flow ID (QFI), bearer ID or QCI or logical channel ID. For example, to perform access control at the granularity of a QoS flow, the UE AS-CP may check if there is an access barring status (e.g. access is allowed or not allowed) already stored in the UE internal database, based on the QFI and the access category selected by the UE in step 3. Similarly, to perform access control at the granularity of a bearer or QCI or logical channel, the UE AS-CP may check if there is an access barring status (e.g. access is allowed or not allowed) already stored in the UE internal database using the access category selected in step 3 and the DRB ID or the QCI or the logical channel ID that the data packet to be transmitted is mapped to. If no access barring status exists in the UE internal data base for the data packet or the stored access barring status is no longer valid, the UE may proceed with steps 6 and 7 to perform access barring determination as described herein; otherwise, step 6 and step 7 may be skipped.

At step 6, the UE AS-CP (e.g. RRC) may use the selected access category together with the access barring information to determine if access is barred or access is allowed. The UE may update its internal database with the results of the access control (e.g. access is barred or access is not barred) for the corresponding access category selected in step 3 and the corresponding QoS Flow ID or DRB ID or logical channel ID depending on the level of granularity of the access barring. The UE may be notified of changes in the access barring information through dedicated signaling. If the UE is in RRC inactive state, the UE may be notified via a paging message that includes an access barring modification IE. Additionally or alternatively, the UE may monitor the SI for a flag (e.g. a systemInfoValueTag) that indicates if a change has occurred in the SI messages and then reacquire the SI when a change has occurred. The UE may update access barring status in its internal database as a result of subsequent change of access barring information received from the RAN. In one example, the access identifier may additionally or alternatively be used to determine if the access attempt is barred.

At step 7, the AS-CP may inform the NAS-CP of the result of the access barring check. The NAS-CP may optionally forward the access barring check result to the NAS-UP if access is barred. If the access is barred, the procedure may end. Otherwise the UE may perform the remaining steps of the procedures.

At step 8, if the UE is in the RRC_INACTIVE state or if the UE is in the RRC_CONNECTED state and the UL is not time aligned or if the UE needs to send an SR and PUCCH resources are not available, the UE may perform the random access procedure.

At step 9, if the UE is in the RRC_INACTIVE state, the UE may perform the RRC Connection Resume procedure.

At step 10, UL data for this particular access may be transmitted to the network.

Figure 34:
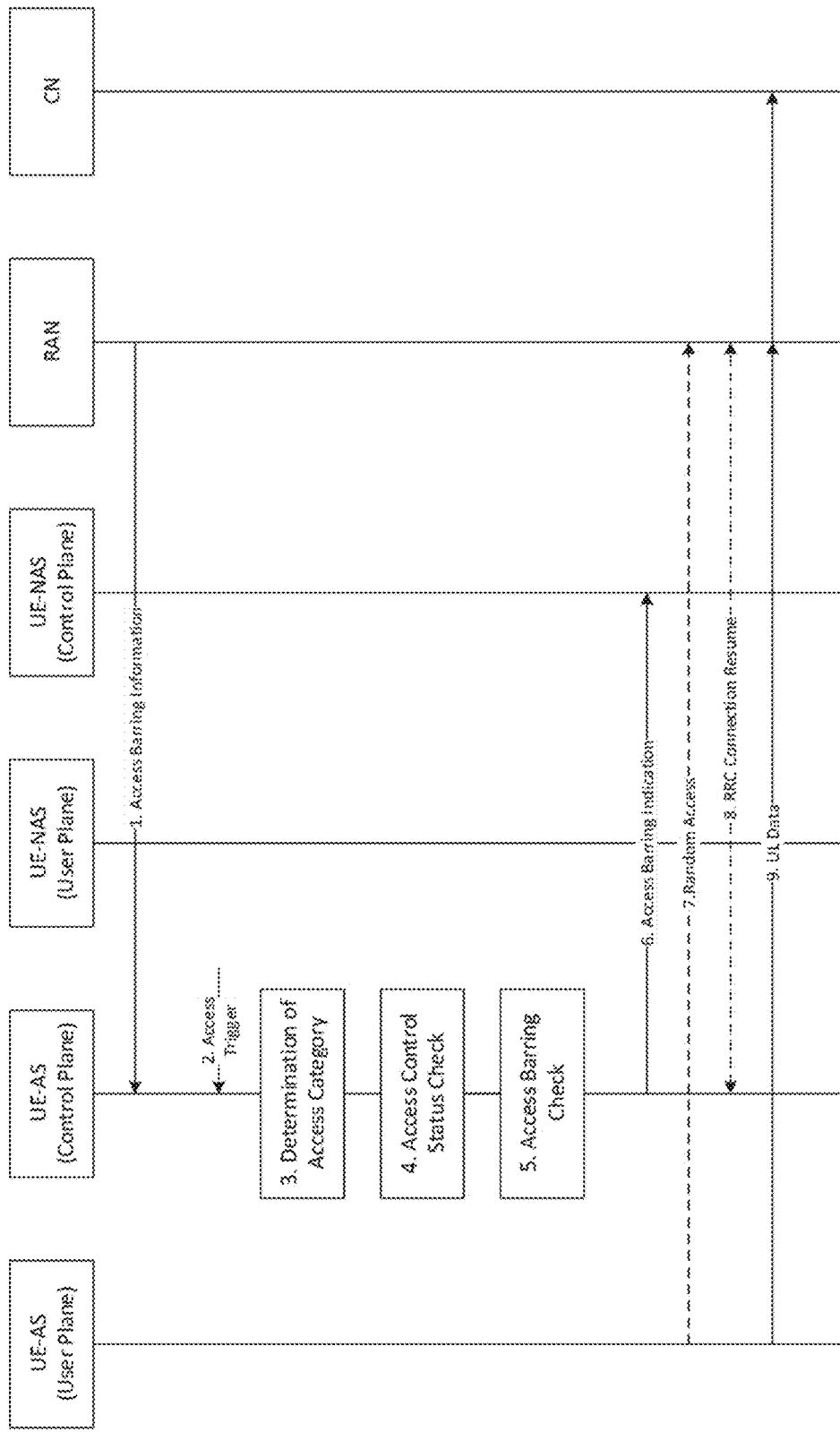
FIG. 34 shows an example AS-CP solution for AS-CP events requiring access control in RRC_INACTIVE & RRC_CONNECTED.

FIG. 34 shows an example AS-CP solution for AS-CP events requiring access control in RRC_INACTIVE & RRC_CONNECTED state.

At step 1, the UE may acquire the access barring information transmitted by the RAN. The access barring information may be signaled to the UE using the mechanisms described herein.

At step 2, the UE may execute an AS procedure that requires network access.

At step 3, the UE AS-CP may determine the access category. The access category determination may be based on the QoS flow, or the QCI. For example, the UE AS-UP may determine the access category from the access categories the UE is configured with using the QoS Flow ID or the QCI associated with the new data packet.

At step 4, the UE AS-CP (e.g. RRC) may use the selected access category together with the access barring information to determine if access is barred or access is allowed. The UE may update its internal database with the results of the access control (e.g. access is barred or access is not barred) for the corresponding access category selected in step 3 and the corresponding QoS Flow ID or DRB ID or logical channel ID depending on the level of granularity of the access barring. The UE may be notified of changes in the access barring information through dedicated signaling. If the UE is in RRC inactive state, the UE may be notified via a paging message that includes an access barring modification IE. Additionally or alternatively, the UE may monitor the SI for a flag (e.g. a systemInfoValueTag) that indicates if a change has occurred in the SI messages and then reacquire the SI when a change has occurred. The UE may update an access barring status in its internal database as a result of subsequent change of access barring information received from the RAN.

At step 5, the UE AS-CP (e.g. RRC) may use the selected access category together with the access barring information to determine if access is barred or access is allowed. The UE may update its internal database with the results of the access control (e.g. access is barred or access is not barred) for the corresponding access category selected in step 3 and the corresponding QoS Flow ID or DRB ID or logical channel ID depending on the level of granularity of the access barring. The UE may be notified of changes in the access barring information through dedicated signaling. If the UE is in RRC inactive state, the UE may be notified via a paging message that includes an access barring modification IE. Additionally or alternatively, the UE may monitor the SI for a flag (e.g. a systemInfoValueTag) that indicates if a change has occurred in the SI messages and then reacquire the SI when a change has occurred. The UE may update access barring status in its internal database as a result of subsequent change of access barring information received from the RAN.

At step 6, the AS-CP may inform the NAS-CP of the result of the access barring check. If the access is barred, the procedure ends. Otherwise the UE may execute the remaining steps of the procedure.

At step 7, if the UE is in the RRC_INACTIVE state or if the UE is in the RRC_CONNECTED state and the UL is not time aligned or if the UE needs to send an SR and PUCCH resources are not available, the UE may perform the random access procedure.

At step 8, if the UE is in the RRC_INACTIVE state, the UE may perform the RRC Connection Resume procedure.

At step 9, UL data for this particular access may be transmitted to the network.

Figure 35:
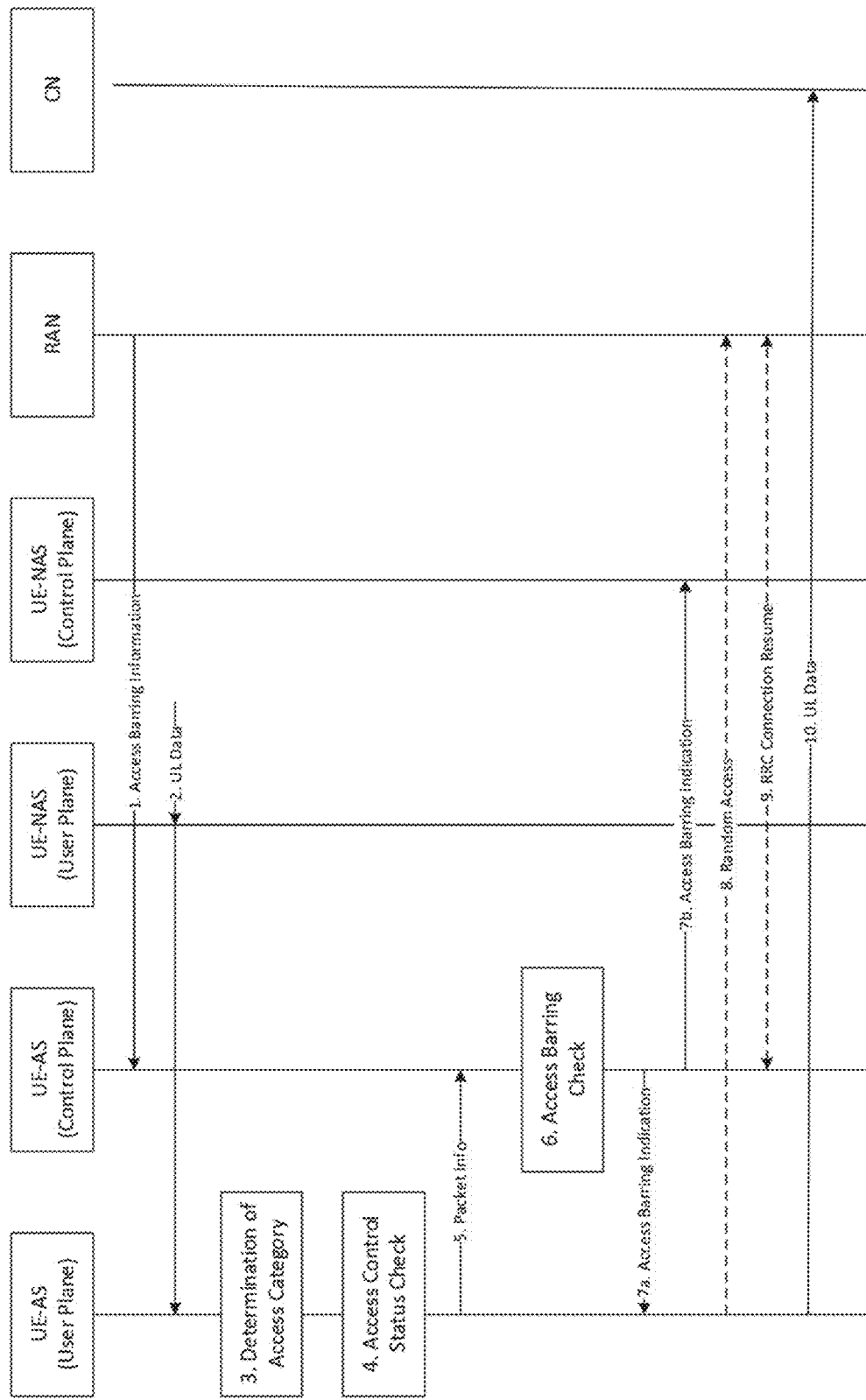
FIG. 35 shows an example AS-CP solution for AS-UP events requiring access control in RRC_INACTIVE & RRC_CONNECTED.

FIG. 35 shows an example AS-CP solution for AS-UP events requiring access control in RRC_INACTIVE & RRC_CONNECTED state.

At step 1, the UE may acquire the access barring information transmitted by the RAN. The access barring information may be signaled to the UE using the mechanisms described herein.

At step 2, UL data may be sent from the NAS to the AS via the UP.

At step 3, the AS-CP may determine the access category for the new QoS flow/bearer/logical channel. The access category may be determined from the access category configuration.

At step 4, the AS-UP may check for packets that may require access control. Depending on the level of granularity at which access control is performed, the check may be based on QoS Flow ID (QFI), bearer ID or logical channel ID. For example, to perform access control at the granularity of a QoS flow, the AS-UP may check if the QFI in the packet header had a corresponding QFI-to-DRB mapping in the in the AS mapping table for the corresponding PDU session. Additionally or alternatively, to perform access control at the granularity of a bearer or logical channel, the AS-UP may compare the bearer/logical channel ID in the packet header with the bearer/logical channel ID(s) stored as part of the bearer/logical channel context. If a new QoS flow/bearer/logical channel is detected, the UE may proceed with steps 4-7 to perform access control; otherwise, these steps may be skipped. Access control may also be performed for packets corresponding to QoS flows/bearers/logical channels that have already been granted access if the access barring information for the corresponding QoS flow/bearer/logical channel has changed since the access barring check was perform. The UE may be notified of changes in the access barring information explicitly (e.g. via a paging message that includes an access barring modification IE). Additionally or alternatively, the UE may monitor the SI for a flag (e.g. a systemInfoValueTag) that indicates if a change has occurred in the SI messages and then reacquire the SI when a change has occurred. The state of the access barring information associated with a QoS flow/bearer/logical channel (e.g. changed/unchanged) may be stored in the QoS flow, bearer or logical channel context, the AS mapping table or a separate database/data structure.

At step 5, an indication that includes packet information that may be used to determine the access category may be sent to the AS-CP. For example, depending on the level of granularity at which access control is performed, the packet information may include the QFI, bearer ID or logical channel ID found in the packet header.

At step 6, the AS-CP may use the determined access category together with the access barring information to determine if the access attempt associated with the new QoS flow/bearer/logical channel is barred.

At step 7, the AS-CP may inform the AS-UP and NAS-CP of the result of the access barring check. The AS-UP may store the result of the access barring check as part of the QoS flow, bearer or logical channel context. If the access is barred, the procedure may end. Otherwise the UE may perform the remaining steps of the procedures.

At step 8, if the UE is in the RRC INACTIVE state or if the UE is in the RRC_CONNECTED state and the UL is not time aligned or if the UE needs to send an SR and PUCCH resources are not available, the UE may perform the random access procedure.

At step 9, if the UE is in the RRC_INACTIVE state, the UE may perform the RRC Connection Resume procedure.

At step 10, UL data for the new QoS flow/bearer/logical channel may be transmitted to the network.

Figure 36:
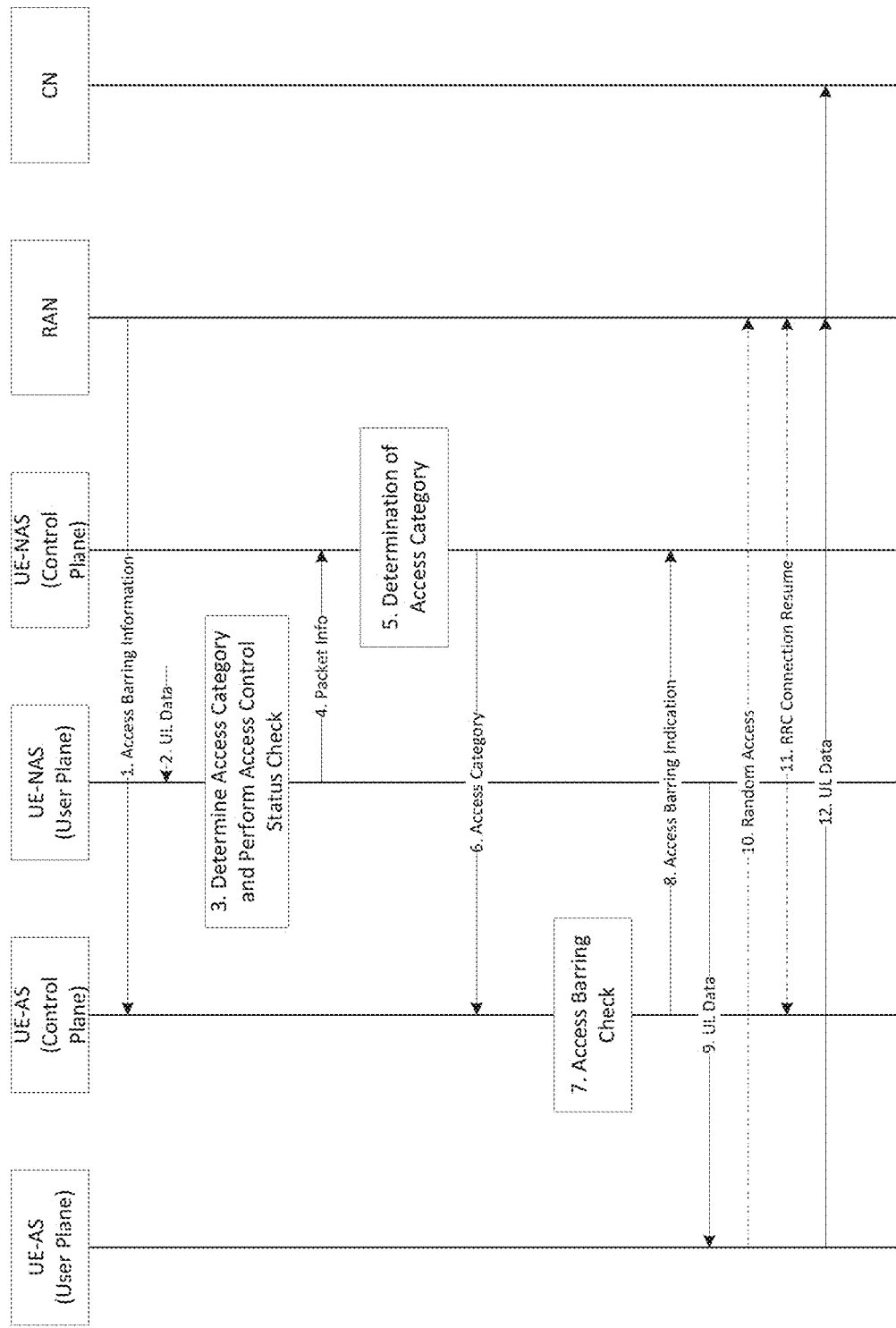
FIG. 36 shows an example AS-CP solution for NAS-UP events requiring access control in RRC_INACTIVE & RRC_CONNECTED.

FIG. 36 shows an example AS-CP solution for NAS-UP events requiring access control in RRC_INACTIVE & RRC_CONNECTED state.

At step 1, the UE may acquire the access barring information transmitted by the RAN. The access barring information may be signaled to the UE using the mechanisms described herein.

At step 2, UL data may be received via the NAS UP.

At step 3, the NAS-UP may determine the access category and check for packets that may require access control. For example, to perform access control at the granularity of a QoS flow, the NAS-UP may check if the QFI in the packet header had a corresponding QFI-to-DRB mapping in the in the AS mapping table for the corresponding PDU session. If a new QoS flow is detected, the UE may proceed with steps 3-8 to perform access control; otherwise, these steps may be skipped. Access control may also perform for packets corresponding to QoS flows/bearers/logical channels that have already been granted access if the access barring information for the corresponding QoS flow/bearer/logical channel has changed since the access barring check was performed. The UE may be notified of changes in the access barring information explicitly (e.g. via a paging message that includes an access barring modification IE). Additionally or alternatively, the UE may monitor the SI for a flag (e.g. a systemInfoValueTag) that indicates if a change has occurred in the SI messages and then reacquire the SI when a change has occurred. The state of the access barring information associated with a QoS flow/bearer/logical channel (e.g. changed/unchanged) may be stored in the QoS flow, bearer or logical channel context, the AS mapping table or a separate database/data structure.

At step 4, an indication that includes packet information that may be used to determine the access category may be sent to the NAS-CP. For example, if access control is performed at the granularity of a QoS flow, the packet information may include the QFI.

At step 5, the NAS-CP may determine the access category for this particular access. The access category may be determined from the access category configuration, which may be based on access category components.

At step 6, the NAS-CP may provide the determined access category to the AS-CP (e.g. the RRC layer). In one example, an access identifier may also be provided.

At step 7, the AS-CP may use the determined access category together with the access barring information to determine if the access attempt is barred. In one example, the access identifier may additionally or alternatively be used to determine if the access attempt is barred.

At step 8, the AS-CP may inform the NAS-CP of the result of the access barring check. If the access is barred, the procedure may end. Otherwise the UE may execute the remaining steps of the procedures.

At step 9, UL data may be sent from the NAS to the AS via the UP.

At step 10, if the UE is in the RRC INACTIVE state or if the UE is in the RRC_CONNECTED state and the UL is not time aligned or if the UE needs to send an SR and PUCCH resources are not available, the UE may perform the random access procedure.

At step 11, if the UE is in the RRC_INACTIVE state, the UE may perform the RRC Connection Resume procedure.

At step 12, UL data for this particular access may be transmitted to the network.

Figure 37:
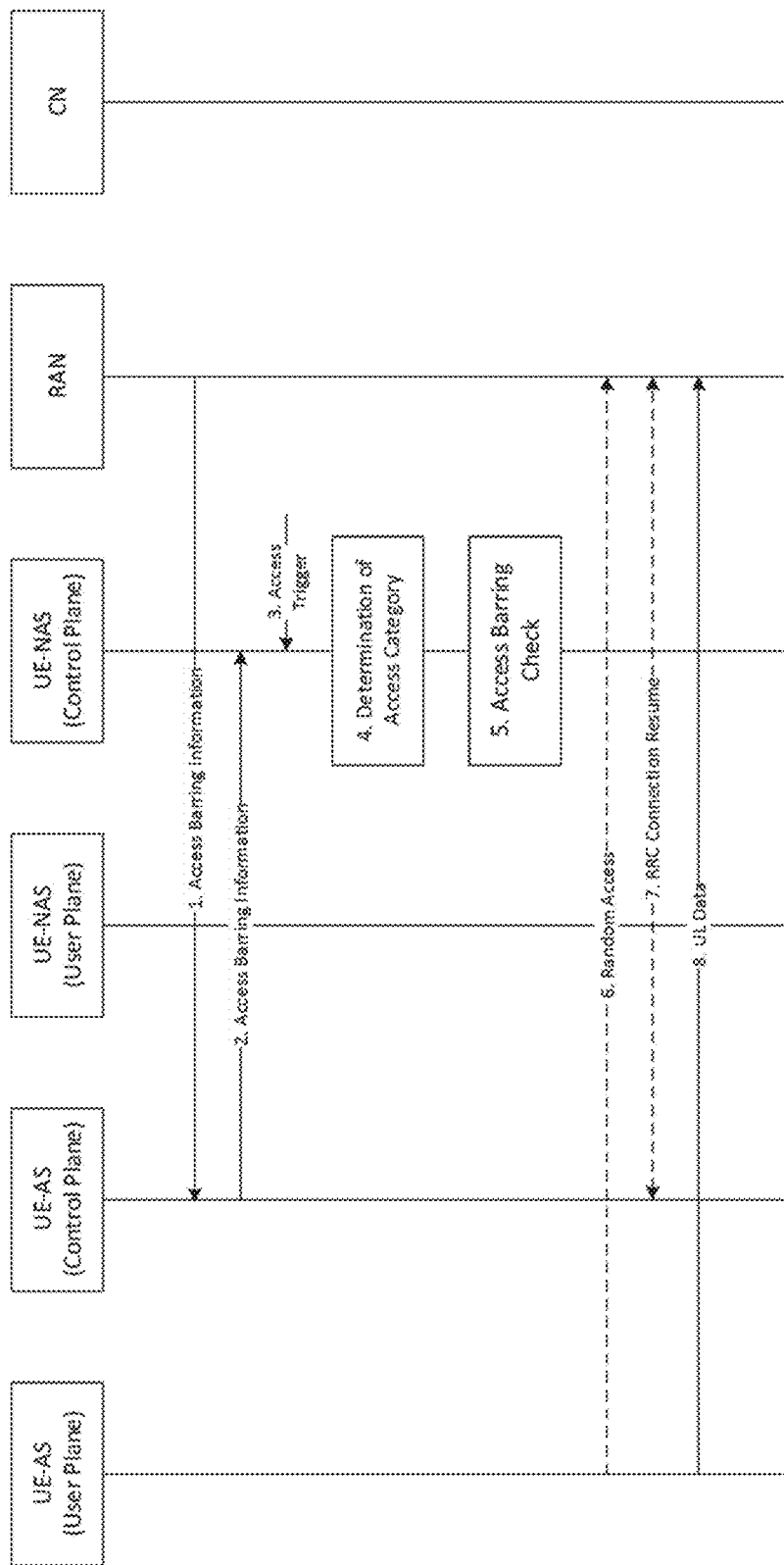
FIG. 37 shows an example NAS-CP solution for NAS-CP events requiring access control in RRC_CONNECTED & RRC_INACTIVE.

FIG. 37 shows an example NAS-CP solution for NAS-CP events requiring access control in RRC_CONNECTED & RRC_INACTIVE state. Such events may include but are not limited to the execution of NAS procedures that use an initial NAS message, where the set of initial NAS messages may include but is not limited to the following: ATTACH REQUEST, DETACH REQUEST, TRACKING AREA UPDATE REQUEST, SERVICE REQUEST, EXTENDED SERVICE REQUEST and CONTROL PLANE SERVICE REQUEST.

At step 1, the UE may acquire the access barring information transmitted by the RAN, where the access barring information may be signaled to the UE using the mechanisms described herein.

At step 2, the AS-CP may provide the acquired access barring information to the NAS-CP.

At step 3, the NAS-CP may receive a trigger for an event that requires access control.

At step 4, the NAS-CP may determine the access category for this particular access. Depending on the level of granularity at which access control is performed, the access category may be associated with a new/modified QoS flow, bearer or logical channel. The access category may be determined from the access category configuration, which may be based on access category components.

At step 5, he NAS-CP may use the determined access category together with the access barring information to determine if an access attempt for the particular access category is barred. If the access is barred, the procedure may end. Otherwise the UE may perform the remaining steps of the procedures.

At step 6, if the UE is in the RRC_INACTIVE state or if the UE is in the RRC_CONNECTED state and the UL is not time aligned or if the UE needs to send an SR and PUCCH resources are not available, the UE may perform the random access procedure.

At step 7, if the UE is in the RRC_INACTIVE state, the UE may perform the RRC Connection Resume procedure.

At step 8, UL data for this particular access may be transmitted to the network.

Figure 38:
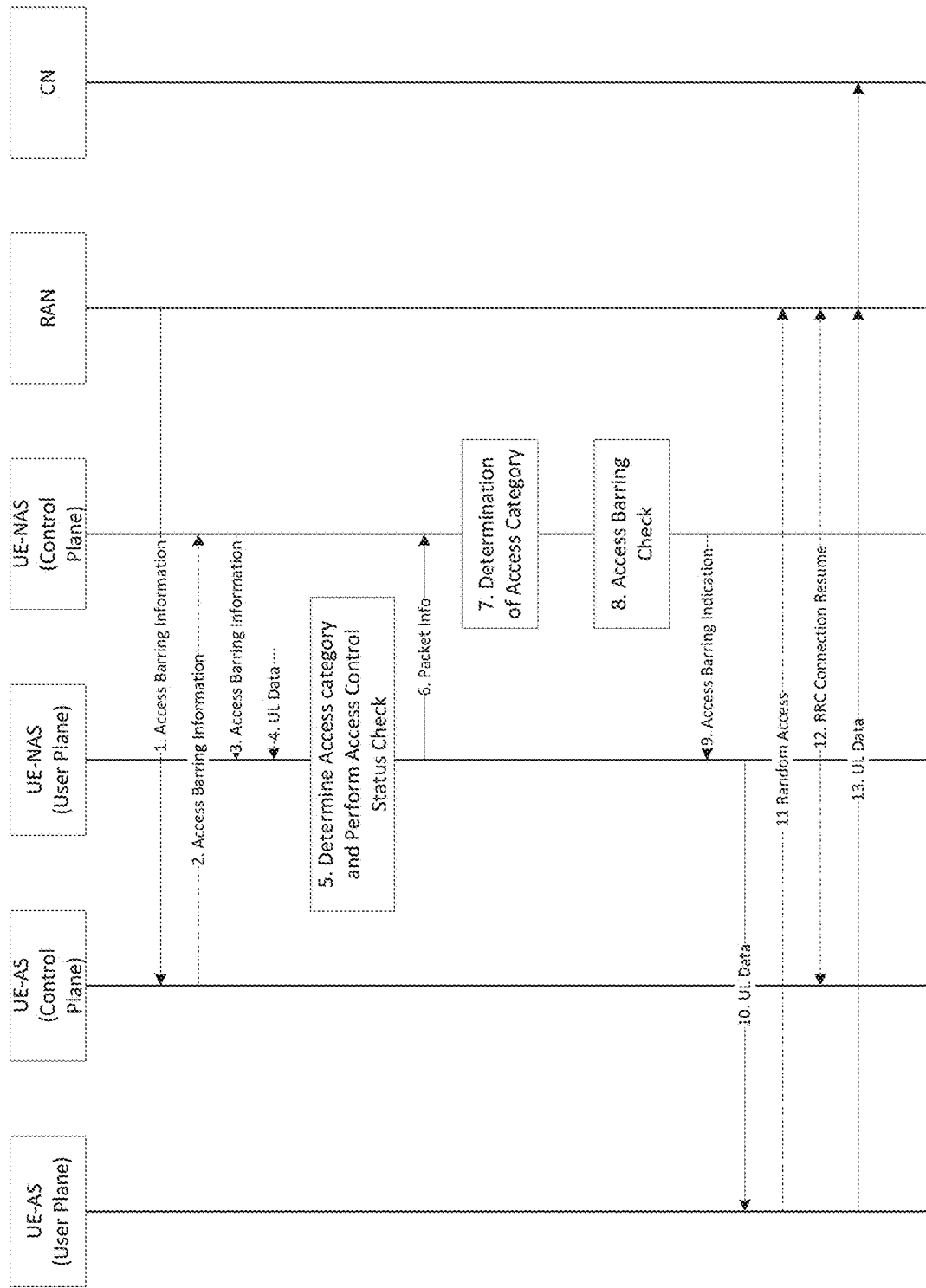
FIG. 38 shows an example NAS-CP solution for NAS-UP events requiring access control in RRC_INACTIVE & RRC CONNECTED.

FIG. 38 shows an example NAS-CP solution for NAS-UP events requiring access control in RRC_INACTIVE & RRC CONNECTED state.

At step 1, the UE may acquire the access barring information transmitted by the RAN, where the access barring information may be signaled to the UE using the mechanisms described herein.

At step 2, the AS-CP may provide the acquired access barring information to the NAS-CP.

At step 3, the NAS-CP may provide the acquired access barring information to the NAS-UP.

At step 4, UL data may be received via the NAS UP.

At step 5, the NAS-UP may determine the access category and check for packets that may require access control. For example, to perform access control at the granularity of a QoS flow, the NAS-UP, may check if the QFI in the packet header had a corresponding QFI-to-DRB mapping in the in the AS mapping table for the corresponding PDU session. If a new QoS flow is detected, the UE may proceed with steps 6-9 to perform access control; otherwise, these steps may be skipped. Access control may also perform for packets corresponding to QoS flows/bearers/logical channels that have already been granted access if the access barring information for the corresponding QoS flow/bearer/logical channel has changed since the access barring check was performed. The UE may be notified of changes in the access barring information explicitly (e.g., via a paging message that includes an access barring modification IE). Additionally or alternatively, the UE may monitor the SI for a flag (e.g. a systemInfoValueTag) that indicates if a change has occurred in the SI messages and then reacquire the SI when a change has occurred. The state of the access barring information associated with a QoS flow/bearer/logical channel (e.g. changed/unchanged) may be stored in the QoS flow, bearer or logical channel context, the AS mapping table or a separate database/data structure.

At step 6, an indication that includes packet information that may be used to determine the access category is sent to the NAS-CP. For example, if access control is performed at the granularity of a QoS flow, the packet information may include the QFI.

At step 7, the NAS-CP may determine the access category for this particular access. The access category may be determined from the access category configuration, which may be based on access category components.

At step 8, the NAS-CP may use the determined access category together with the access barring information to determine if an access attempt for the particular access category is barred.

At step 9, an indication may be sent to the NAS-UP to indicate the result of the access barring check.

At step 10, UL data may be sent from the NAS to the AS via the UP.

At step 11, if the UE is in the RRC_INACTIVE state or if the UE is in the RRC_CONNECTED state and the UL is not time aligned or if the UE needs to send an SR and PUCCH resources are not available, the UE may perform the random access procedure.

At step 12, if the UE is in the RRC_INACTIVE state, the UE may perform the RRC Connection Resume procedure.

At step 13, UL data for this particular access may be transmitted to the network.

Figure 39:
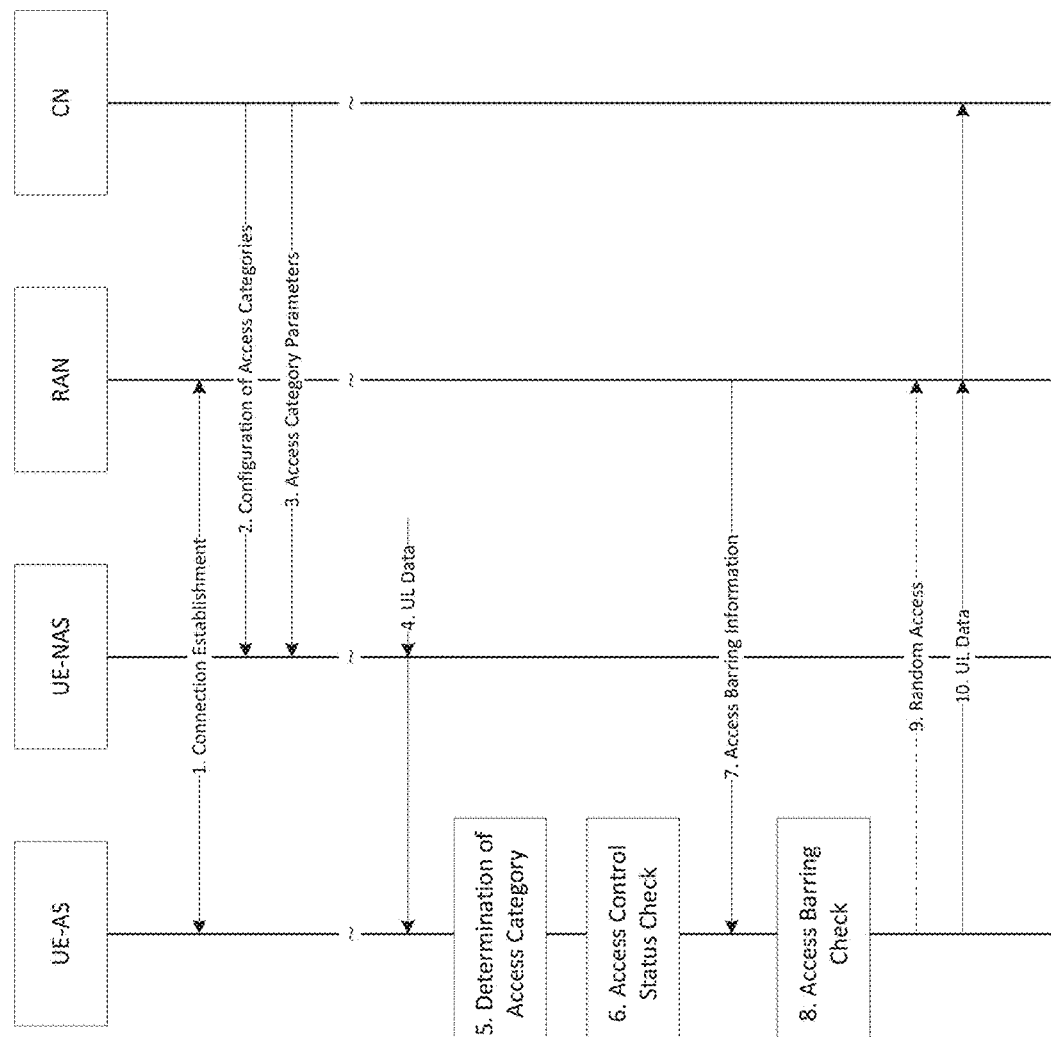
FIG. 39 shows an example AS solution for UP events requiring access control in RRC_CONNECTED.

FIG. 39 shows an example AS solution for UP events requiring access control in RRC_CONNECTED state. The procedure shown in FIG. 39 may be used to perform access control in the AS for AS-UP events (e.g., UE initiated UL QoS flow).

Figure 40:
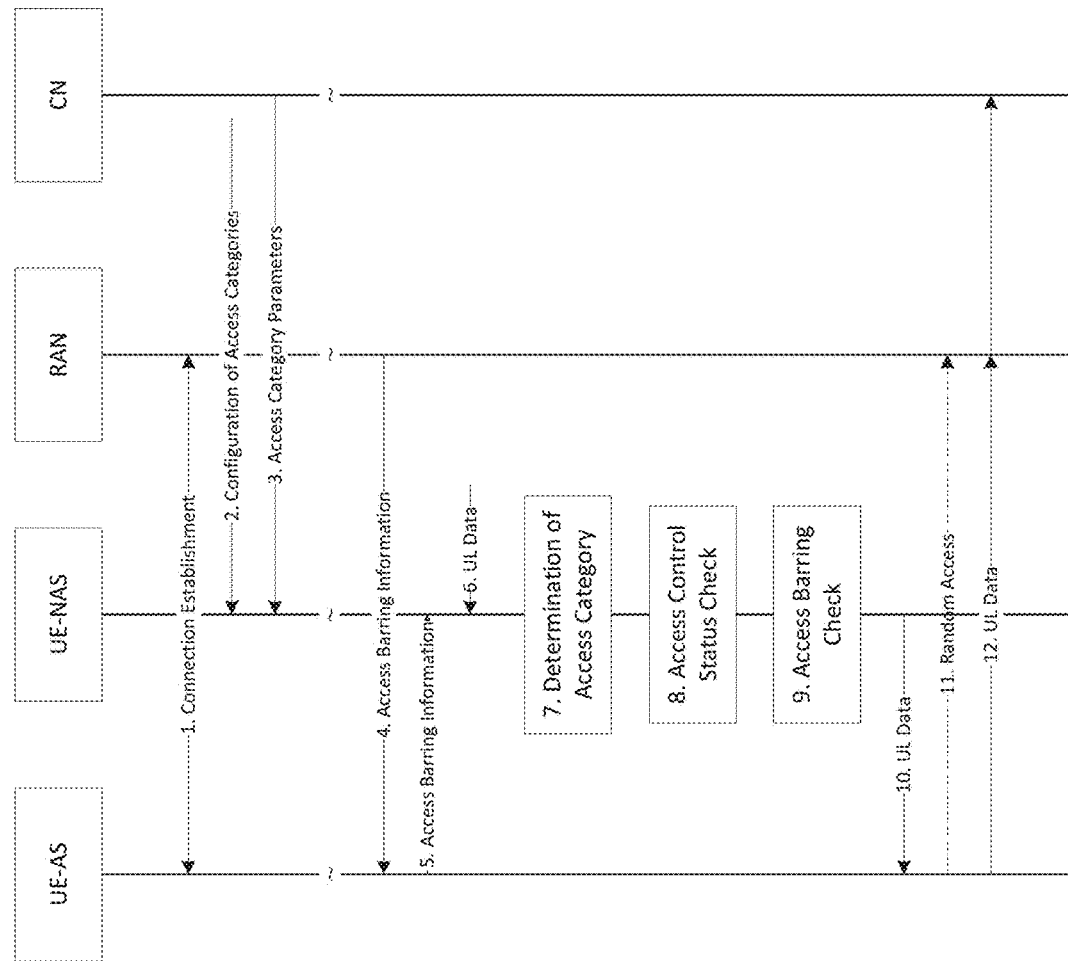
FIG. 40 shows an example NAS solution for UP events requiring access control in RRC_CONNECTED.

FIG. 40 shows an example NAS solution for UP events requiring access control in RRC_CONNECTED state. The procedure shown in FIG. 40 may be used to perform access control in the NAS for NAS-UP events (e.g., UE initiated UL QoS flow).

When an access control prevents an UL data transmission, the UE may not include such data in the calculation of the amount of data available for transmission for the purpose of Buffer Status reporting. In one example, the UE may be configured by the network to apply such restriction at the following granularity level: logical channel level, logical channel group level or bearer level. The UE may also be configured by the network to apply such a restriction at the service data flow level, specific traffic flow level or IP flow level. When Buffer Status Report (BSR) restriction is placed on a logical channel or logical channel group as a result of access barring check, the UE may cancel the associated periodic BSR timer (periodicBSR-Timer), the Retransmit BSR Timer (retxBSR-Timer). Additionally or alternatively, the UE may cancel the associated Logical Channel Scheduling Request Prohibit Timer (logicalChannelSR-Prohibit-Timer). Similarly, when an access control prevents an UL data transmission, the UE may not send a Scheduling Request as a result of such UL data or for the purpose of transmitting BSR associated with such UL data.

If the UE marks a logical channel or a group of logical channel as restricted following access control barring check, the MAC may not consider these restricted logical channels during logical channel prioritization procedure. As described herein, access category configuration may be defined at the granularity level of attributes such as Network Slice, Application, Traffic Flow or Packet Flow, Service Data Flow, QoS Flow, QCI. The current 5G QoS framework requires the access stratum to map QoS Flow to Data Radio Bearer (DRB) and the NAS to map IP packet flow or other data packet flow including non-IP packet flow to QoS flow. A DRB may be mapped to one logical channel or more than one logical channel in case of data duplication. The UE AS may perform access category mapping onto logical channel or group of logical channels. For example, the UE may create an association between logical access categories and the logical channels that may be restricted from data transmission when the access category mapped to that logical channel is barred. The UE AS may use the derived mapping of access category to logical channel or group of logical channel to establish logical channel restriction or group of logical channel restriction.

Methods and systems for access barring are disclosed. When data transmission is restricted as a result of access control, there is a risk of buffer build-up and possibly buffer overflow in both the AS and the NAS. The UE AS may send an indication to the UE NAS to inform the NAS of the access barring. The indication may carry the barred access category and possibly, an explicit indication of the level of the granularity of the access barring for example Network Slice, Application, Traffic Flow or Packet Flow, Service Data Flow, QoS Flow, QCI. Upon access barring, the US AS and US NAS may free up their respective buffer of the restricted data. The NAS may also send to the layer above NAS (referred to herein as an application layer) an indication aimed at restricting transmission of the barred traffics. Similarly, if access barring check is implemented in the NAS, the NAS may refrain from forwarding the barred traffics to the AS and may clear its buffers from any restricted traffic. Additionally, the NAS may send to the layer above NAS an indication aimed at restricting transmission of the barred traffics.

Methods and systems for access barring are disclosed. The Access barring procedure may be performed in the Access Stratum of the UE (e.g. RRC) and the call or signaling initiation that trigger Access barring check may be performed in the upper layers above the UE AS for example NAS.

An example procedure for the initiation of access barring is shown in FIGS. 41A and 41B. The SystemInformationBlockType2 may represent the system information block that carries the access barring parameters broadcasted by the RAN (e.g. gNB) and ac-BarringPerPLMN-List may represent the data structure within the SystemInformationBlockType2 that contains AC-BarringPerPLMN entries or the access category barring parameters (e.g. ac-BarringInfo per PLMN) for each PLMN served by the RAN.

An example of access barring information in a system information block (e.g., SystemInformationBlockType2) is illustrated in FIG. 42 and FIG. 43.

In another example, an example procedure for an access barring check is shown in FIGS. 44A and 44B. Note that the ac-Boolean access barring parameter may be configured for access category defined for emergency application such as emergency calls, or mission critical or time critical applications such as URLLC applications.

When access barring is controlled by the RAN (e.g. gNB) based on access barring rate (e.g. access barring factors), an access barring timer may be used to control how long the UE may wait before another access re-attempt. Differentiated Timers for different purposes may be specified to be used as access barring timer Tbarring used in the description of access barring check function described herein. At the minimum, a timer may be specified for access attempt due to mobile originating signaling, and a separate a timer may be specified for access attempt due to mobile originating applications such as mobile originating calls. $T_{MOSignalling}$ and $T_{MOCall}$ may be the timers used as Tbarring for access attempt due to mobile originating signaling and mobile originating applications such as mobile originating calls, respectively. Each of these types of timer may be further differentiated into different timers. For example, the following $T_{MOCall}$ timer may be specified:

$T_{MOURLLC}$ for mission critical URLLC application type of calls;

$T_{MOeMBB}$ for eMBB application type of calls; and $T_{MOmMTC}$ for mMTC application type of calls.

Similarly, the $T_{MOSignalling}$ may be further differentiated in to different timers in order to provide differentiated handling for mobile originated signaling barring as may be required by the scenarios and the use cases of the signaling.

FIGS. 45A and 45B show example actions at the UE when an access barring timer expires.

The definition and use of the timers disclosed herein may be defined in the example table below:

| Timer | Start | Stop | At expiry |
|---|---|---|---|
| T302 | Reception of RRCConnectionReject while performing RRC connection establishment or reception of RRCConnectionResumeReject while performing RRC connection resume from RRC inactive state. | Upon entering RRC_CONNECTED and upon cell re-selection or upon RAN area change if T302 is applicable at the RAN area level or upon SIB validity area change | Inform upper layers about barring alleviation |

-continued

| Timer | Start | Stop | At expiry |
|---|---|---|---|
| $T_{MOmMTC}$ (e.g. T303) | Access barred while performing RRC connection establishment for mobile originating mMTC calls or while performing RRC connection resume from inactive state for mMTC calls | Upon entering RRC_CONNECTED and upon cell re-selection or upon SIB validity area RRC change if SIB carrying access barring mean time is valid in more than one cell e.g. over a SIB validity area. | Inform upper layers about barring alleviation |
| $T_{MOeMBB}$ (e.g. T303) | Access barred while performing RRC connection establishment for mobile originating eMBB calls or while performing RRC connection resume from RRC inactive state for eMBB calls | Upon entering RRC_CONNECTED and upon cell re-selection or upon SIB validity area change if SIB carrying access barring mean time is valid in more than one cell e.g. over a SIB validity area. | Inform upper layers about barring alleviation |
| $T_{MOURLLC}$ (e.g. T303) | Access barred while performing RRC connection establishment for mobile originating URLLC calls or while performing RRC connection resume from RRC inactive state for URLLC calls | Upon entering RRC_CONNECTED and upon cell re-selection or upon SIB validity area change if SIB carrying access barring mean time is valid in more than one cell e.g. over a SIB validity area. | Inform upper layers about barring alleviation |
| $T_{MOSignalling}$ (e.g. T305) | Access barred while performing RRC connection establishment for mobile originating URLLC calls or while performing RRC connection resume from RRC inactive state for URLLC calls | Upon entering RRC_CONNECTED and upon cell re-selection or upon SIB validity area change if SIB carrying access barring mean time is valid in more than one cell e.g. over a SIB validity area. | Inform upper layers about barring alleviation |

Figure 46:
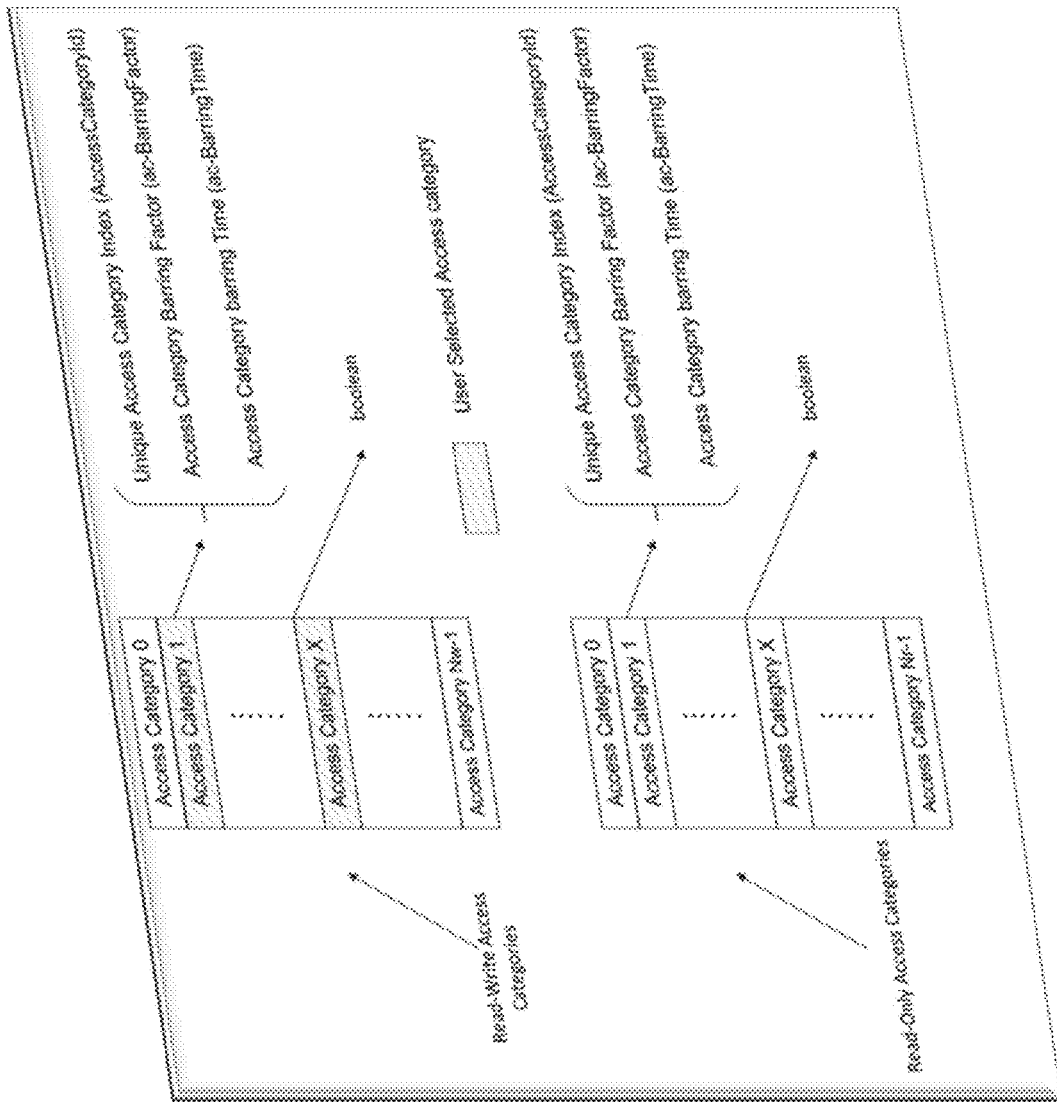
FIG. 46 shows an example user interface for access category display and selection.

FIG. 46 illustrates an example user screen for access display and selection. Nw may denote the number of available access categories the user can selected from, while Nr may denote the number of available access categories display to the user as read only. The list of access categories the user may select from may include operator defined access categories. The operator defined access categories may include operator defined special access categories or wild card access categories. For any given applications, the user may select or negotiate the corresponding access category with the network, subject to the appropriate usage charges for the selected access category. The operator may define and assign default access categories per application. The user selected access category, if accepted by the network, may override the default access category assigned by the network.

The following is a list of acronyms that may be referenced in the detailed description above. Unless otherwise specified, the acronyms used herein refer to the corresponding term listed below:

5G 5$^{th}$ Generation
3GPP 3$^{rd}$ Generation Partnership Project
AC Access Category
ACB Access Class Barring
ACDC Application Specific Congestion Control for Data Communications
ACMF Access Category Management Function
AMF Access and Mobility Management Function
AN Access Network
ANDSF Access Network Discovery and Selection Function
App Application
AS Access Stratum
BSSID Basic SSID
BSR Buffer Status Report
CI Cell Identifier
CN Core Network
CP Control Plane
CSFB Circuit Switched FallBack
DL Downlink
DM Device Management
DRB Data Radio Bearer
EAB Extended Access Barring
eMBB enhanced Mobile Broadband
eNB Evolved Node B
EHPLMN Equivalent HPLMN
ESS Extended Service Set
EUTRA Evolved Universal Terrestrial Radio Access
FDD Frequency Division Duplex
gNB: g Node B
HESSID Homogeneous ESS ID
HPLMN Home PLMN
ID or Id Identity or Identifier
IMSI International Mobile Subscriber Identity IMT International Mobile Telecommunications
IP Internet Protocol
LTE Long Term Evolution
MAC Medium Access Control
MCC Mobile Country Code
MO Management Object
MTC Machine-Type Communications
mMTC Massive Machine Type Communication
OMA Open Mobile Alliance
NAS Non Access Stratum
NGC Next Generation Core network
NR New Radio
OS Operating System
PCF Policy Control Function
PDU Packet Data Unit
PHY Physical Layer
PLMN Public Land Mobile Network
PUCCH Physical Uplink Control Channel
QCI QoS Class Identifier
QFI QoS Flow Identifier
QoS Quality of Service
RAN Radio Access Network
RAT Radio Access Technology
RRC Radio Resource Control
SDF Service Data Flow
SIB System Information Block
SIM Subscriber Identity Module
SPID Subscriber Profile ID
SR Scheduling Request
SSAC Service Specific Access Control
SSID Service Set ID
TAC Tracking Area Code
TCP Transmission Control Protocol
TDD Time Division Duplex
TRP Transmission and Reception Point
Tx Transmitter
UDP User Datagram Protocol
UE User Equipment
UL Uplink
UP User Plane
USIM Universal SIM
URLLC Ultra-Reliable and Low Latency Communications
ViLTE Video over LTE
VoLTE Voice over LTE
WLAN Wireless Local Area network This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wireless transmit/receive unit (WTRU) comprising:
a processor;
a memory coupled with the processor, the memory storing executable instructions that when executed by the processor cause the processor to effectuate operations comprising:
receiving a non-access stratum (NAS) message, the NAS message comprising information associated with one or more access category values, wherein the information indicates that the one or more access category values are associated with a network slice;
determining that an access attempt is associated with the one or more access category values;
receiving system information related to access category barring;
determining whether the access attempt is barred based on a first access category value of the one or more access category values and the system information related to access category barring; and
on a condition that the access attempt is determined to not be barred, initiating an RRC Connection Establishment procedure.

2. The WTRU of claim 1, wherein the first access category value is associated with an operator defined access category.

3. The WTRU of claim 1, wherein the information indicates that the first access category value is associated with an operating system.

4. The WTRU of claim 1, wherein the information indicates that the first access category value is associated with a quality-of-service class identifier (QCI).

5. The WTRU of claim 1, wherein the determining whether the access attempt is barred is based on a random number being within a threshold.

6. The WTRU of claim 1, wherein the first access category value associated with the access attempt comprises an indication that the WTRU is configured for one or more mission critical services.

7. The WTRU of claim 1, wherein the information indicates that the access category value is associated with an application and an operating system.

8. A method comprising:
receiving a non-access stratum (NAS) message, the NAS message comprising information associated with one or more access category values, wherein the information indicates that the one or more access category values are associated with a network slice;
determining that an access attempt is associated with the one or more access category values:
receiving system information related to access category barring;
determining whether the access attempt is barred based on a first access category value of the one or more access category values and the system information related to access category barring; and
on a condition that the access attempt is determined to not be barred, initiating an RRC Connection Establishment procedure.

9. The method of claim 8, wherein the first access category value is associated with an operator-defined access category.

10. The method of claim 8, wherein the information indicates that the first access category value is associated with an operating system.

11. The method of claim 8, wherein the information indicates that the first access category value is associated with a quality-of-service class identifier (QCI).

12. The method of claim 8, wherein the determining whether the access attempt is barred is based on a random number being within a threshold.

13. The method of claim 8, wherein the first access category value associated with the access attempt comprises an indication that a wireless transmit/receive unit is configured for one or more mission critical services.

14. The method of claim 8, wherein the information indicates that the first access category value is associated with an application and an operating system.

15. A system comprising:
   one or more processors; and
   memory coupled with the processor, the memory storing executable instructions that when executed by the processor cause the processor to effectuate operations comprising:
      receiving information associated with one or more access category values, wherein the information indicates that the one or more access category values are associated with a network slice;
      determining that an access attempt is associated with the one or more access category values;
      receiving system information related to access category barring;
      determining that the access attempt is not barred based on a first access category value of the one or more access category values and the system information related to access category barring; and
      based on the access attempt not being barred, initiating an RRC Connection Establishment procedure.

16. The system of claim 15, wherein the first access category value is associated with an operator-defined access category.

17. The system of claim 15, wherein the information indicates that the first access category value is associated with an operating system.

18. The system of claim 15, wherein the information indicates that the first access category value is associated with a quality-of-service class identifier (QCI) or the information indicates that the first access category value is associated with an application and an operating system.

19. The system of claim 15, wherein the determining whether the access attempt is barred is based on a random number being within a threshold.

20. The system of claim 15, wherein the first access category value associated with the access attempt comprises an indication that a wireless transmit/receive unit is configured for one or more mission critical services.

* * * * *